US012522425B2

(12) United States Patent
Leech et al.

(10) Patent No.: US 12,522,425 B2
(45) Date of Patent: Jan. 13, 2026

(54) CONDIMENT DISPENSER

(71) Applicant: H.J. Heinz Company Brands LLC, Pittsburgh, PA (US)

(72) Inventors: Gregg Leech, Wigan (GB); Robin Duxbury, Grantham (GB); Kim Bertens-Vlems, Berkel-Enschot (NL); Ivi Kalyvioti, Utrecht (NL)

(73) Assignee: H.J. Heinz Company Brands LLC, Pittsburgh, PA (US)

( * ) Notice: Subject to any disclaimer, the term of this patent is extended or adjusted under 35 U.S.C. 154(b) by 290 days.

(21) Appl. No.: 18/017,565

(22) PCT Filed: Jul. 23, 2021

(86) PCT No.: PCT/US2021/042913
§ 371 (c)(1),
(2) Date: Jan. 23, 2023

(87) PCT Pub. No.: WO2022/020687
PCT Pub. Date: Jan. 27, 2022

(65) Prior Publication Data

US 2023/0294907 A1 Sep. 21, 2023

Related U.S. Application Data

(60) Provisional application No. 63/135,120, filed on Jan. 8, 2021, provisional application No. 63/068,619, filed
(Continued)

(51) Int. Cl.

| | |
|---|---|
| ***B65D 77/06*** | (2006.01) |
| ***A47G 19/18*** | (2006.01) |

(Continued)

(52) U.S. Cl.
CPC ......... *B65D 83/771* (2025.01); *A47G 19/183* (2013.01); *B65D 77/067* (2013.01); *B67B 7/28* (2013.01)

(58) Field of Classification Search
CPC ...... B65D 83/771; B65D 77/067; B67B 7/28; A47G 19/183
See application file for complete search history.

(56) References Cited

U.S. PATENT DOCUMENTS 4,576,595 A * 3/1986 Aas ..................... B01L 3/50825
600/576
4,739,904 A 4/1988 Spencer
(Continued)

FOREIGN PATENT DOCUMENTS

| | | |
|---|---|---|
| BR | PI0403889 A | 6/2005 |
| EP | 2005870 | 12/2008 |

(Continued)

OTHER PUBLICATIONS

Patent Cooperation Treaty, International Search Report and Written Opinion for International Application No. PCT/US2021/042913 dated Oct. 14, 2021, 12 pages.
(Continued)

*Primary Examiner* — Frederick C Nicolas
(74) *Attorney, Agent, or Firm* — Fitch, Even, Tabin & Flannery LLP

(57) ABSTRACT

In one aspect, a condiment dispenser for discharging condiment from a condiment container is disclosed. The condiment dispenser includes a housing configured to surround at least a portion of the condiment container when installed in the housing. A spout extends from the condiment dispenser for discharging the condiment from the dispenser. A pump is positioned within the housing to force condiment to the spout and out of the condiment dispenser. The condiment dispenser further includes a substantially continuous flow
(Continued)

path having an inlet configured to couple to the condiment container and an outlet in the spout for discharging the condiment, the substantially continuous flow path installed as a single unit from the inlet to the outlet and extending through the pump.

18 Claims, 55 Drawing Sheets

Related U.S. Application Data on Aug. 21, 2020, provisional application No. 63/056,138, filed on Jul. 24, 2020.

(51) Int. Cl.
*B65D 83/00* (2006.01)
*B67B 7/86* (2006.01)

(56) References Cited

U.S. PATENT DOCUMENTS 4,869,404 A 9/1989 Elliott
4,877,156 A * 10/1989 Clanet .................... B65D 83/64 222/386.5
5,452,826 A * 9/1995 Stern ..................... B05B 11/103 222/207
5,746,353 A * 5/1998 Cheok ..................... G01F 11/24 222/533
5,746,363 A 5/1998 Teller
6,089,406 A 7/2000 Feldner
6,189,736 B1 2/2001 Phallen
6,405,897 B1 6/2002 Jepson
6,814,639 B1 11/2004 Peterson
7,011,233 B2 * 3/2006 Drennow .................. B67B 7/26 222/215
8,205,771 B2 6/2012 Compton
8,336,740 B1 * 12/2012 Daansen .............. A47K 5/1207 222/325
10,239,655 B1 3/2019 Lin
10,961,105 B1 * 3/2021 Rusch .................. B67D 1/0888
11,952,257 B2 * 4/2024 Knight ................. B67D 1/1256
2006/0138179 A1 * 6/2006 Suffa .................. B65D 47/2031 222/490
2008/0135426 A1 6/2008 Hecht
2010/0038380 A1 2/2010 Compton
2010/0051647 A1 * 3/2010 Chen .................... A47K 5/1215 222/214
2010/0122991 A1 5/2010 Taguchi
2016/0060092 A1 3/2016 Vittaldevara et al.
2018/0021222 A1 * 1/2018 Quackenbush ........ A61J 11/007 215/11.4
2018/0169680 A1 6/2018 Goettke
2019/0283055 A1 9/2019 Knight
2020/0069089 A1 * 3/2020 Gehl ...................... A47G 19/18
2024/0315491 A1 * 9/2024 Kalyvioti ............. A47G 19/183

FOREIGN PATENT DOCUMENTS

EP 3352911 8/2018
GB 1163489 9/1969
GB 1204478 9/1970
JP 2013237469 11/2013
WO 98/40309 A1 9/1998
WO 2013160869 10/2013

OTHER PUBLICATIONS

EPO; Application No. 21845283.7; Supplementary European Search Report issued Feb. 6, 2025.

* cited by examiner

CONDIMENT DISPENSER

CROSS REFERENCE TO RELATED APPLICATIONS

This application is a U.S. national phase application filed under 35 U.S.C. § 371 of International Application Number PCT/US2021/042913, filed Jul. 23, 2021, designating the United States, which claims the benefit of U.S. Provisional Application No. 63/056,138, filed Jul. 24, 2020, U.S. Provisional Application No. 63/068,619, filed Aug. 21, 2020, and U.S. Provisional Application No. 63/135,120 filed Jan. 8, 2021, which are all hereby incorporated herein by reference in their entireties.

FIELD

This disclosure relates to fluid dispensing devices and, in particular, to contactless condiment dispensing devices.

BACKGROUND

Restaurants often provide customers with one or more condiments for their food items. These condiments include, as examples, ketchup, mustard, mayonnaise, and barbeque sauce. Restaurants provide condiments to customers in a variety of forms. Some restaurants provide individual packets of the condiments, each containing a small amount of the condiment. Restaurants may stock a bin containing a plurality of these condiment packets for customers to take and apply to their food. Some restaurants may provide large containers of the condiments along with a hand pump that the customers may use to dispense the condiment for use with their food.

The use of condiment packets and hand pump solutions increase the risk of the transmission of germs, bacteria and disease since customers contact items that other customers have contacted, for example, condiment packets or the hand pump. Thus, the above solutions for providing condiments to customers may facilitate the transfer of germs and bacteria between customers. This is especially problematic in restaurants as customers eat shortly after applying a condiment to their food, bringing their hands proximal to their mouths.

Providing a contactless condiment dispensing solution is challenging as the condiment must be distributed to customers in a manner that is safe for human consumption. The condiment should engage food safe components and the dispensing device should be readily cleanable to prevent contamination. Many existing condiment dispensers include several components through which the condiment flows as it is dispensed to the user. During assembly of these components, bacteria or other contamination may be inadvertently introduced into the fluid flow path at the joints between these components. Another shortcoming of existing condiment dispensers is that installation of the condiment container is often cumbersome and difficult due to the size and/or bulky nature of the condiment container.

Other contactless fluid dispensing devices, such as soap dispensers, are not designed for use with food products and are not food safe. Specifically, contactless soap dispensing devices are typically designed to only be refilled and do not need to be cleaned regularly. Thus, contactless soap dispensers are not designed to mitigate contamination and to be easily disassembled for cleaning as is required with food products. Moreover, soap fluid products are often uniform throughout, have a lower viscosity, and include fewer particles within the fluid as compared to various condiments. Additionally, the viscosity and fluid characteristics of each condiment is different, resulting in difficulties in dispensing the condiment in a controlled manner.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
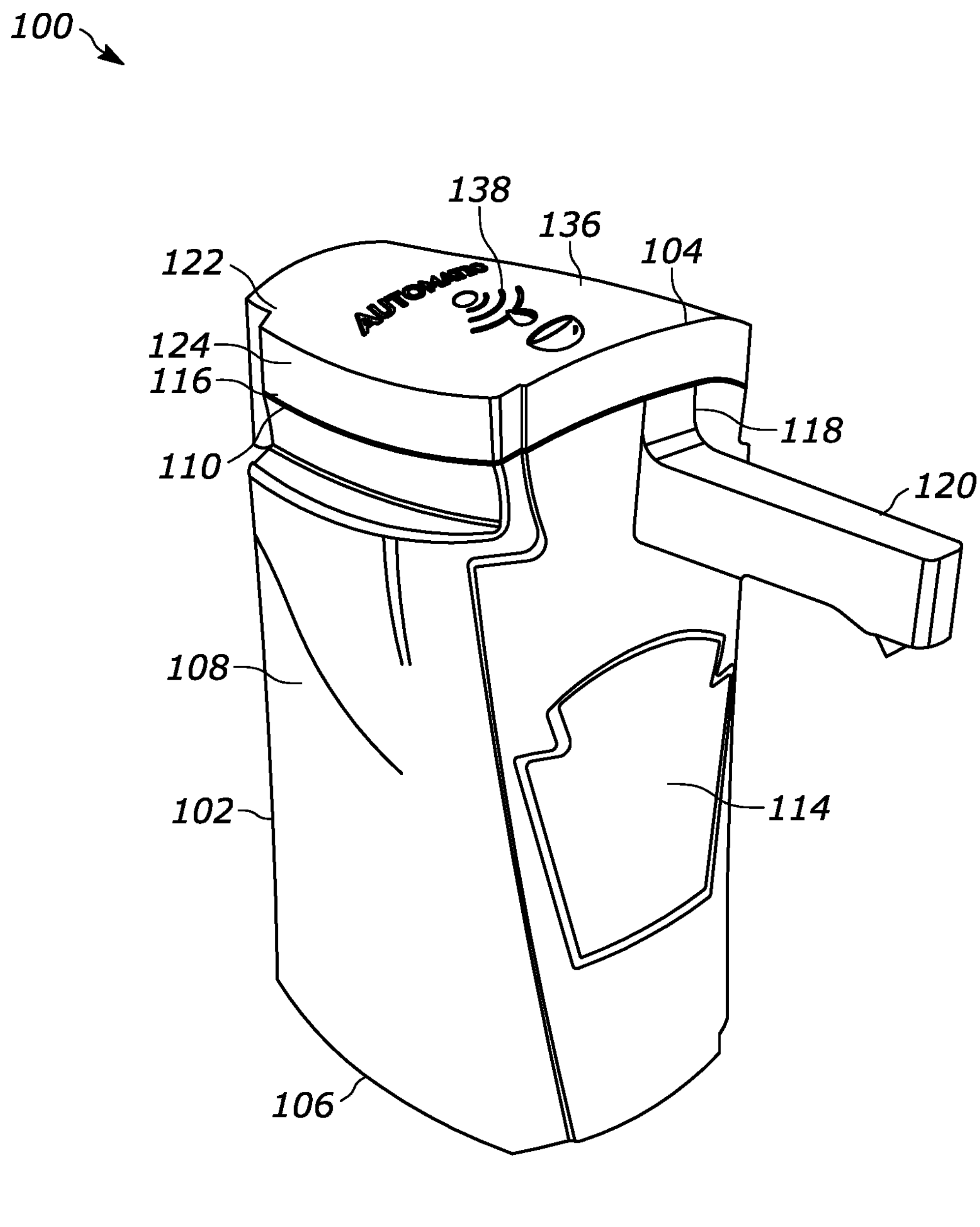
FIG. 1 is a top front perspective view of a condiment dispensing device according to a first embodiment.
Figure 2:
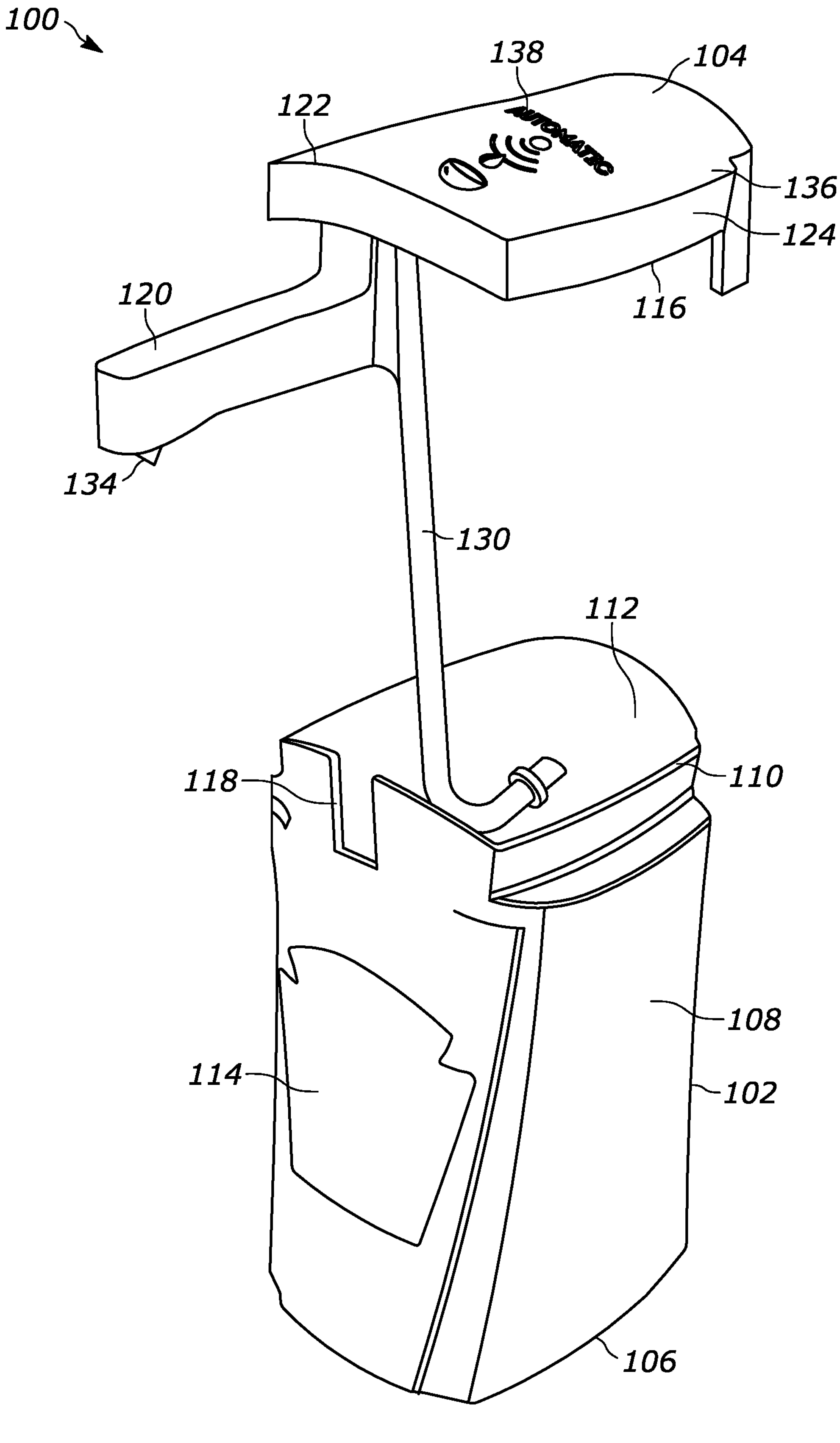
FIG. 2 is a top perspective view showing a lid of the condiment dispensing device of FIG. 1 removed from a container of the condiment dispensing device.

With respect to FIG. 1, a condiment dispensing device 100 is shown according to a first embodiment. As shown, the condiment dispensing device 100 includes a housing or container body 102 and a lid 104. With respect to FIG. 2, the lid 104 is removable from the container body 102. The lid 104 may be removed to fill or refill the condiment contained within the container body 102.

The container body 102 includes a bottom, 106, sidewalls 108 and a rim 110 about the end of the container body 102 opposite the bottom 106. The container body 102 thus defines a cavity 112 into which a fluid or other contents may be placed.

The bottom 106 of the container body 102 is designed to rest on a surface (e.g., table or countertop) to support the container body 102 and lid 104 in an upright position. In the embodiment shown, the bottom 106 is substantially rectangular with the sidewalls 108 extending substantially vertically therefrom. Thus, in one form, the container body 102 has a rectangular prism shape. In other embodiments, the container body 102 may have other shapes (e.g., cylindrical, triangular).

The sidewalls 108 of the container body 102 may include a surface for placing a label 114 that indicates the condiment within the container body 102. The label 114 may include the brand and the condiment type (e.g., ketchup, mustard, etc.) within the container body 102. The exterior of the container body 102 may have a color that corresponds to a certain condiment type. For example, red for ketchup, yellow for mustard, maroon for barbeque, cream white for mayonnaise, etc. In the embodiment shown, the container body 102 is formed of a plastic material that has been dyed to the desired color, e.g., red. In another form, the exterior of the container body 102 is covered by a sticker, plastic or paper wrap, or colored, for example, with a paint. The rim 110 of the container body 102 supports the lid 104. In the embodiment shown, the lid 104 rests on top of the rim 110. A lip 116 of the lid 104 contacts the rim 110 of the container body when the lid 104 is placed on top of the container body 102. In some embodiments, the lid 104 may include attachment features to secure the lid 104 to the container body 102. As one example, the lid 104 may clip or snap onto the container body 102. The lid 104 or container body 102 may contain a button to release the lid 104 from the container body 102.

In the embodiment shown, the rim 110 includes a notch 118 through which the spout 120 of the lid 104 extends. In other embodiments, the spout 120 of the lid 104 extends outward from the container body 102 above the rim 110, and thus the rim 110 does not include the notch 118.

The container body 102 may be formed of a plastic material. Example forms of plastic include acrylonitrile butadiene styrene (ABS).

A condiment may be disposed within the cavity 112 of the container body 102 for dispensing to a user. The condiment may be contained within a bag or a pouch. The condiment may be any condiment including, as examples, ketchup, mustard, barbeque, mayonnaise, and relish. The condiment dispensing device 100 is configured to pump and dispense any variety of condiments having a wide range of viscosities, densities, and flow rates.

With respect to FIGS. 1-4, the lid 104 includes a top cover 122, sidewalls 124, and a bottom cover 126 defining a cavity 128. The lid 104 also includes a flow path, such as tube 130, and a spout 120 extending from the sidewalls 124 of the lid 104. The spout 120 includes a sensor 132 and a dispensing opening 134. The components of the lid 104 may be formed of a plastic, such as ABS as an example. The top cover 122 of the lid includes a surface 136 which may include a label 138. The label 138 may indicate to customers that the condiment dispensing device 100 is contactless and there is no need to touch the dispensing device 100 to dispense the condiment. In another example, the label 138 displays the brand and/or condiment type to a customer. The bottom cover 126 removably attaches to the sidewalls 124 of the lid 104 to provide access to the cavity 128. The bottom cover 126 includes a hole 140 through which the tube 130 extends into the cavity 128.

Figure 3:
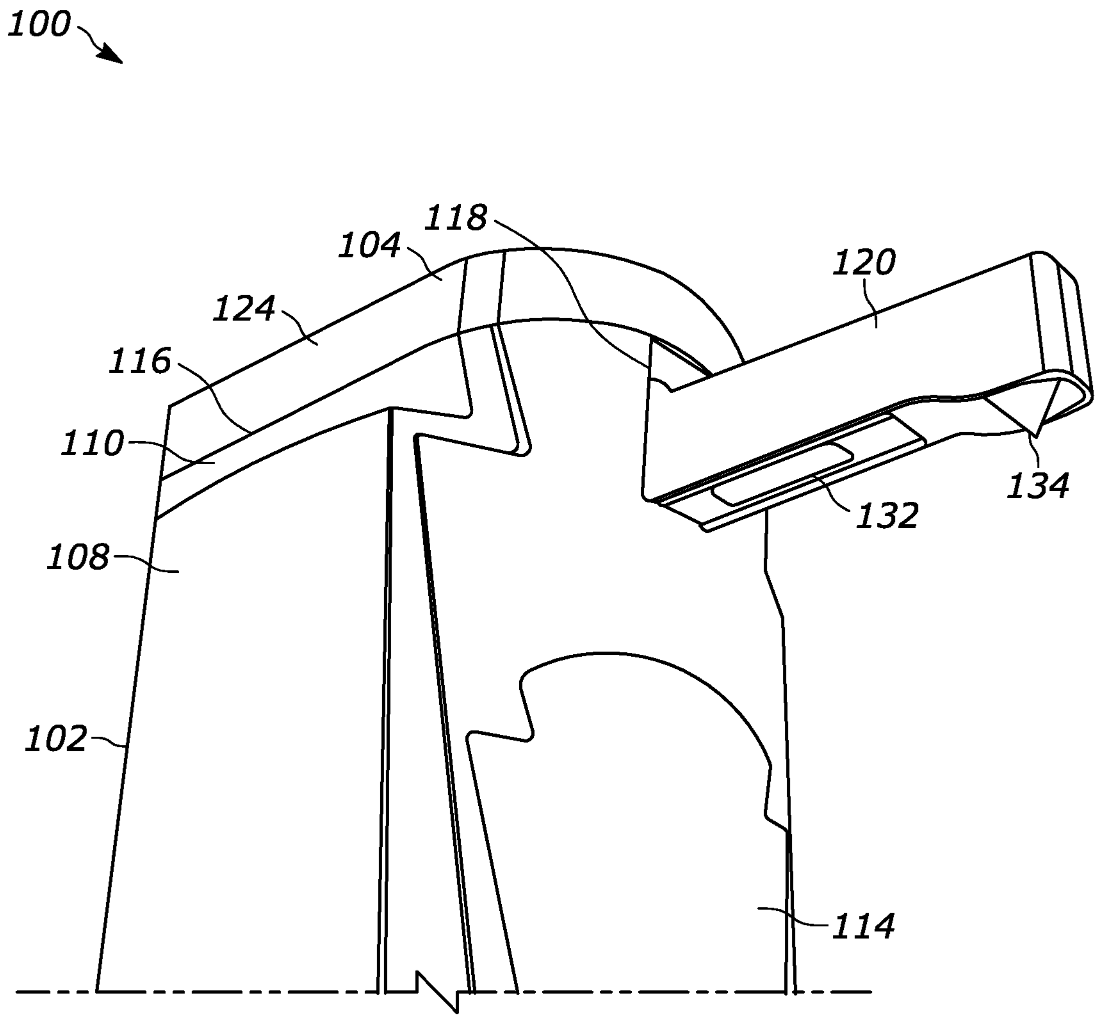
FIG. 3 is a bottom perspective view of a top portion of the condiment dispensing device of FIG. 1.
Figure 4:
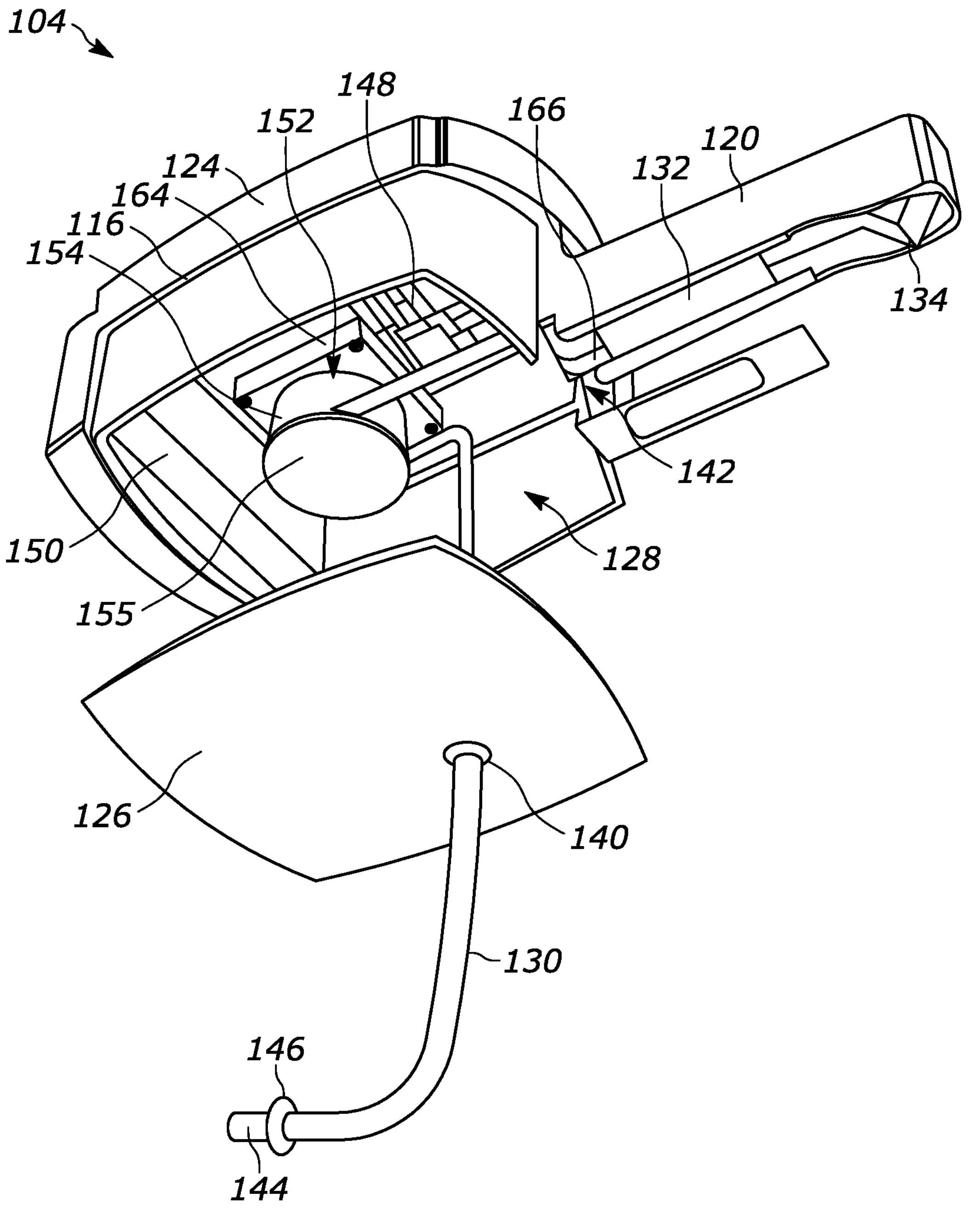
FIG. 4 is a bottom perspective view of the lid of the condiment dispensing device of FIG. 1 with a bottom cover partially removed.

With respect to FIGS. 1, 3, and 4, the spout 120 is connected to the sidewalls 124 and extends away from a sidewall 124 of the lid 104. The sidewalls 124 include a notch 142 or a hole through which the tube 130 extends out of the cavity 128 and along the spout 120 to the dispensing opening 134. The dispensing opening 134 is disposed at the end of the spout 120 and may be the opening at the outlet end of the tube 130. The dispensing opening 134 at the end of the tube 130 may be oriented downward to direct fluid being dispensed from the spout 120 downward. Having the dispensing opening 134 positioned away from the container reduces the likelihood that a customer will contact the container body 102 as they dispense the condiment. For example, spacing the dispensing opening 134 from the container body 102 provides room for a customer to position their plate underneath the dispensing opening 134 without bringing their plate into contact with the container body 102 when dispensing the condiment onto a particular portion of their plate. Reducing the likelihood of customer contact with the condiment dispensing device 100 reduces the likelihood of the transfer of germs, bacteria, and/or disease between customers.

In another form, the dispensing opening 134 may include a one-way valve through which the condiment is forced. The dispensing opening 134 at the end of the tube 130 may connect to the valve. The valve may be designed such that a force is required to pass the condiment through the valve such that as soon as the force is below a minimum threshold the condiment promptly ceases to pass through the dispensing opening 134 and the valve. This may reduce the likelihood of condiment dripping from the dispensing opening 134 and onto the surface below.

The sensor 132 may sense when to dispense the condiment. The sensor 132 may be a motion sensor for detecting when a user positioned their hand, plate, or food items below the dispensing opening 134. In one example, the sensor 132 is a passive infrared (PIR) sensor. In another example, the sensor 132 is a microwave motion sensor. The sensor 132 may detect motion below the spout 120 or the dispensing opening 134. In another example, the sensor 132 may be a proximity sensor, such as an infrared proximity sensor. The sensor 132 may detect when an object is proximal to the lower side of the spout 120 and/or the dispensing opening 134. For example, the sensor 132 may detect objects that are 2-12 inches below the spout 120. The sensor 132 is electrically coupled to the circuit board 148 of the lid 104. The sensor 132 provides a signal to the circuit board 148 indicating the motion detected and/or the proximity of an object to the sensor 132. As mentioned above, an outlet end of the tube 130 may be the dispensing opening 134 or may be connected to a dispensing valve. The tube 130 extends within the spout 120, through the notch 142 of the sidewall 124 of the lid 104 and into the cavity 128 of the lid 104. The tube 130 extends through the cavity 128, through a hole 140 in the bottom cover 126 of the lid 104, and into the cavity 112 of the container body 102. The end 144 of the tube 130 within the container body 102 may be in contact with the condiment within the container body 102. Thus, the tube 130 forms the flow path of the fluid through the condiment dispensing device 100 from the condiment pouch to the dispensing opening 134. The tube 130 may be removed and replaced with a clean tube 130 to clean the condiment dispensing device 100. The tube 130 may be cleaned and or replaced with a new tube 130. Since the tube 130 forms a substantial portion (or the entirety) of the flow path of the condiment and is the only component in contact with the condiment, the condiment dispensing device 100 may be quickly and easily cleaned without having to disassemble the pump or other components forming a portion of the condiment flow path as in other condiment dispensers.

In the embodiment shown, the inlet end 144 of the tube 130 is adapted to be inserted into a bag or pouch containing the condiment. As shown, the end 144 of the tube 130 includes an angled tip. The angled tip may aid in piercing a portion of the bag or pouch, such as a port, for insertion into the pouch. The end 144 of the tube 130 may be positioned at or near the bottom of the container body 102. This allows fluid to be drawn to the bottom portion of the bag or pouch, relying in part on gravity to empty the pouch. The tube 130 may be suitable for condiments of any variety to flow through and be formed of a flexible food-safe material such as a silicone or rubber. The tube 130 may have an internal diameter in the range of about 3-9 mm and, more particularly, in the range of about 4-6 mm. The tube 130 may have an external diameter of 4-20 mm, and more particularly, in the range of 7-9 mm. The tube 130 may have a wall thickness of about 1.5 mm enabling the tube 130 to be sufficiently compressed to pump fluid through the tube 130 via the pump 152. The tube 130 may be flexible and configured to be compressed about 20% of the outer diameter of the tube 130. To achieve suitable compressibility properties, the tube 130 may have a shore A hardness value in the range of about 55-65. The tube 130 may have a tensile strength in the range of about 9-12 μPa, and more particularly 10.5 μPa. The tube 130 may have an elongation to failure value in the range of 450-550%, and more particularly 500%. The tube 130 may have a tear strength value in the range of about 23-28 N/nm, and more particularly 26 N/nm.

The end 144 may further include a disk 146 disposed thereon that contacts the pouch or a port of the pouch upon insertion of the end 144 into the pouch. The disk 146 may limit how far the end 144 of the tube 130 may be inserted into the pouch containing the condiment. The disk 146 may aid to prevent the condiment from exiting the pouch along the exterior of the tube 130. In some forms, the disk 146 may be used to seal the hole in the pouch containing the condiment or a port thereof so that a vacuum may be formed within the pouch when withdrawing the condiment via the tube 130. In another example, the end 144 of the tube 130 and/or the disk 146 may be inserted into a port on the pouch containing the condiment. The disk 146 may engage the port to lock the disk 146 to the port. In yet another example, the end 144 of the tube 130 is inserted into an end of a bag piercing device configured to engage a port of the condiment pouch. The end of the tube 140 may be inserted into a tubular opening of the bag piercing device and be held by a friction fit. Forming a vacuum within the pouch may aid in withdrawing a greater amount of the condiment from the pouch, such that the amount of condiment within the pouch at the time the condiment pouch is replaced is minimized.

Figure 5:
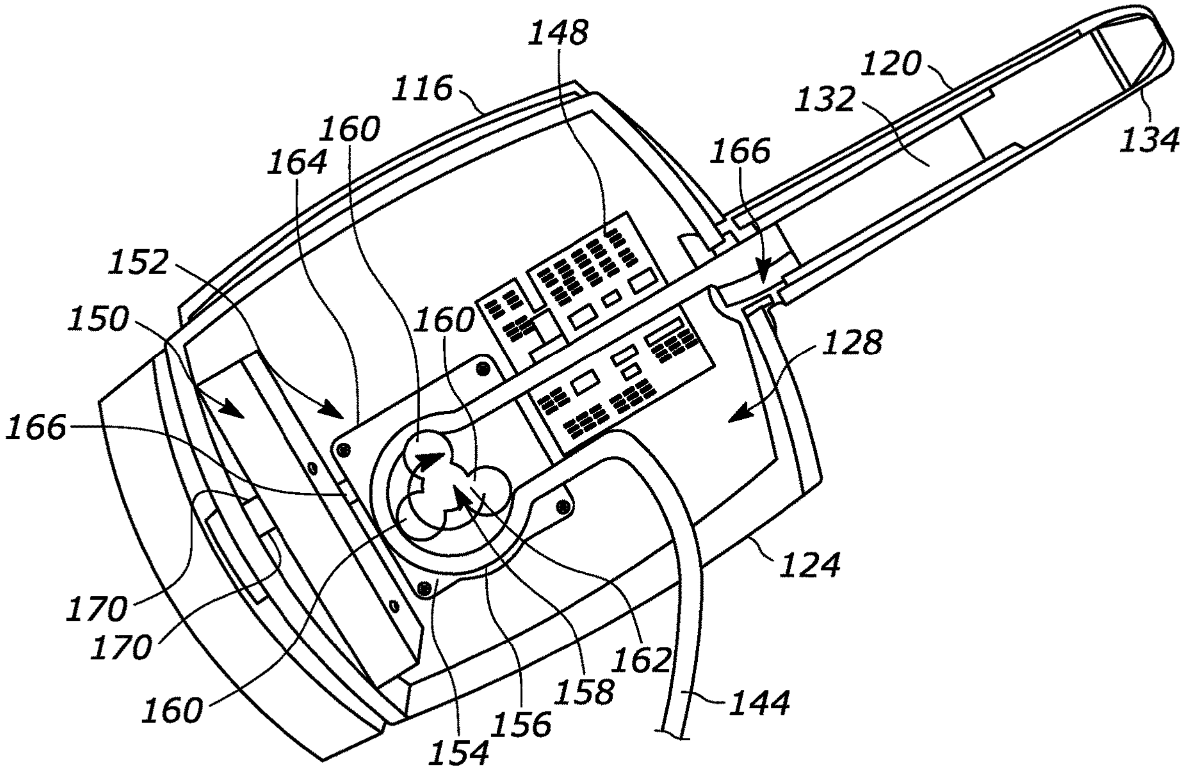
FIG. 5 is bottom perspective view of the lid of the condiment dispensing device of FIG. 1 with the bottom cover fully removed.

With respect to FIGS. 4 and 5, the cavity 128 of the lid 104 may include a portion of the tube 130, a circuit board 148, a battery 150, and a pump 152. The tube 130 extends from the notch 142 of the lid 104, through a pump housing 154 of the pump 152, and through the hole 140 in the bottom cover 126 to the container body 102. With respect to FIG. 5, a cover 155 of the pump housing 154 has been removed. The pump 152 is a peristaltic pump. The tube 130 is positioned in a loop 156 about the perimeter of the pump housing 154. The tube 130 may be a flexible tubing, for example, a silicone rubber tubing. The pump housing 154 may include a groove or track corresponding to the loop 156 of the tube 156. The loop 156 of the tube 130 may be positioned within the groove or track of the pump housing 154. A roller 158 is positioned within the loop 156. The roller 158 includes a plurality of rounded arms 160 extending from a central body 162 of the roller 158. The rounded arms 160 may be or include wheels or rollers that engage the tube 130 of the loop 156. The roller 158 may be attached to an electric motor 164 at the central body 162 that rotates the roller 158 about its axis. The roller 158 may be made of a plastic. In operation, the electric motor 164 rotates the roller 158 bringing the rounded arms 160 into contact with the tube 130. As the rounded arms 160 are brought into contact with the tube 130, the rounded arms 160 pinch or compress the tube 130 against the pump housing 154. As the rounded arms 160 are rotated by the electric motor 164, the rounded arms 160 are moved along the tube 130, continuing to pinch the tube 130 against the pump housing 154. The movement of the rounded arms 160 along the tube 130 thus forces fluid (e.g., air or condiment) along the length of the tube in the direction of the movement of the rounded arm 160. This also creates a vacuum in the portion of the tube behind the rounded arm 160 drawing the fluid along the tube 130 in the direction of travel of the rounded arm 160. The rounded arms 160 may include a wheel that engages and rolls along the tube 130 as the rounded arm 160 moves along the tube to reduce the frictional resistance between the roller 158 and the tube 130. Using a peristaltic pump to dispense the condiment, the pump 152 does not need to come into direct contact with the condiment as the pump 152 only contacts the outer surface of the tube 130 and does not contact the condiment when dispensing the condiment.

The electric motor 164 may be a servo motor. This may be desired where a precise amount of the condiment is to be dispensed. The motor 164 may rotate the roller 158 a certain rotation (e.g., 180 or 360 degrees) that corresponds to a certain amount of the condiment being dispensed (e.g., 30 grams). The amount of fluid that is dispensed per rotation depends on the internal diameter of the tube 130, the size of the loop 156 of the tube 130 within the pump housing 154, the type of fluid within the tube 130, the size of the roller 158 and the rounded arms 160, and the amount of force the rounded arms 160 apply to the tube 130 of the loop 156. The pump 152 and the tube 130 may be configured such that the pump 152 is able to dispense a wide variety of condiments at a suitable flow rate. As one example, the loop 156 may have a diameter in the range of 20-50 mm. The rounded arms 160 of the roller 158 extend from the center point of the roller 158 to the loop 156 to compress the tube 130 of the loop 156 such that the inner diameter of the tube 130 is reduced by 20-90% when contacted by the rounded arms 160. According to this configuration, the condiment dispensing device 100 may pump and dispense a wide variety of condiments at an acceptable flow rate. In some embodiments, the speed of the pump 152 is adjusted based on the condiment type to dispense each condiment at approximately the same flow rate. The pump may dispense the condiments at a flow rate in the range of approximately 3-10 grams per second.

In one example, the pump 152 is configured to be powered by a 6V, 12V, or 24V DC power source. The pump 152 may receive electrical power from the battery 150 or from a power conditioning circuit of the circuit board 148. The pump 152 is configured to pump fluid through the tube 130 at varying flow rates, depending on the speed of the electric motor 164 and the inner diameter of the tube 130. As an example, where the inner diameter of the tube 130 is four millimeters, the pump 152 moves fluid through the tube 130 at a flow rate of up to about 150 mL/minute. As another example, where the inner diameter of the tube 130 is two millimeters, the pump 152 moves fluid through the tube 130 at a flow rate of up to about 50 mL/minute.

The circuit board 148 may be or include a controller, such as a microcontroller or processor. The circuit board 148 may be electrically coupled to the sensor 13Z the electric motor 164, and the battery 150. The circuit board 148, the sensor 132, and/or the pump 152 may receive power from the battery 150. The battery 150 may be a rechargeable battery such as lithium-ion battery. In other embodiments, other battery types may be used, for example, standard household battery cells (e.g., AA, C, D batteries). The circuit board 148 may be electrically coupled to the sensor 132 via wires or a ribbon 166 that extends from the circuit board 148, through the notch 142 in the sidewall 124 of the lid 104, and along the spout 120 to the sensor 132. The circuit board 148 may provide electrical power to the sensor 132 via the ribbon 166. The sensor 132 may also communicate with the circuit board 148 via the ribbon. For example, the sensor 132 may provide signals to the circuit board 148 indicating whether motion is detected or whether an object is proximal to the sensor 132. The sensor 132 may continuously provide sensor data to the circuit board 148 for processing and analysis. In another example, the sensor 132 only provides a signal to the circuit board 148 when motion is detected or when an object is detected to be proximal to the sensor 132.

Upon receiving a signal from the sensor 132 indicating that motion is detected or an object is proximal to the sensor 132, the controller of the circuit board 148 may determine whether to actuate the pump 152 to dispense the condiment. In one example, the controller actuates the pump 152 upon receiving communication from the sensor 132 indicating motion has been detected or an object is proximal to the sensor 132. In another example, the controller processes the communication to determine the length of time for which motion is detected or that an object has been proximal to the sensor 132. For example, the controller may be configured to monitor the motion signals for a certain period of time before dispensing the condiment, for example, for one or two seconds. Requiring a detection of motion for a certain minimum period of time may reduce the likelihood that condiment is dispensed when a user is not ready or when the sensor 132 detects movement that is not meant to request fluid be dispensed. Similarly, where the sensor 132 is a proximity sensor, the controller may be configured to dispense the condiment only after the object has been proximal to the sensor 132 for a minimum period of time.

The controller may be configured to delay the dispensing of the fluid for a certain period of time after determining that a user desires the condiment be dispensed (e.g., user motion or proximity). The controller may wait one or two seconds, for example, before operating the pump 152 to dispense the condiment. This allows time for the user to position their container, plate, or food item underneath the dispensing opening 134 before the condiment is dispensed. This may reduce the dispensing of fluid when a user is not ready, which may result in the condiment being dispensed on the surface on which the container rests or where not desired by the user. The condiment dispensing device 100 may indicate to the user when the condiment is going to be dispensed. This may be done, for example, by using an indicator light disposed on the spout or another portion of the condiment dispensing device 100. The indicator light may, for instance, turn green when the condiment dispensing device 100 has detected the user desires the condiment and is going to dispense, allowing the user to position their container or food item accordingly.

When the controller actuates the pump 152, the controller may send a signal to the electric motor 164 to operate. The electric motor 164 rotates the roller 158 bringing the rounded arms 160 into contact with the tube 130 and forcing the condiment through the tube 130 and out of the dispensing opening 134. The controller may provide a signal to the electric motor 164 until the desired amount of condiment has been dispensed. In other embodiments, the controller sends a signal indicating how long to operate at a certain speed. Where the electric motor 164 is a servo motor, the controller may provide a signal indicating how far to rotate or to what position to rotate to. The controller may be programmed to operate the electric motor 164 based on the condiment being dispensed. The controller may be programmed with a different setting for each condiment. For example, the controller may operate the motor 164 at different speeds for each condiment to provide a suitable flow rate. As another example, the motor 164 may be rotated farther for certain condiments. This may be done to accommodate the varying viscosities and densities of the condiments. This may also be done to dispense a certain amount of the condiment in a period of time. For instance, the condiment dispensing device 100 may dispense 30 grams of condiment over a five second period of time. The electric motor 164 may be operated to achieve this dispensing rate based on the fluid properties of the condiment.

In some forms, the lid 104 includes a user interface, such as one or more buttons, disposed thereon that a user may input the condiment type inserted into the container body 102. The user interface may be in communication with the circuit board 148 and provide a signal to the circuit board 148 indicating the type of condiment. The electric motor 164 may then be operated by the controller accordingly.

Once the electric motor 164 has forced a certain amount of condiment out the dispensing opening 134 of the spout 120, the controller and/or the electric motor 164 may cease operation, causing fluid to no longer be dispensed. In one embodiment, the controller signals the electric motor 164 to operate in a reverse direction after the desired amount of condiment has been dispensed. This causes prompt cessation of the condiment from being dispensed and may draw the condiment further inside the tube 130 away from the dispensing opening 134 which may reduce dripping of the condiment out of the dispensing opening 134.

The controller may be configured to delay dispensing for a period of time after a dispensing cycle. This allows the user to move their plate, container, or food item out of the range of the sensor 132 before dispensing another dose of the condiment. If the sensor 132 detects that a user continues to desire more condiment (e.g., their plate, container, or food remain under the sensor 132), the controller may delay dispensing the condiment for a period of time to ensure the user has had time to move away from the sensor 132. The controller may delay for a certain period of time, for example, one, two, or three seconds before dispensing another dose of the condiment. This provides adequate time for a user to withdraw their plate, container, or food item from the range of the sensor 132 if they no longer desire additional condiment. This reduces the likelihood that the controller will cause condiment to be dispensed after a user has pulled their plate, container, or food item away from the dispending end 134.

In other embodiments, the controller is configured to continue dispensing the condiment until the sensor no longer detects the user's presence (e.g., their plate, container, or food item) under the sensor 132. The controller may be configured to immediately cease dispensing upon a determination that the user is pulling their plate, container, or food item away from the dispensing end 134.

The condiment dispensing device 100 may include a microphone coupled to the controller for receiving a user's oral command to dispense. The condiment dispensing device 100 may dispense the condiment to the user upon a determination that the user has said a trigger word, such as "dispense" for example. The condiment dispensing device 100 may dispense a dose of the condiment before ceasing to dispense the condiment. In another example, the condiment dispensing device 100 may dispense the condiment until the user says another trigger word, such as "stop" for example. Upon a determination, for example by the controller, that the user has said "stop," the controller may cause the pump 152 to cease dispensing the condiment.

Figure 6:
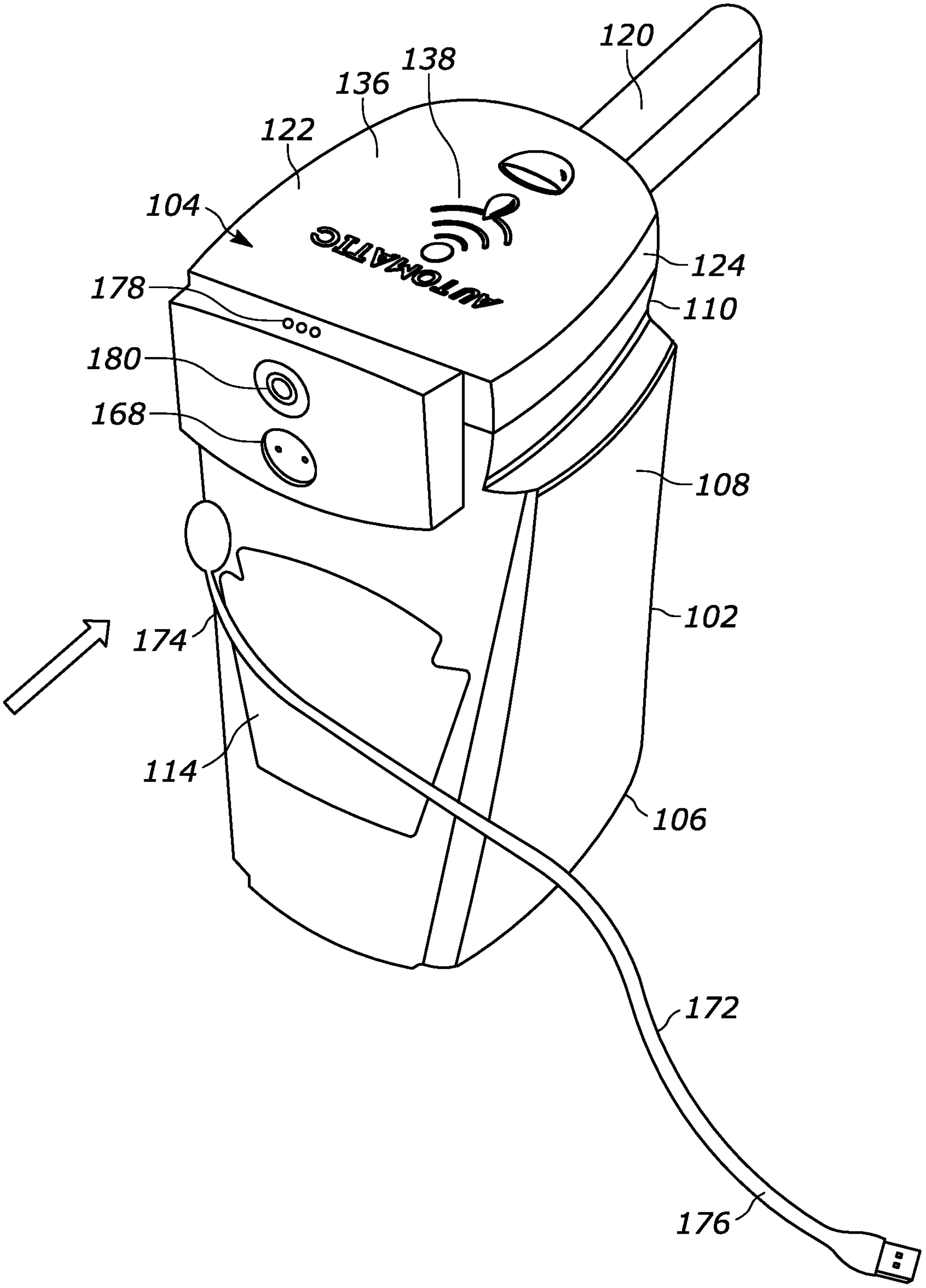
FIG. 6 is a rear perspective view of the condiment dispensing device of FIG. 1 shown with a charging cable.

The battery 150 is mounted to the lid 104 and electrically powers the electrical components of the lid 104. The battery 150 may be electrically coupled to the other electrical components by a wire or a ribbon 166. The battery 150 is rechargeable via a recharging port 168 on the rear of the lid 104. The battery 150 is connected to the recharging port 168 via wires 170. As shown in FIG. 6, a charging cord 172 may include a first end 174 configured to be connected to or plugged into the recharging port 168 to recharge battery 150 within the lid 104. The second end 176 of the charging cord 172 may be configured for insertion into a power source. As shown, the second end 176 of the charging cord 172 is a USB. The second end 176 may be inserted into a USB port to provide electrical power to the battery 150 to recharge the battery 150. In other embodiments, the battery 150 is comprised of one or more replaceable standard batteries (e.g., four AA batteries). The replaceable batteries may be removed and replaced with new batteries. In some forms, the batteries that are removed may be recharged via a battery charger. In yet other embodiments, the lid 104 includes a power cord that may be inserted into a standard wall outlet to provide power to the lid 104. The lid 104 may include power conditioning circuitry to provide the proper electrical power to the electronics in the lid 104.

Each condiment dispensing container 100 may include two or more lids 104. Using multiple lids 104 allows one lid 104 to be in use with the container body 102 to dispense condiment and the other lids to be charging or charged and ready to replace the lid 104 in use with the container body 102 when the charge of the battery 150 is too low. Each lid 104 may include an indicator 178 that indicates to a user or employee the charge level of the battery 150 of the lid 104. As shown in FIG. 6, the lid 104 includes a row of three LEDs disposed along the rear edge of the top of the lid 104. The LEDs may be used to indicate the charge level of the battery 150 to the user in different ways. In one example, when all three LEDs are illuminated, the battery charge is high; when two of the three LEDs are illuminated, the battery charge level is medium; and when only one of the LEDs are illuminated, the battery charge level is low. If the LEDs are off or flashing, this may indicate that the battery needs to be recharged or the lid 104 needs to be replaced. In another example, the LEDs are multi-colored LEDs. The LEDs may display a green light when battery is fully charged, an orange light when the battery level is low, and a red light when the battery has no charge and needs to be replaced. In another embodiment, the indicator 178 may be a display screen, such as a liquid crystal display (LCD) that indicates the charge level of the battery 150.

The indicator 178 may also indicate one or more aspects of the condiment dispensing container to a user. For example, the controller may determine the level of the condiment left within the container body 102 and display the amount via the indicator. In one example, the controller displays via the indicator 178 when the condiment level is low. In another embodiment, the indicator 178 is used to display when one or more components of the condiment dispensing container 100 is not functioning properly, e.g., the pump 152 or sensor is not working.

The indicator 178 may also include communication circuitry configured to communicate with one or more remote devices. The communication circuitry may be configured to communicate via direct wireless signals, for example, Bluetooth, Zigbee, and/or Z-Wave. Additionally or alternatively, the communication circuitry may communicate via a network, for example, via Cellular or Wi-Fi networks. In this embodiment, the indicator 178 may communicate to a computer of a restaurant or employee that the condiment level of the condiment dispensing container 100 is low or that the battery 150 charge level of a condiment dispensing container 100 is low and needs to be recharged or replaced.

As shown in FIG. 6, the lid 104 may further include power button 180 for turning the lid 104 on and off. When the lid 104 is on, the controller may operate the pump 152 to dispense condiment in response to the detection by the sensor 132. When the lid 104 is off, the controller may not be powered and the condiment dispensing container 100 may not dispense condiment.

In operation, the inlet end 144 of the tube 130 may be inserted into a pouch or a port thereof containing condiment. The pouch may be inserted into the container body 102. The lid 104 may be placed on the rim 110 of the container body 104 with the spout 120 aligned with the notch 118. The power button 180 may be pressed to turn the condiment dispensing device 100 on. A user may then position a plate, container, or food item below the dispensing opening 134 of the spout 120. The sensor 132 sends a signal to the circuit board 148 indicating that condiment should be dispensed. The circuit board 148, via the controller, communicates with the electric motor 164 of the pump 152 to cause the electric motor 164 to rotate. The rotation of the electric motor causes the roller 158 to rotate and brings the rounded arms 160 into contact with the tube 130 of the loop 156. As the rounded arms 160 travel along the tube 130 of the loop 156, the rounded arms 160 force fluid (e.g., air or condiment) along the tube 130 toward the dispensing opening 134. Movement of the fluid toward the dispensing opening 134 of the tube 134 creates a vacuum within the tube 130, drawing fluid from the condiment pouch and toward the pump housing 154. Thus, condiment is withdrawn from the condiment pouch and dispensed to the user via the dispensing opening 134. The circuit board 148 may operate the motor 164 at a certain speed for a certain period of time to dispense a certain amount of condiment to the user. After the period of time, the circuit board 148 ceases the operation of the electric motor 164. Even when the electric motor 164 is not being operated, the rounded arms 160 remain engaged with the tube 130 of the loop 156 holding the condiment in its position within the tube 130. This prevents the condiment from both exiting the dispensing opening 134 and from returning into the condiment pouch.

After a period of use, the condiment dispensing device 100 may need to be cleaned. To clean the condiment dispensing device 100, the condiment dispensing device 100 may be powered off by pressing the power button 180. This prevents the condiment dispensing device 100 from dispensing condiment via the dispensing opening 134 in response to a signal from the sensor 13Z if any condiment remains to be dispensed. The lid 104 may be removed from the container body 102. The end 144 of the tube 130 may be removed from the condiment pouch. The condiment pouch may be disposed or cleaned to be refilled. The bottom cover 126 of the lid 104 may be removed, withdrawing the end 140 of the tube 130 through the hole 140. The cover 155 of the pump housing 154 may be removed. The tube 130 may be removed from the pump housing 154 by pulling the loop 156 of the tube 130 from the roller 158. The tube 130 may be withdrawn from the spout 120. The tube 130 may then be cleaned and/or replaced with a clean tube 130. The tube 130 may be made of a clear or partially see-through material which may aid in determining when the inside of the tube 130 is clean. The condiment dispensing device 100 may be reassembled with the clean tube 130 by reversing the disassembly steps.

With reference to FIGS. 7A-9E, a condiment dispensing container 200 according to a second embodiment is shown. The condiment dispensing container 200 may include many of the same and/or similar internal components of the condiment dispensing container 100 for dispensing the condiment that operate similar to the first embodiment discussed above, but arranged in a different manner as described below.

Figure 7A:
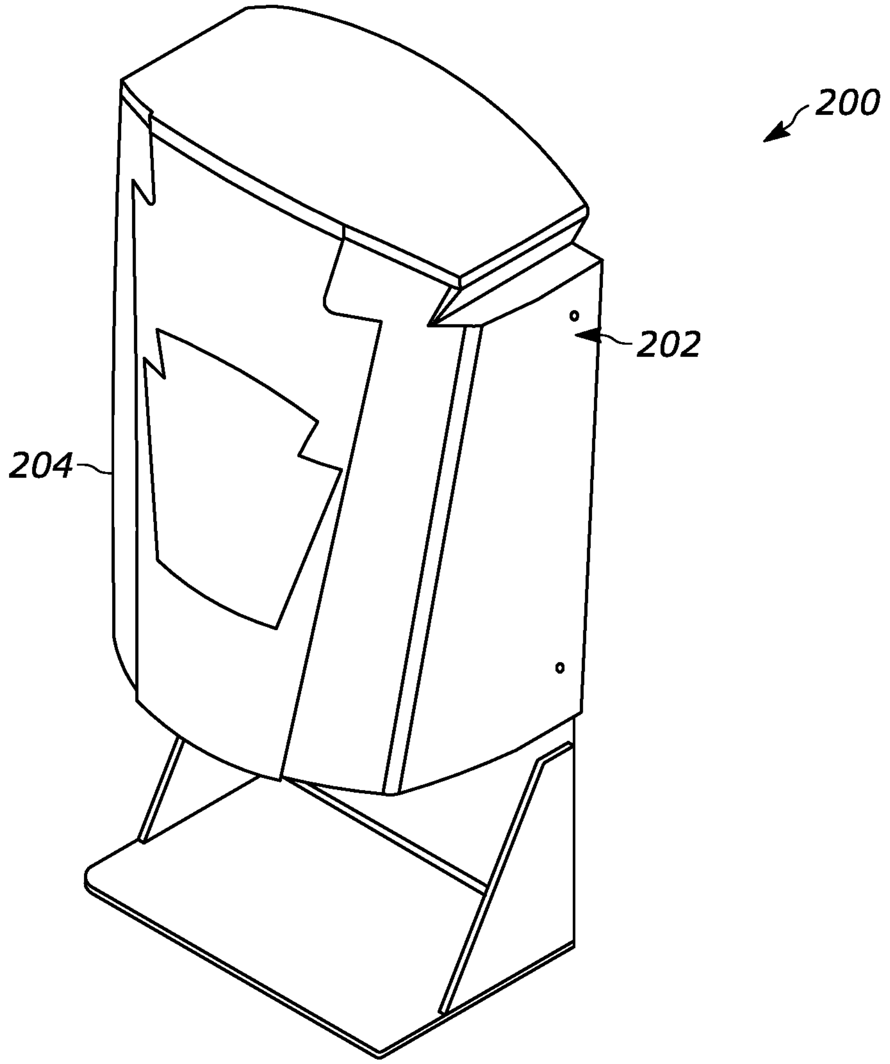
FIG. 7A is a front perspective view of a condiment dispensing device according to a second embodiment.
Figure 7B:
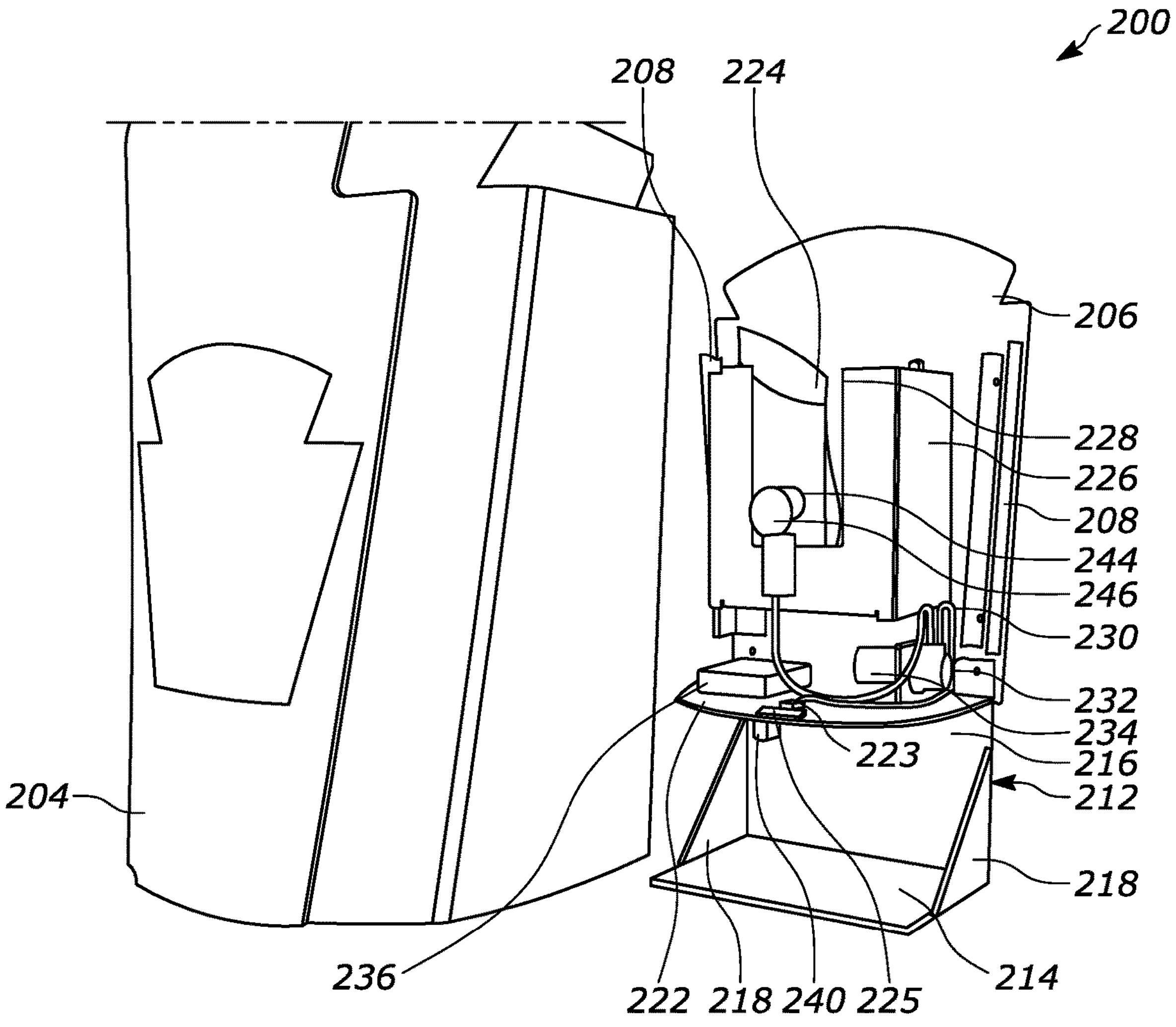
FIG. 7B is a front perspective view of the condiment dispensing device of FIG. 7A shown with a front cover removed.
Figure 8:
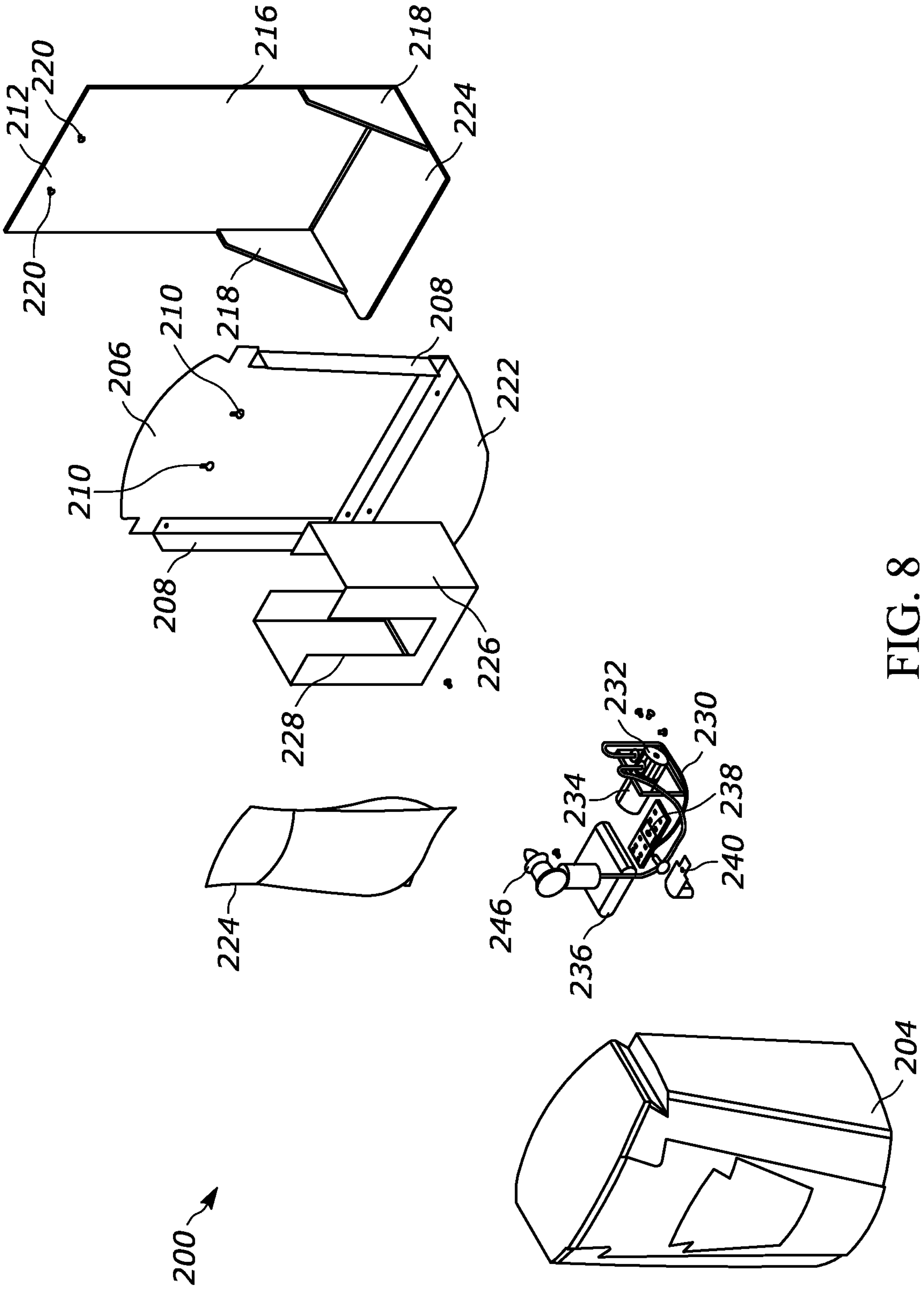
FIG. 8 is an exploded view of the condiment dispensing device of FIG. 7A.
Figure 9B:
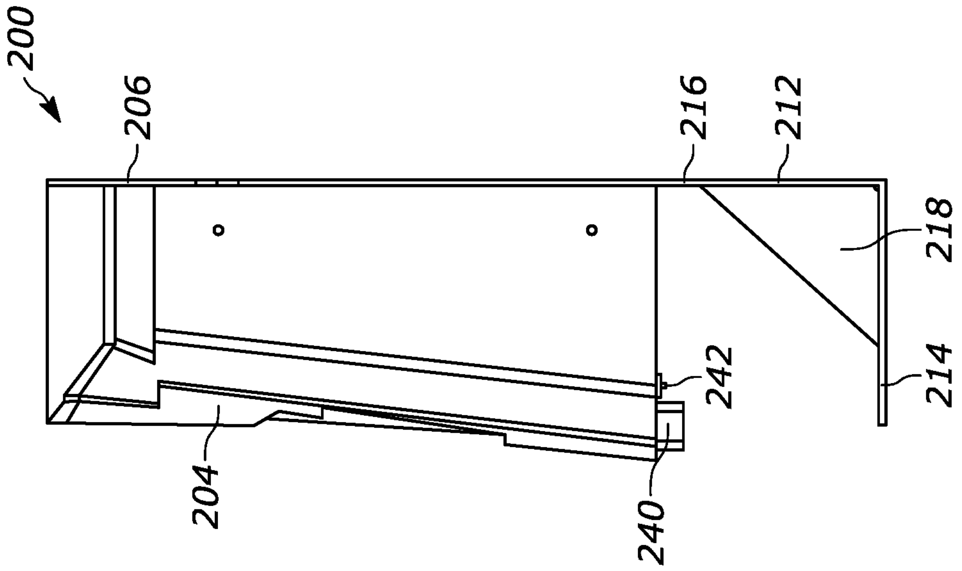
FIGS. 9A-B are front and side views, respectively, of the condiment dispensing device of FIG. 7A.
Figure 9A:
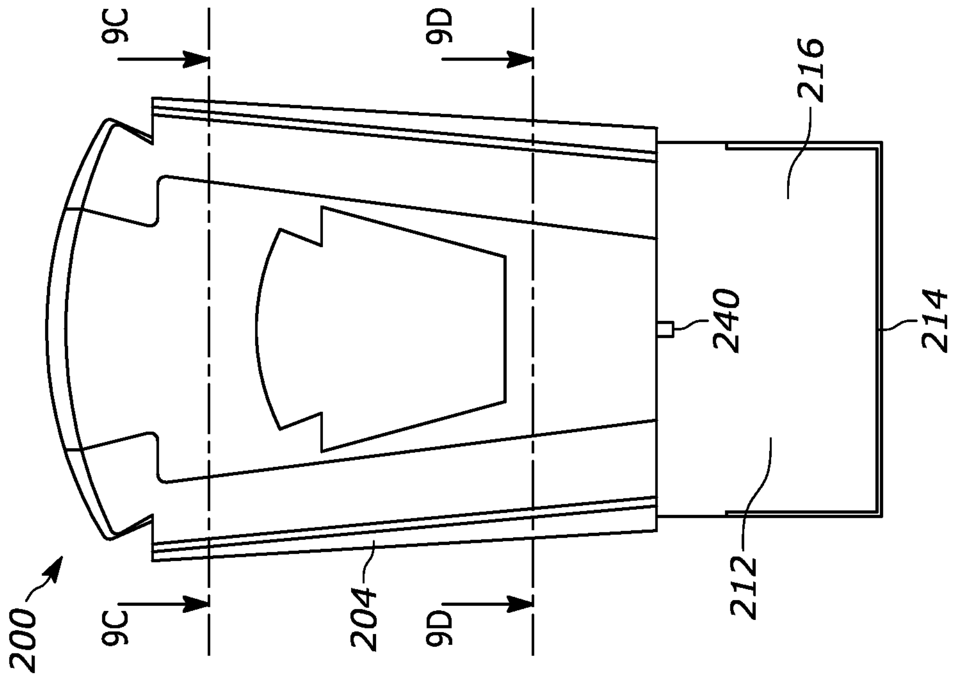
Figure 9D:
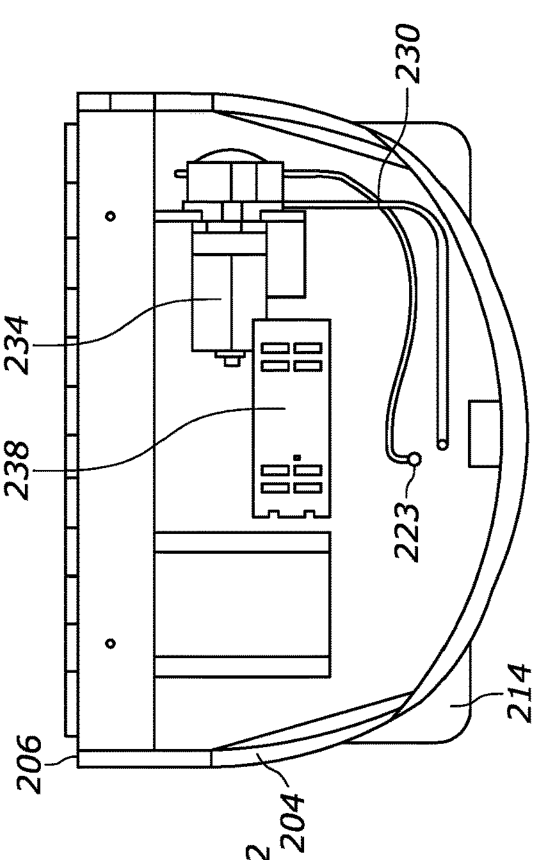
FIG. 9D is a cross-section view of the condiment dispensing device of FIG. 7A taken along lines D-D of FIG. 9A.
Figure 9C:
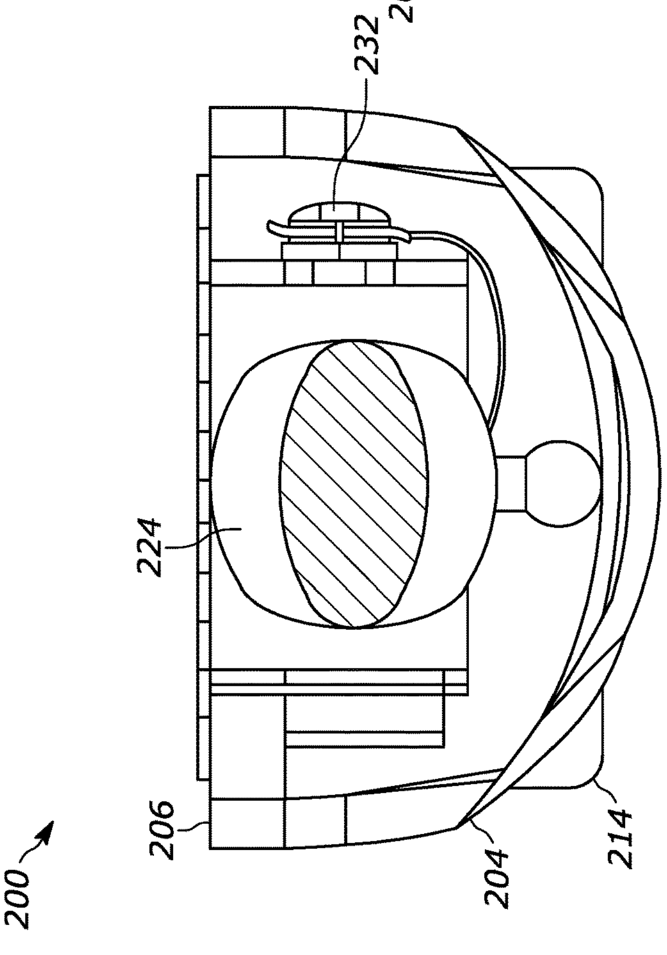
FIG. 9C is a cross-section view of the condiment dispensing device of FIG. 7A taken along lines C-C of FIG. 9A.
Figure 9E:
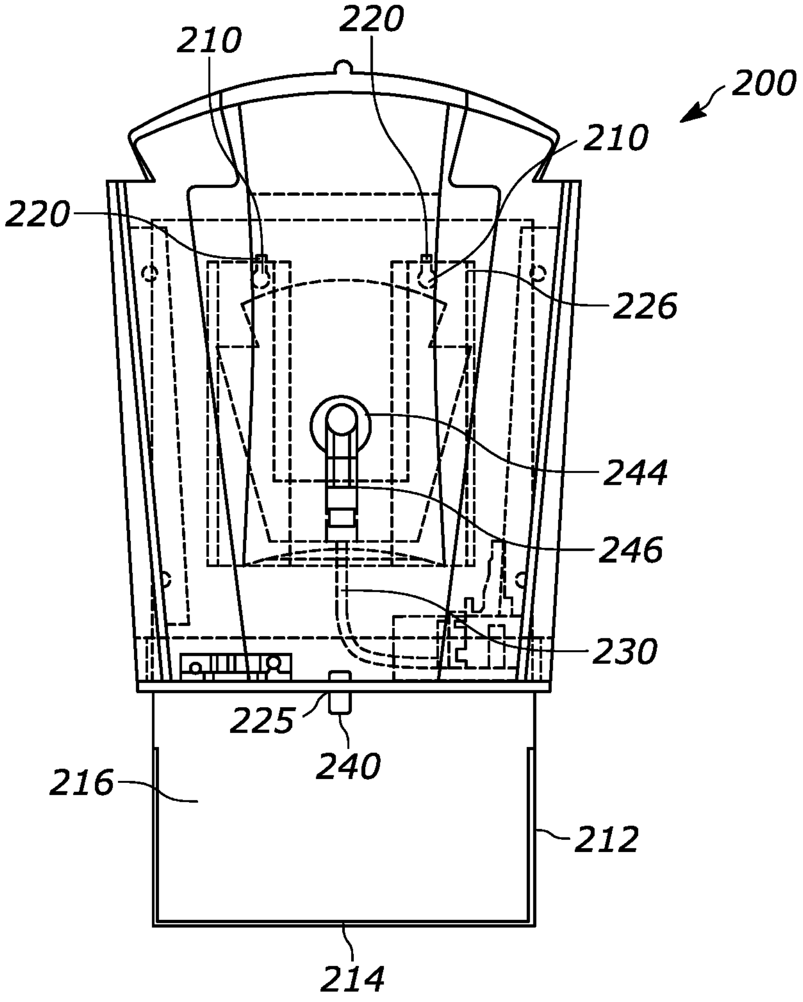
FIG. 9E is a partially see-through front elevation view of the condiment dispensing device of FIG. 7A.

With reference to FIGS. 7A-8, the condiment dispensing container 200 includes a container body 202 formed of a front cover 204 and a rear cover 206. The front cover 204 may be formed of a plastic, such as a rigid plastic like high impact polystyrene sheet (HIPS) or styrene. The rear cover 206 may be formed of a metal, such as steel or aluminum as examples. The front cover 204 may be removeable from the rear cover 206 to access the components housed within the container body 202, for example, to refill the condiment. The front cover 204 may snap onto the rear cover 206, for example by snapping onto the flanges 208 of the rear cover 206. The front cover 204 may be attached by a fastener near the bottom of the front cover and be releasable connected to the rear cover at the top portion of the front cover 204 such that the front cover 204 may be rotated away front the rear cover 206 to provide access to the interior of the container body 202. In another example, the front cover 204 may be attached to the rear cover 206 by a fastener near the top and bottom portion of the front cover.

The front cover 204 includes a surface for displaying a label or otherwise indicating the condiment within the condiment dispensing container 200 to the user.

The rear cover 206 includes keyhole slots 210 in a vertical wall 216 for mounting the rear cover 206 to a surface. In one form, the rear cover 206 may be mounted to a wall via the keyhole slots 210. For example, fasteners, such as screws, may extend from a wall. The keyhole slots 210 may engage the fasteners to removably attach the rear cover 206 to the wall. In another form, the rear cover 206 may be mounted to a stand 212. The stand 212 may be formed of a metal, such as steel or aluminum as examples. The stand 212 includes a base 214 and a vertical wall 216 extending substantially perpendicularly from an end of the base 214. The stand 212 may include supports 218 extending from the base 214 to the vertical wall 216 to provide additional strength and stability to the connection between the base 214 and the vertical wall 216.

The vertical wall 216 of the stand 212 includes projections 220 corresponding to the keyhole slots 210 of the rear cover of the container body 202. The keyhole slots 210 may receive the projections 220 of the vertical wall 216 to attach the rear cover 206 to the stand 212.

The rear cover 206 further includes a base portion 222 which extends perpendicularly from the lower end of the vertical wall 216 of the rear cover 206. The base portion 222 may support the contents housed within the container 200. The base portion 222 may include a dispensing hole 223 and a hole 225. When mounted to a wall or the stand 212, the base portion 222 is positioned above a horizontal surface (e.g., the base 214 of the stand, the floor, or countertop) such that a container or food item may be positioned between the base portion 222 and the horizontal surface. This enables the condiment to be dispensed from the bottom of the container body 202.

The condiment dispensing container 200 may include a bag or a pouch 224 containing the condiment. The pouch 224 may be formed of a plastic, for example, a multi-layer laminate including one or more layers of polyethylene terephthalate (PET). The pouch 224 may be positioned within a pouch holder 226. The pouch holder 226 may be formed of a plastic, for example, polycarbonate, HIPS, or styrene. The pouch holder 226 may be attached to the vertical wall 216 of the rear cover 206. The pouch holder 226 keeps the pouch 224 upright within the condiment dispensing container 200. The pouch holder 226 includes a cutout portion 228 through which a tube 230 may be connected to the pouch 224. The tube 230 may be suitable for condiments of any variety to flow through and may be formed of a flexible food-safe material such as silicone, rubber. The tube 230 may have an internal diameter of 3-5 mm and an external diameter of 4-8 mm. The tube 230 may be connected to the pouch 224 as described in regard to the condiment dispensing container 100 above. As with the condiment dispensing container 100, the condiment dispensing container 200 may include a pump 232 including an electric motor 234, a battery 236, a circuit board 238 including a controller, and a sensor 240. Each of these components may be mounted to the base portion 222 of the rear cover 206. The sensor 240 may be positioned to extend through hole 225 of the base portion 222 of the rear cover 206 to sense movement or proximity below the base portion 222 of the rear cover 206. The components may operate in a manner similar to that described in regard to the corresponding components of the condiment dispensing container 100. For example, the battery 236 provides electrical power to the electric components. The circuit board 238, upon receiving a signal from the sensor 240 indicating to dispense the condiment, operates the pump 232 to force the condiment through the tube 230 and out a dispensing end 242.

Figure 10A:
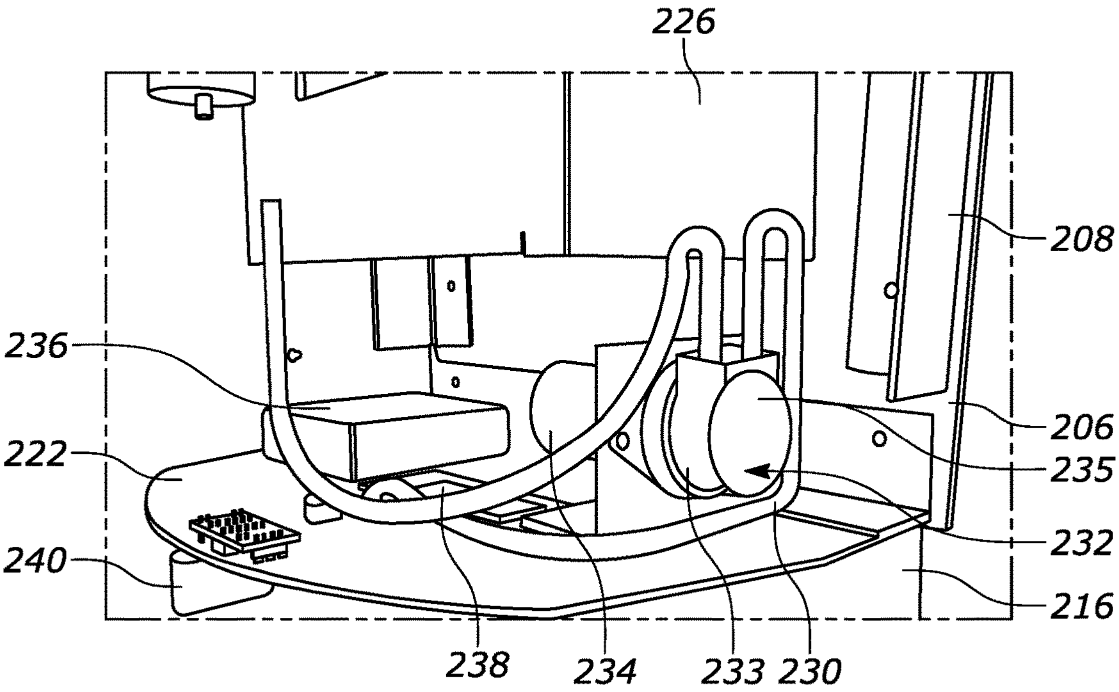
FIG. 10A is a front perspective view of a portion of the condiment dispensing device of FIG. 7A shown without the front cover.
Figure 10B:
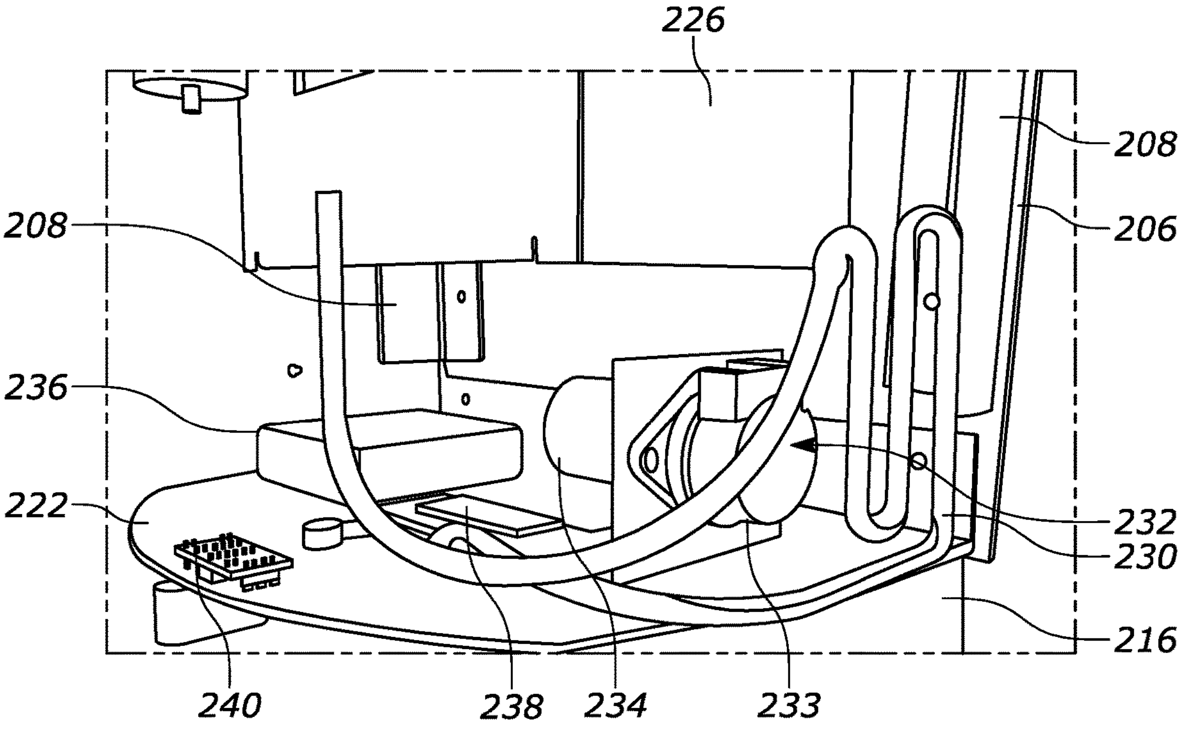
FIG. 10B is a front perspective view similar to FIG. 10A with a cover of the pump and a tube removed.
Figure 11:
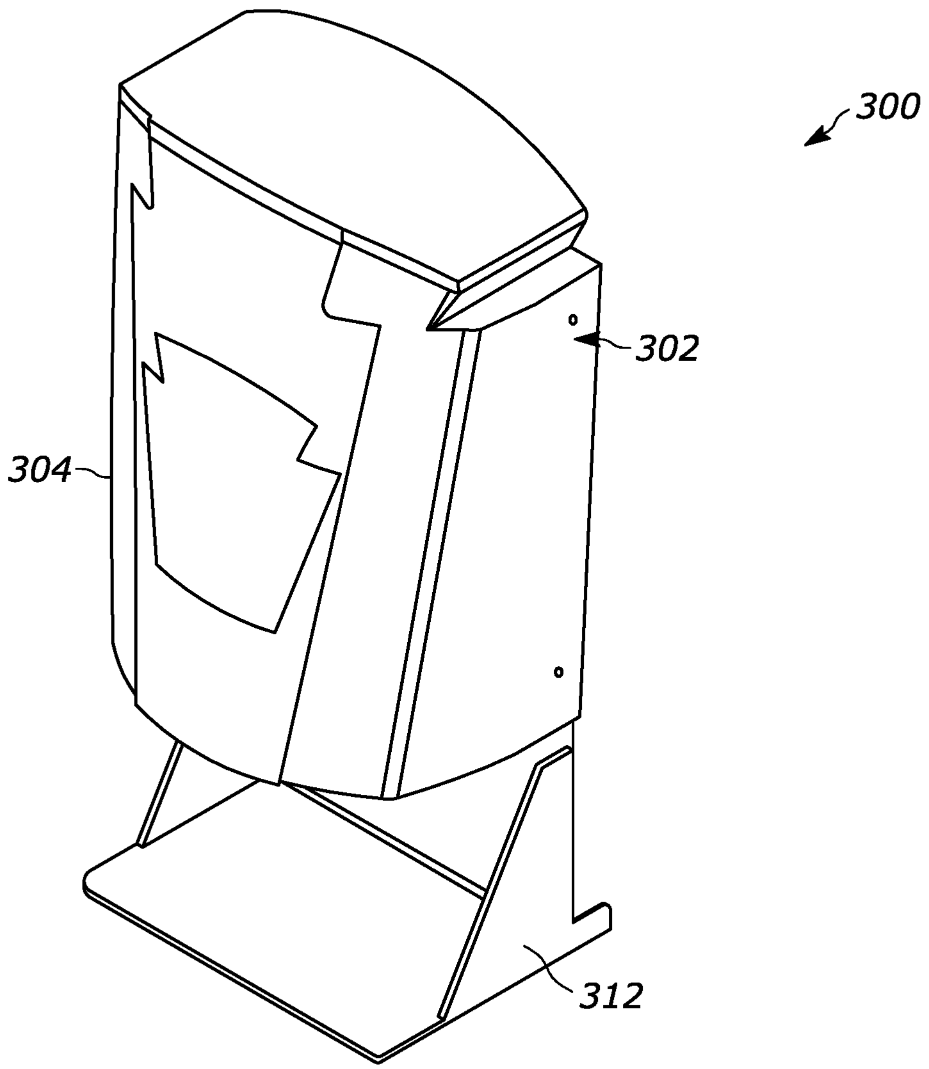
FIG. 11 is a front perspective view of a condiment dispensing device according to a third embodiment.

With reference to FIGS. 10A-B, the tube 230 extends from the condiment pouch 224 and through the pump 232. The pump 232 may be a peristaltic pump that includes a roller 158 having one or more arms 160 as described in regard to the condiment dispensing device 100. The tube 230 may thus form a loop about the pump housing 233 of the pump 232. The tube 230 then extends to the dispensing end 242 extending through the dispensing hole 223 of the rear cover 206. The dispensing tube 230 may be secured to the rear cover 206 and oriented such that the dispensing end 242 of the tube 230 faces downward. The pump 232 includes a pump housing 233 and a cover 235. The cover 235 may be removably attached to the pump housing 233. In one example, the cover 235 snaps to the pump housing 233. The cover 235 may aid to retain the tube 230 in a loop in the pump housing 233 when the tube 230 is installed within the pump 232. The tube 230 may need to be removed for cleaning. It is thus advantageous to provide a cover 235 that may easily be removed from the pump housing 233 to remove the tube 230. As shown the pump 232 is positioned on the side of the condiment dispensing container 200 such that when the front cover 204 is removed, the cover 235 is accessible for removal from the pump housing 233. Positioning the cover 235 such that it is accessible enables the condiment dispensing container 200 to be more easily cleaned or serviced (e.g., replacing the tube 230).

Since the condiment dispensing container 200 dispenses a condiment to a user for use with their food, the condiment dispensing container 200 must be capable of being cleaned. For instance, the condiment dispensing container 200 must be able to be disassembled with ease, such that employees (e.g., restaurant employees) may readily disassemble the condiment dispensing device 200 for cleaning. In particular, the flow path of the condiment must be able to be cleaned, e.g., the tube 230. Cleaning the tube 230 reduces the likelihood of contamination within the condiment dispensing container 200 and the condiment dispensed to the user. To clean the condiment dispensing device 200, the front cover 204 may be removed from the rear cover 206. The tube 230 may be disconnected from the condiment pouch 224, for example, by withdrawing the end of the tube 230 (or a pouch piercer 246 attached thereto) from a port or hole 244 in the condiment pouch 224. A cover 235 of the pump 232 may be removed, for example, by pulling the cover 235 away from the pump housing 233 with force. The tube 230 may then be withdrawn from the pump housing 233. The dispensing end 242 may be withdrawn from the dispensing hole 223 of the rear cover 206. The tube 230 may then be cleaned and/or replaced with a clean tube 230. The condiment dispensing device 100 may be reassembled with the clean tube 130 by reversing the disassembly steps. Since the tube 230 and pouch piercer 246 form the length of the flow path of the fluid from the condiment pouch 224 to the dispensing opening, the condiment dispenser device 200 may be quickly cleaned by cleaning or replacing the tube 230 and pouch piercer 246 unlike prior art condiment dispensers where the pump and several other components of the dispenser along the flow path of the condiment need to be disassembled and cleaned.

With reference to FIGS. 11-13F, a condiment dispensing container 300 according to a third embodiment is shown. The condiment dispensing container 300 is similar in many respects to the condiment dispensing container 200 of FIGS. 7A-10B, the differences of which are detailed in the discussion below. For simplicity, the prefix of the reference numeral "2" for features of the condiment dispensing container 200 are replaced by "3" for similar structures in the condiment dispensing container 300. For instance, the same feature indicated by reference numeral 202 with regard to the condiment dispending container 200 is shown as reference numeral 302 with regard to the condiment dispensing container 300.

The front cover 304 of the condiment dispensing container 300 is attached to the rear cover 306 magnetically. The rear cover 306 includes one or more magnets attached to the flanges 308 that interact with corresponding magnets affixed along the sidewalls of the front cover 304. As one example, the magnets may be neodymium magnets. In other embodiments, one or more of the magnetic connection points of the front cover 304 or the rear cover 306 does not include a magnet, but rather includes a ferromagnetic metal material such as iron, nickel, cobalt, gadolinium, dysprosium, and/or a steel alloy including a ferromagnetic metal that is attracted to a corresponding magnet to hold the front cover 304 to the rear cover 306. The front cover 304 also includes a fastener 305 that extends through the top portion of the front cover 304 and into a corresponding hole on a tab 307 of the rear cover 306 to further removably secure the front cover 304 to the rear cover 306. In one example, the fastener 305 is a nylon thumb screw. Thus, to remove the front cover 304 from the rear cover 306, the fastener 305 is removed and a force is applied to pull the front cover apart from the rear cover 306. The front cover 304 may be quickly removed to provide access to the internal components of the condiment dispensing container 300, for example, to replace the condiment pouch 324 or clean the tube 330. Similarly, the front cover 304 may be reattached to the rear cover 306 by aligning the front cover 304 with the rear cover 306 and bringing the magnetic connection point of the front cover 304 proximal to the corresponding magnetic connection point of the rear cover 306. The magnetic attraction holds the front cover 304 to the rear cover 306. The fastener 305 may be inserted through the top portion of the front cover 304 and through the hole of the tab 307 of the rear cover 306 to further secure the front cover 304 to the rear cover 306.

The front cover 304 further includes a wall 309 that depends downwardly from the bottom portion of the front cover 304. The wall 309 guides the user of the condiment dispensing container 300 when aligning their plate, container, or food item to receive the condiment from the condiment dispensing container 300. This aids in indicating to the user where the condiment will be dispensed to avoid dispensing the condiment where it is not desire (e.g., spilling the condiment on the base 314 of the stand 312 or surface below the condiment dispensing container 300). The wall 309 prevents the user from positioning their plate, container, or food item too far to the rear of the condiment dispensing container 300. The wall 309 may further include a line disposed along the wall 309 that indicates to a user the height at which they should position their plate, container, or food item to receive the condiment. Guiding the user to position their plate, container, or food item at a certain height may aid in preventing a user from bringing their plate, container, or food item into contact with the dispensing end 340 of the tube 330 of the condiment dispensing container 300.

The rear cover 306 further includes slots 313 in the vertical wall 316 for mounting the rear cover 306 to the stand 312. The vertical wall 316 of the stand 312 includes hook projections 315 that are configured to extend through the slots 313 of the rear cover 306 to attach the rear cover 306 to the stand 312. As shown, the hook projections 315 include a horizontal portion extending from the front surface of the vertical wall 316 and a vertical portion extending upwardly from an end of the horizontal portion distal the vertical wall 316. To attach the rear cover 306 to the stand 31Z the slots 313 of the vertical wall 316 of the rear cover 306 are aligned with the hook projections 315 of the stand 312. The vertical portions of the hook projections 315 are passed through the slots 313 of the rear cover 306. Once the vertical portion has passed through the slots 313, the rear cover 306 may be lowered such that the top end of the slots 313 rest on the horizontal portion of the hook projection 315. To remove the rear cover 306 from the stand 312, the rear cover 306 must be moved upward and away from the stand 312 to cause the vertical portions of the hook projections 315 to pass back through the slots 313. The hook projections 315 of the stand 312 thus removable attach the rear cover 306 to the stand 312.

The condiment dispensing container 300 may also be mounted to a wall, rather than to the stand 312. A plate may be fixed to the wall, for example, via one or more screws. The plate may further include projections, such as screws extending from the front surface of the plate that engage the keyhole slots 310 of the rear cover 306 to attach the rear cover 306 to the plate. The plate may be shaped to correspond with the shape of the rear cover 306 such that the front cover 304 substantially covers the plate.

Figure 13B:
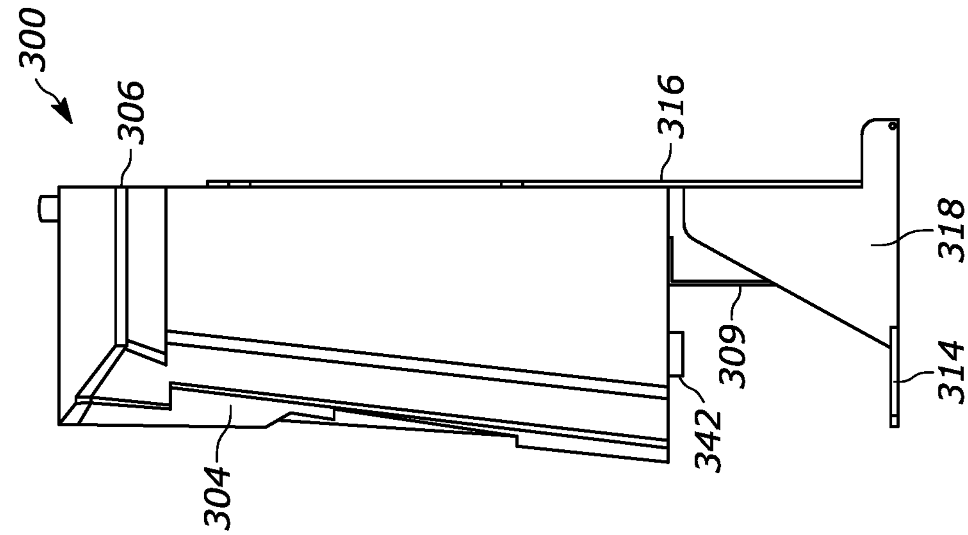
FIGS. 13A-B are front and right side views, respectively, of the condiment dispensing device of FIG. 11.
Figure 13A:
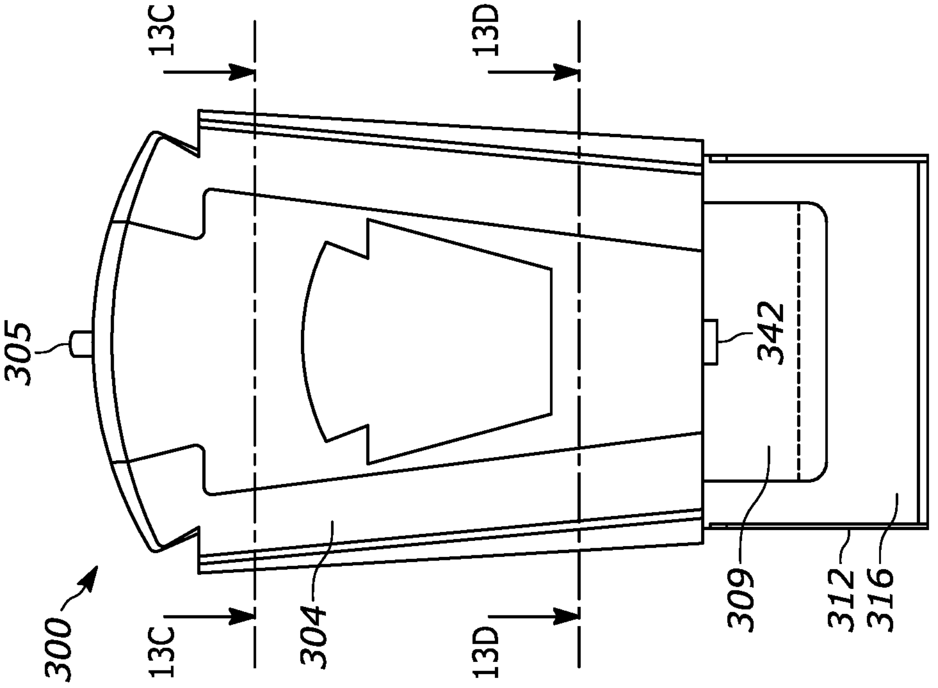
Figure 13D:
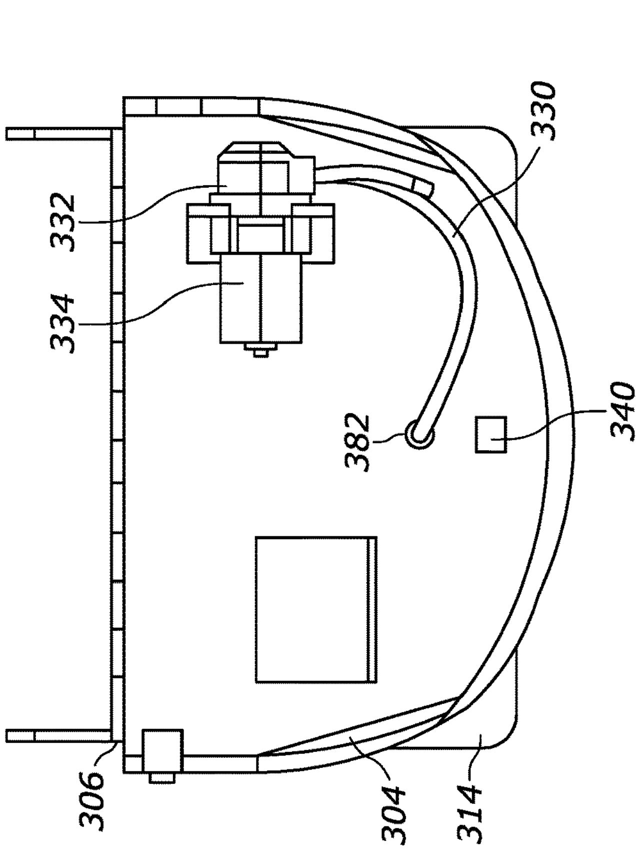
FIG. 13D is a cross-section view of the condiment dispensing device of FIG. 11 taken along lines D-D of FIG. 13A.
Figure 13C:
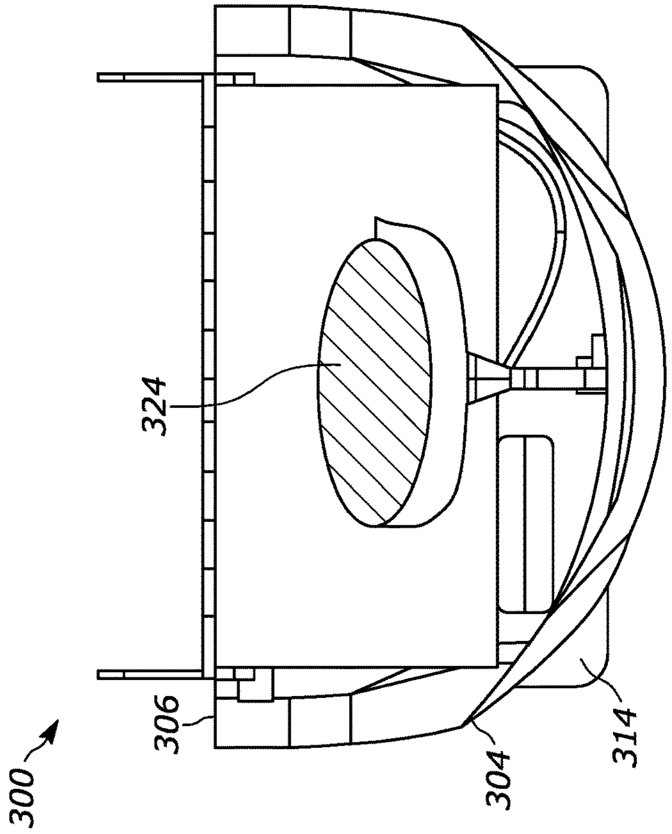
FIG. 13C is a cross-section view of the condiment dispensing device of FIG. 11 taken along lines C-C of FIG. 13A.
Figure 13F:
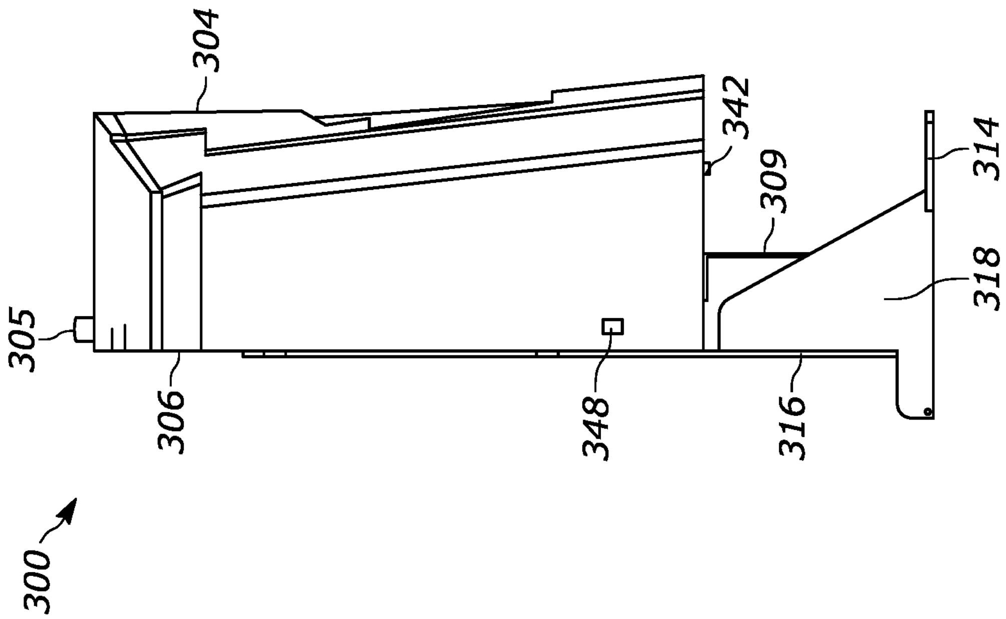
FIG. 13F is a left side view of the condiment dispensing device of FIG. 11.
Figure 13E:
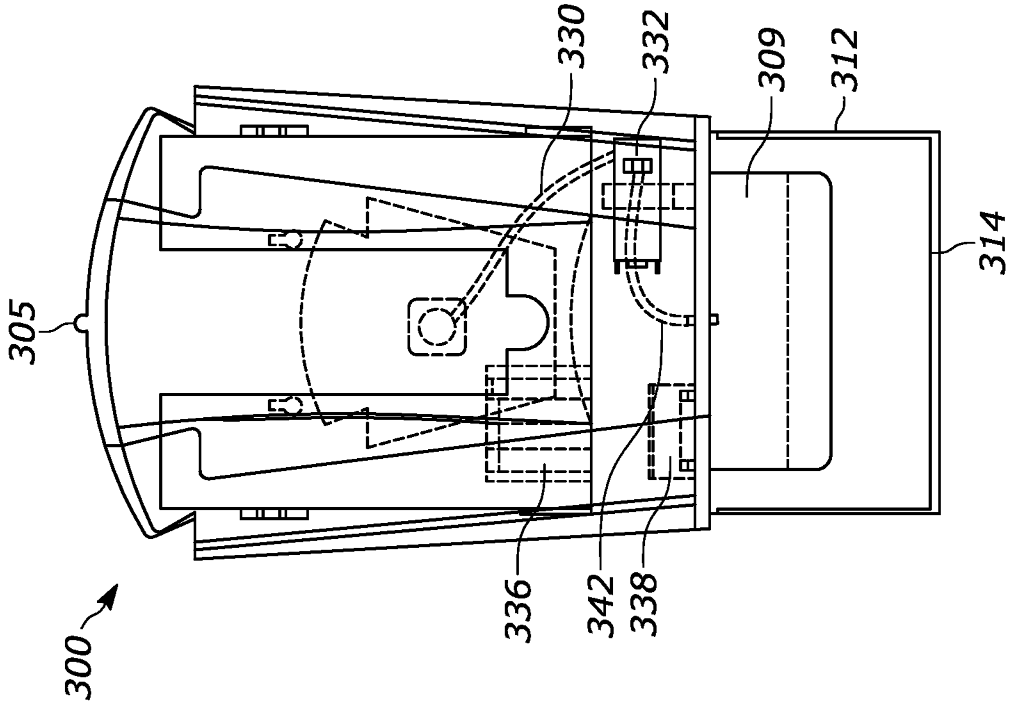
FIG. 13E is a partially see-through front elevation view of the condiment dispensing device of FIG. 11.
Figure 14A:
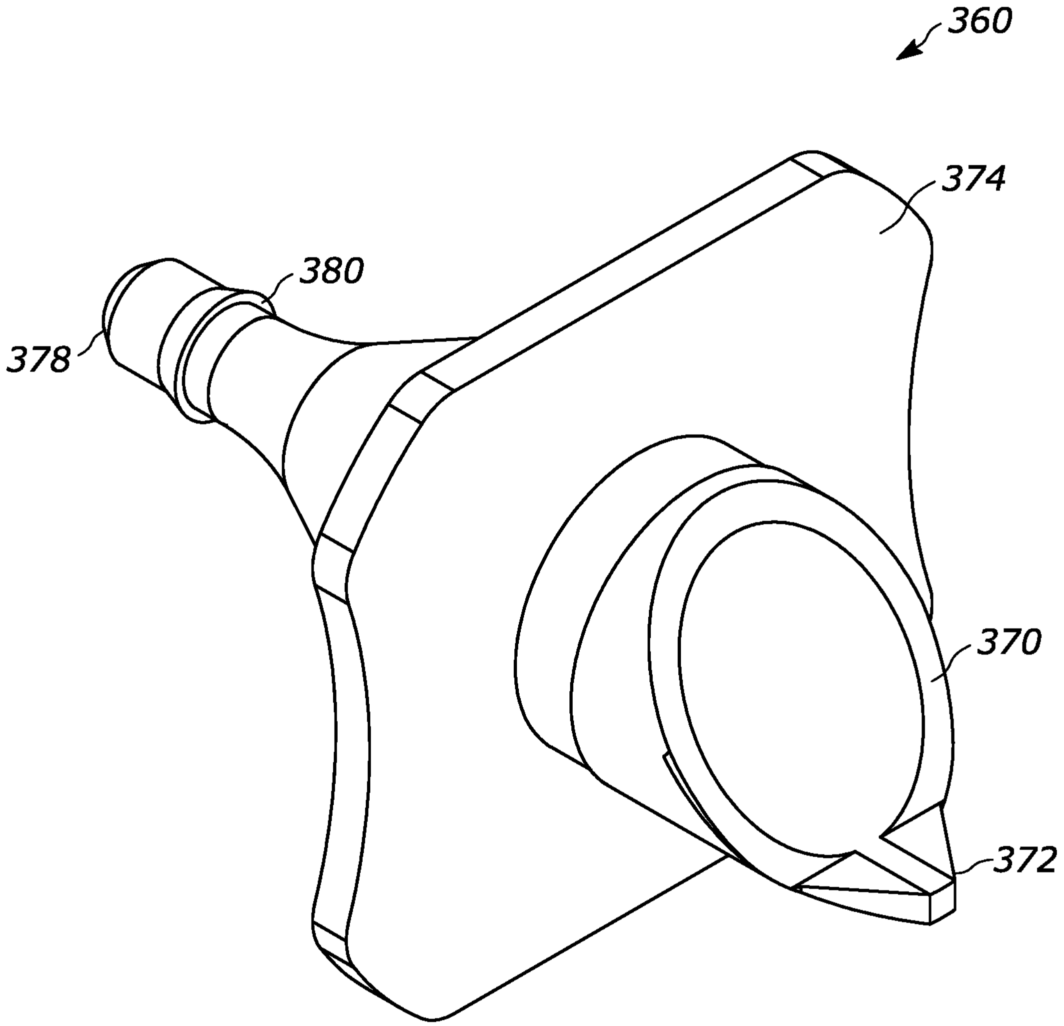
FIGS. 14A-B are top perspective and top plan views, respectively, of a pouch piercer of the condiment dispensing device of FIG. 11.
Figure 14B:
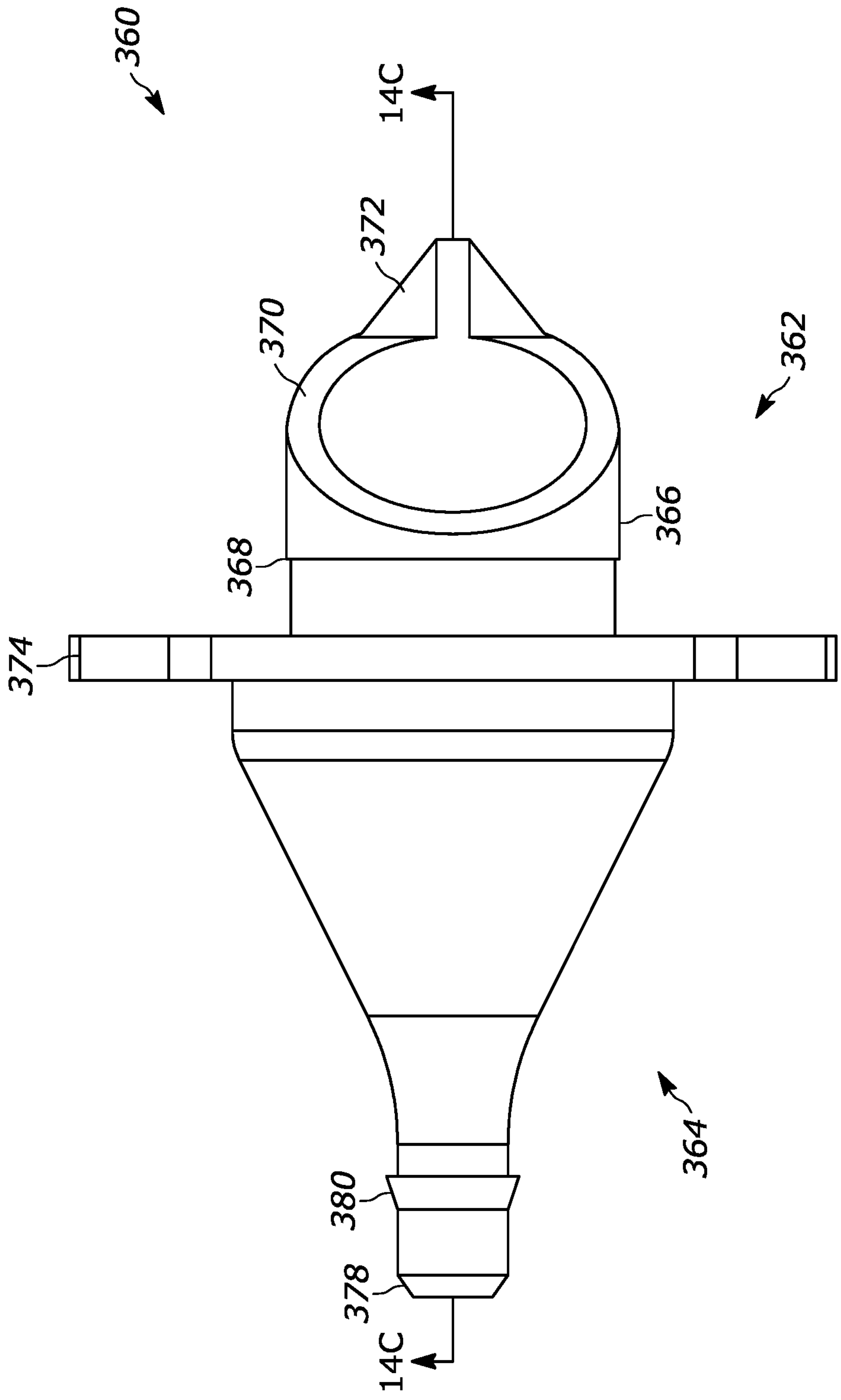
Figure 14C:
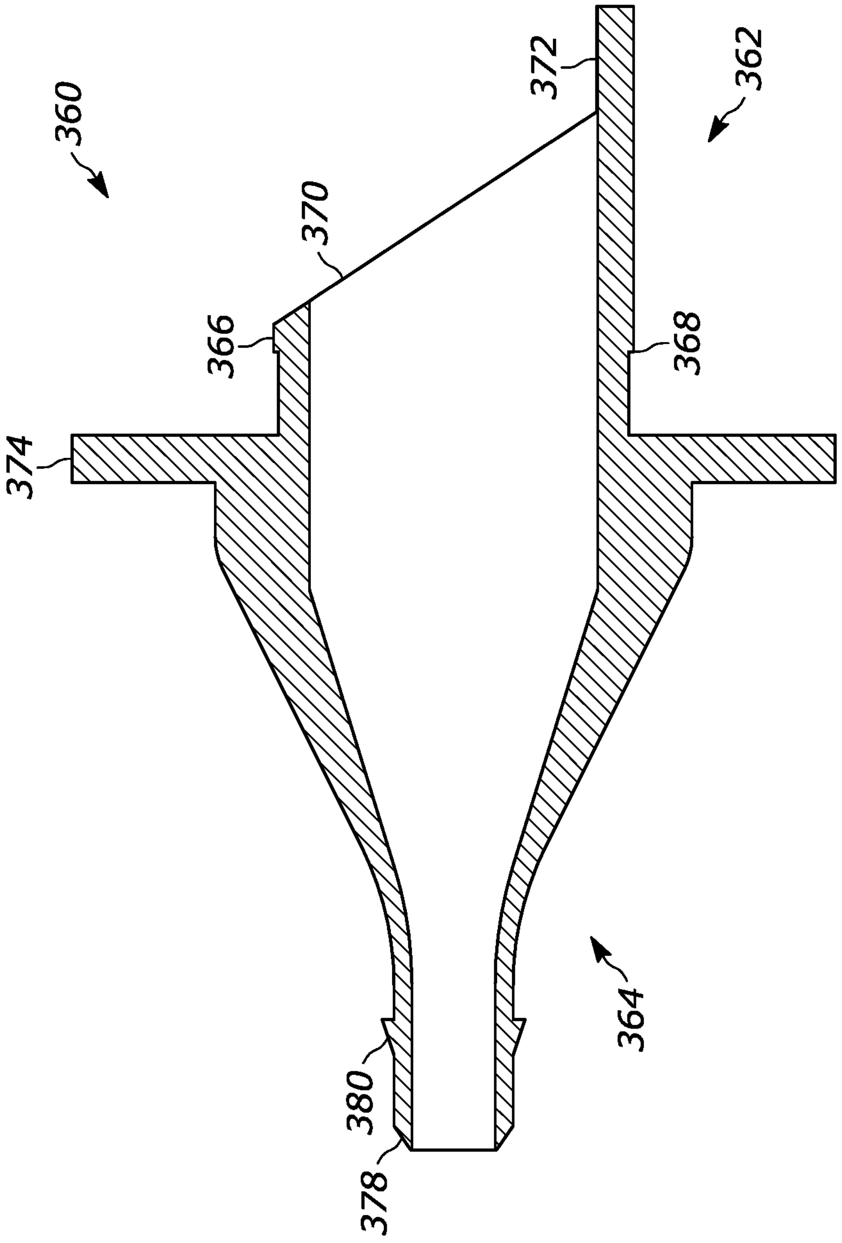
FIG. 14C is a cross-section view of the pouch piercer of FIG. 14A, taken along lines 14C-14C of FIG. 14B.
Figure 14D:
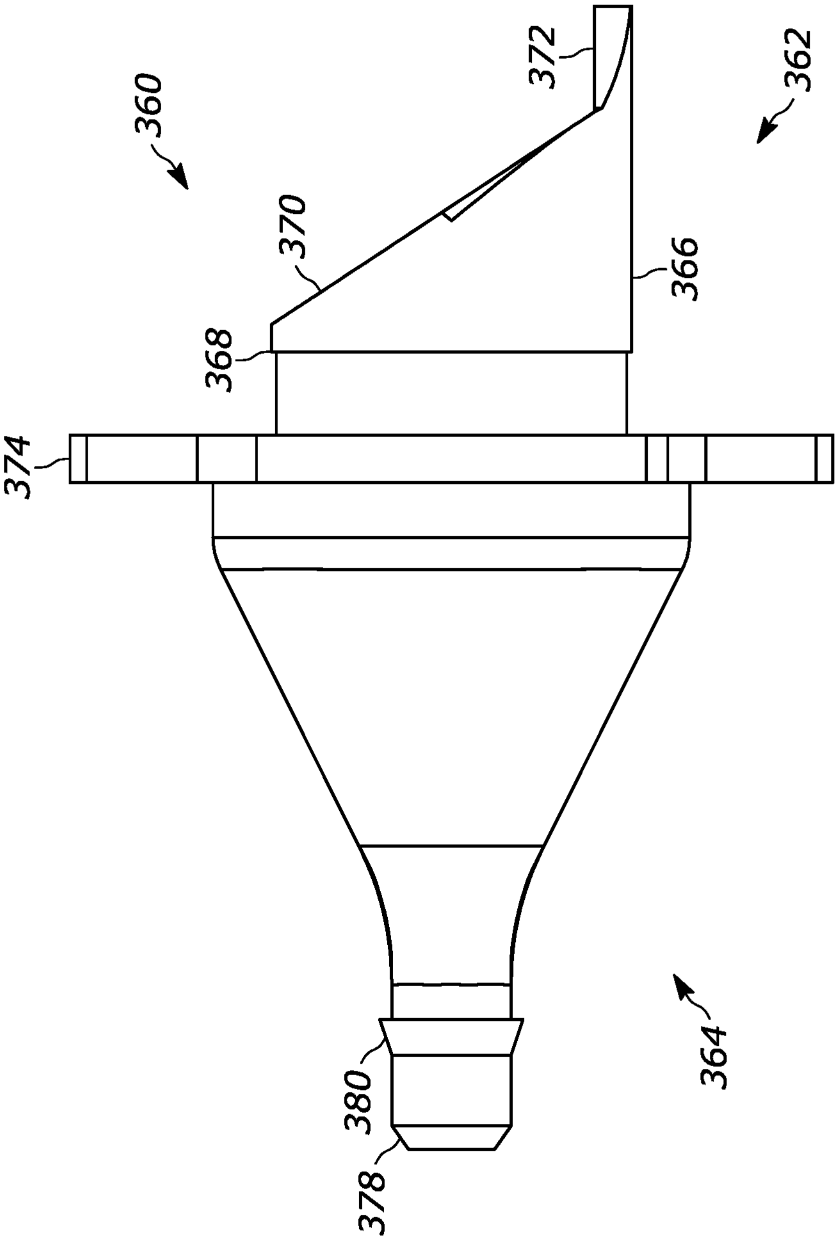
FIGS. 14D-E are side and front elevation views, respectively, of the pouch piercer of FIG. 14A.
Figure 14E:
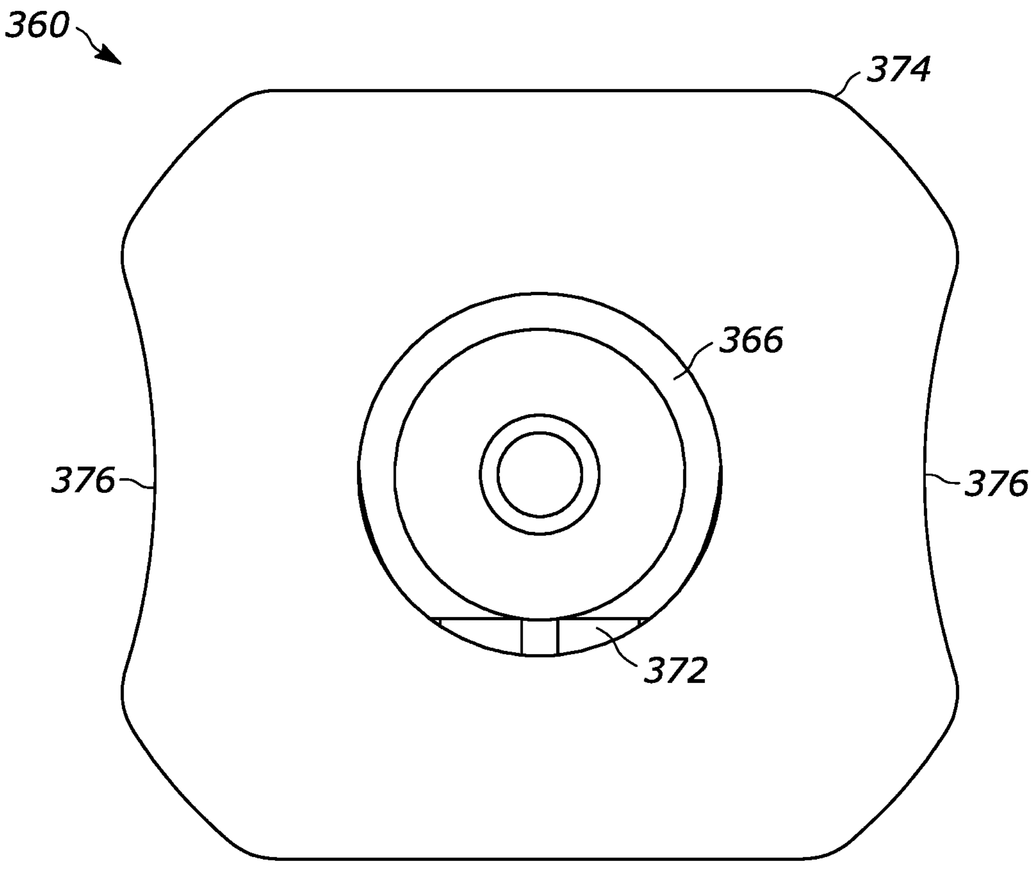

With respect to FIG. 13E, the battery 336 (or battery pack) is mounted to the front surface of the pouch holder 326. Mounting the battery pack to the front surface of the pouch holder 326 may aid in removing the battery pack or a battery 336 held by the battery pack. Improving the accessibility of the battery pack or battery 336 held by the battery pack aid in replacement of the batteries when one or more batteries need to be recharged or replaced. For instance, where the battery pack holds four AA batteries, positioning the battery pack on the front surface of the pouch holder 326 may provide easy access to the battery pack when the front cover 304 is removed, which may reduce the amount of time spent servicing the condiment dispensing container 300 to replace the four AA batteries.

Figure 12:
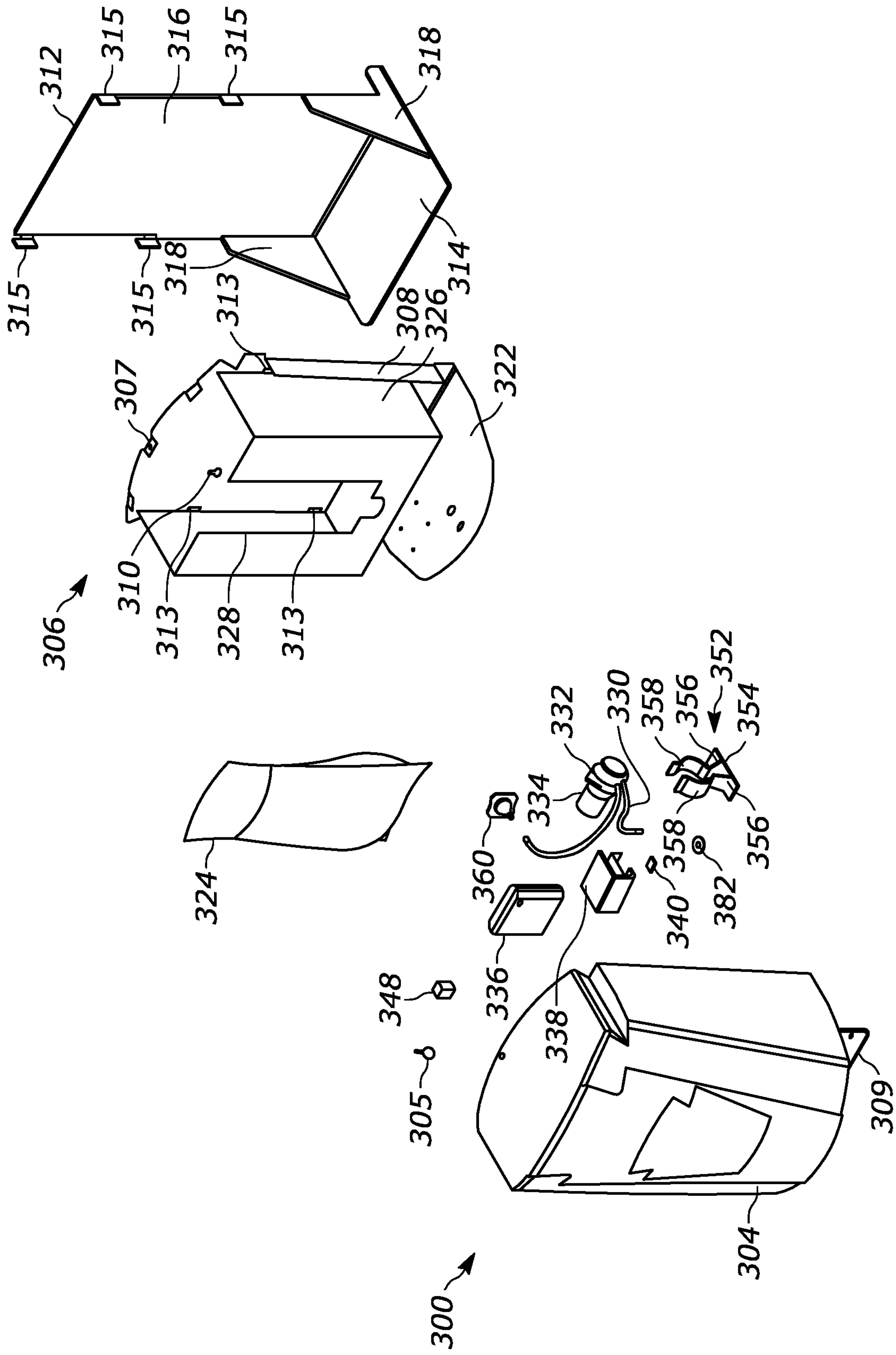
FIG. 12 is an exploded view of the condiment dispensing device of FIG. 11.

With respect to FIGS. 12 and 13F, the condiment dispensing container 300 includes a power switch 348. As shown, the power switch 348 is mounted to the flange 308 the rear cover 306. The front cover 204 may include a hole in the sidewall through which the power switch 348 may be accessed. In some forms, a portion of the power switch 348 extends through the hole in the front cover 304 making control of the power switch 348 more accessible. In the embodiment shown, the power switch 348 is a slide switch with the selector portion extending through the hole in the sidewall of the front cover 304. In other embodiments, the power switch 348 may be another type of switch such as a push lock, DIP, push-to-make, rocker, rotary, or toggle switch as examples.

The power switch 348 may enable the condiment dispensing container 300 to be turned on and off by moving the switch 348 between on and off positions. The power switch 348 may be connected to the circuit board 338 which controls the operation of the pump 332. The circuit board 338 or the controller thereof may be configured to no longer cause the pump 332 to operate when the power switch 348 is in the "off" position. The power switch 348 may also be configured to connect or disconnect the battery 336 from the pump 332, circuit board 338, and/or sensor 340. The power switch 348 may be configured such that when in the "off" position, power is not supplied to pump 33Z circuit board 338, and/or sensor 340 which inhibits the condiment dispensing container 300 from dispensing condiment within the tube 330 when motion or movement below the sensor 340 would otherwise cause condiment to be dispensed. For example, if an employee is cleaning the base 314 of the stand 312, the employee may move the power switch 348 to the off position to clean the base 314 so condiment is not inadvertently dispensed. The power switch 348 may also be moved to the off position when not in use, for example, to conserve power or to reduce additional wear on the components of the condiment dispensing container 300 when a pouch is empty or not installed in the condiment dispensing container 300.

The pump 332 may be removably attached to the rear cover 306 by a clip 352 that is mounted to the base portion 322 of the rear cover 306. With reference to FIG. 12, the clip 352 includes a base 354 and two arms 256 extending from the base 354. The arms 356 each include a cradle portion 358 for receiving the pump 332. As shown the cradle portions 358 have a curved cross-section that substantially corresponds to the outer surface of the pump housing 333. The arms 356 are elastically deflectable from one another such that the pump 332 may be inserted into the cradle portions 358 between the arms 356 by forcing the arms 356 apart from one another. The arms 356 are biased back to their original position such that they impart a force on the pump 332, thus securing the pump 332 to the rear cover 306. The arms 356 may be forced apart from one another to remove the pump 332 from the rear cover 306. Thus, the pump 332 may be quickly disconnected from the rear cover 306 for cleaning or servicing the condiment dispensing container 300.

With reference to FIGS. 12 and 14A-E, the condiment dispensing container 300 includes a pouch piercer 360 having a first end 362 for piercing the condiment pouch 324 and a second end 364 for attachment to the tube 330. The first end 362 includes a tubular portion 366 for inserting into an opening of a fitment of the condiment pouch 324. The tubular portion 366 may engage the fitment of the condiment pouch 324 such that the pouch piercer 360 remains connected thereto by a friction fit. As shown, the tubular portion 366 further includes a lip or ridge 368 that the fitment of the condiment pouch 324 passes over or hooks to secure the pouch piercer 360 to the fitment of the condiment pouch 324. The tubular portion 366 may include an angled end 370 having an angled tip 372 on the end thereof. The angled tip 372 may be sharp and is configured to be pressed against a portion of the condiment pouch 324 to pierce the pouch 324. The tubular portion 366 of the pouch piercer 360 may be forced into the condiment pouch 324 via the hole created by the angled tip 372. The condiment within the pouch 324 may then flow out of the pouch via the tubular portion 366 of the pouch piercer 360 that is positioned within the pouch 324. The angled end 370 of the tubular portion 366 is angled to aid in keeping the opening of the tubular portion 366 open for the condiment to flow. Including the angled end 370 reduces the likelihood that the opening will become blocked by or draw a portion of the pouch against the opening when suction is present in the tube 330.

The pouch piercer 360 may include a flange or plate 374 disposed between the first end 362 and the second end 364. The plate 374 may be positioned to engage a portion of the pouch 324 and/or the fitment within the pouch 324 to which the pouch piercer 360 connects to inhibit the pouch piercer 360 from being inserted too far into the pouch 324 (e.g., through both walls of the pouch 324). Once the pump 332 begins withdrawing the condiment from the pouch 324 via the pouch piercer 360, the plate 374 may remain engaged with the pouch and aid in forming a seal between the pouch piercer 360 and the pouch 324. Forming a seal allows a vacuum to form within the pouch 324 when the pump 332 operates which aids in more fully emptying the pouch 324. The plate 374 may have a substantially square cross-section with recessed portions 376 along one or more sides. The recessed portions 376 enable the user to both firmly and ergonomically grip the pouch piercer 360 when inserting the pouch piercer 360 into the pouch 324 and when removing the pouch piercer 360 from the pouch 324.

The second end 364 of the pouch piercer 360 is configured to attach to the tube 330 that extends through the pump 332. The second end 364 may be a reducer that narrows the diameter from the tubular portion 366 to the diameter of the tube 330. The tube 330 may vary in size based on the condiment within the pouch 324 and/or the desired flow rate of the condiment through the tube 330 and dispensed to the user. The second end 364 may include a tip 378 that is inserted into an end of the tube 330. The outer diameter of the tip 378 may be sized to fit within the inner diameter of the tube 330. The tip 378 may be sized to be inserted into the end of the tube 330 and secured thereto by a friction fit. In the embodiment shown, the tip 378 includes an angled ridge 380 disposed about the circumference of the tip 378. The angled ridge 380 extends radially from the tip 378 and aids in engaging the inside of the tube 330 to secure the pouch piercer 360 to the tube 330. The angled ridge 380 may be configured to be inserted into the tube 330 with relative ease, but require a greater force to withdraw the tip 378 from the tube 330.

The dispensing end 342 of the tube 330 may extend through a rubber grommet 382 positioned within the dispensing hole 323 of the rear cover 306. The rubber grommet 382 may hold the dispensing end 342 of the tube in place and at the correct orientation for dispensing the condiment to users.

Figure 15:
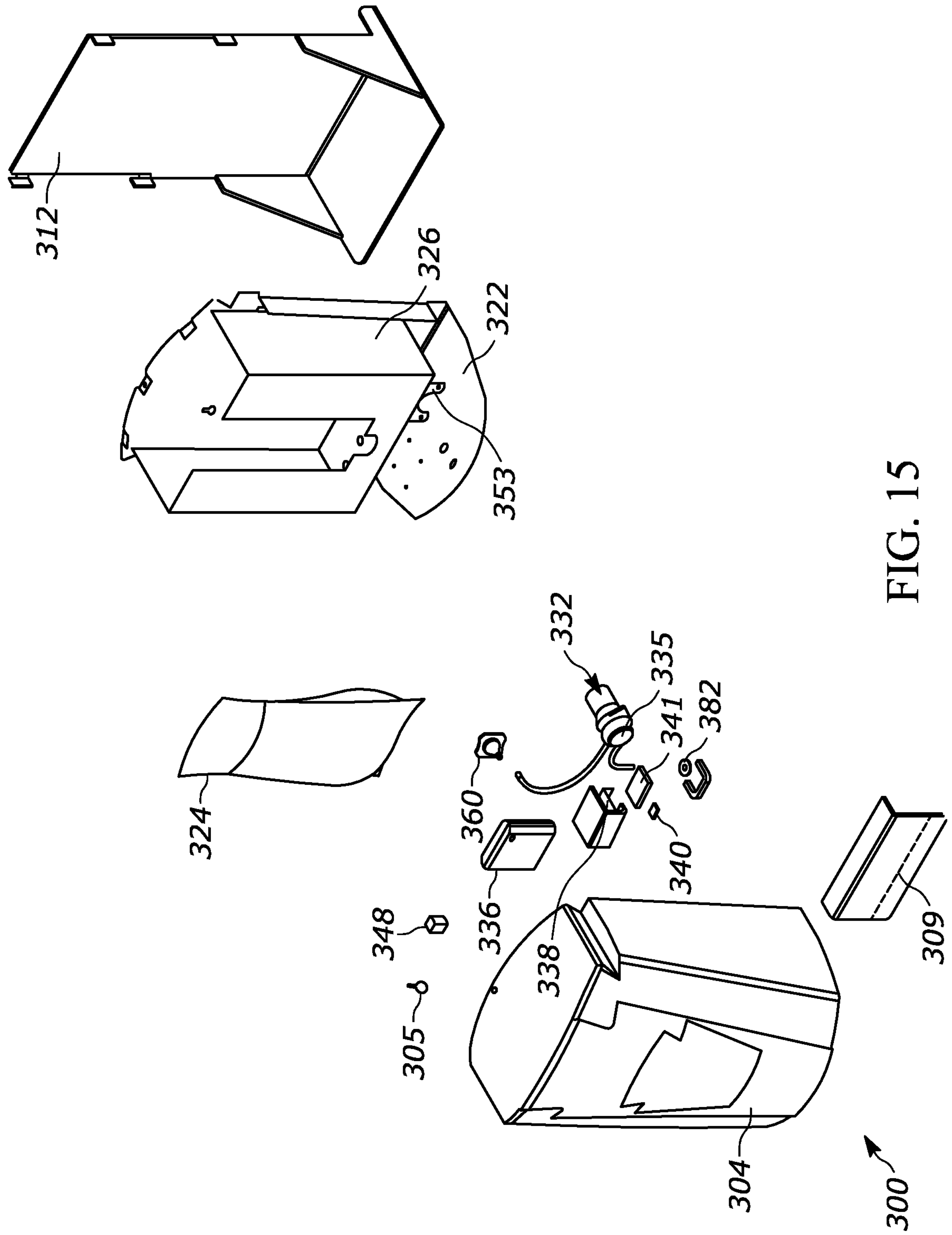
FIG. 15 is an exploded view of the condiment dispensing device of FIG. 11 with modifications.
Figure 16B:
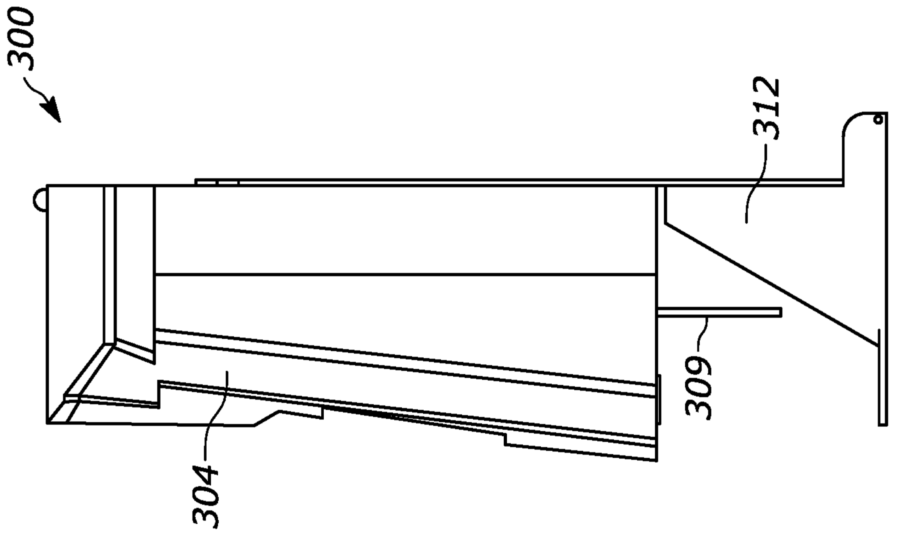
FIGS. 16A-B are front and right side views, respectively, of the condiment dispensing device of FIG. 15.
Figure 16A:
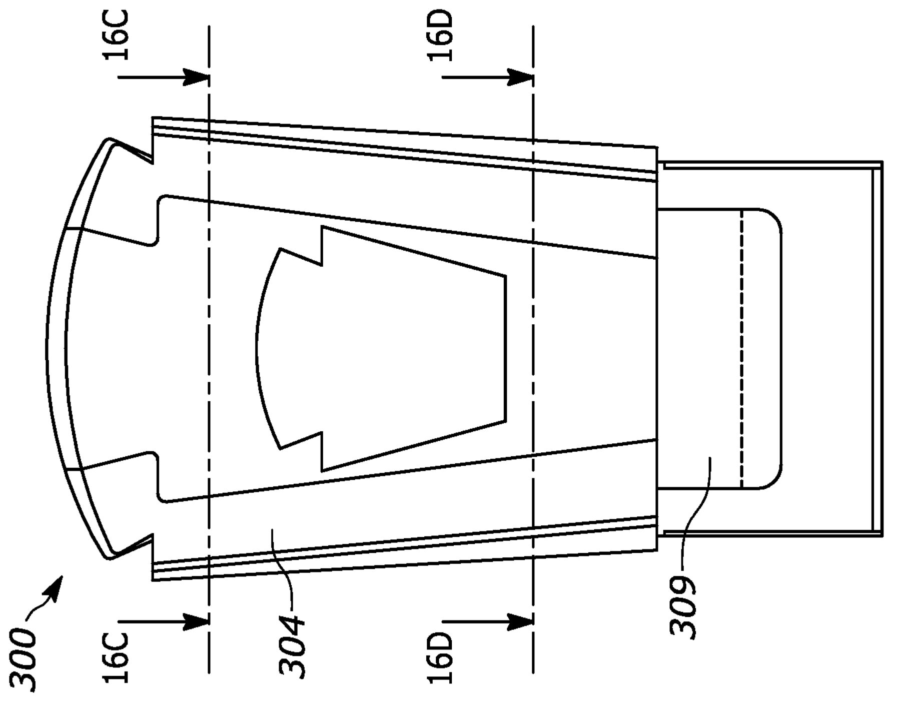
Figure 16D:
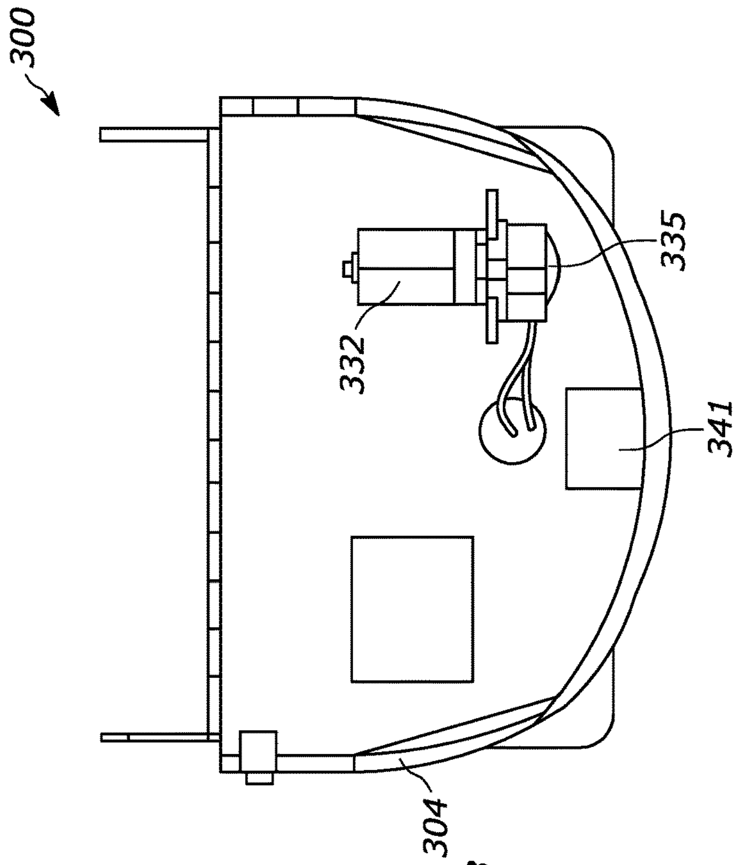
FIG. 16D is a cross-section view of the condiment dispensing device of FIG. 15 taken along lines D-D of FIG. 16A.
Figure 16C:
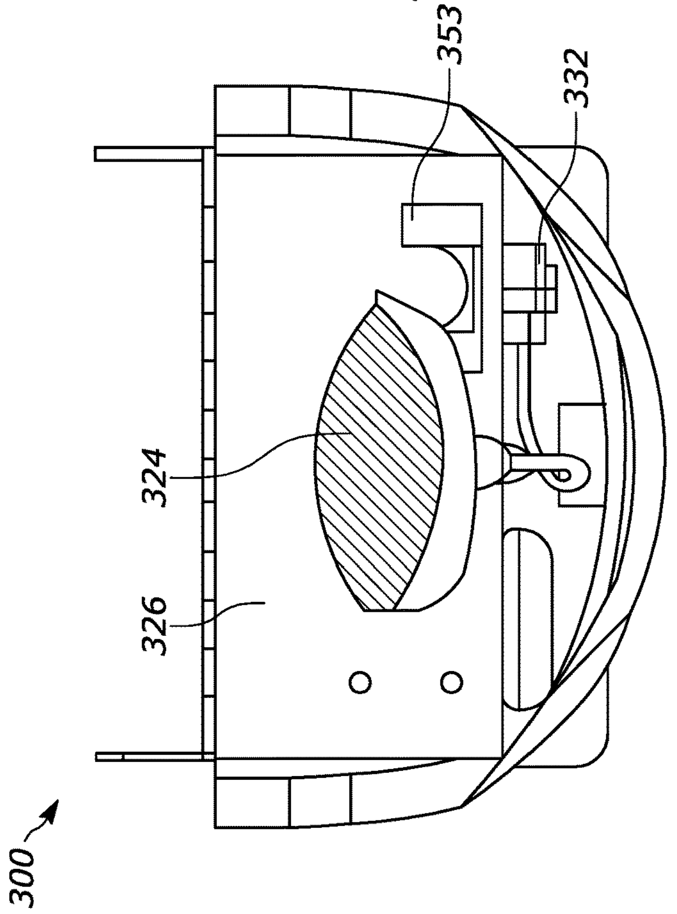
FIG. 16C is a cross-section view of the condiment dispensing device of FIG. 15 taken along lines C-C of FIG. 16A.
Figure 17A:
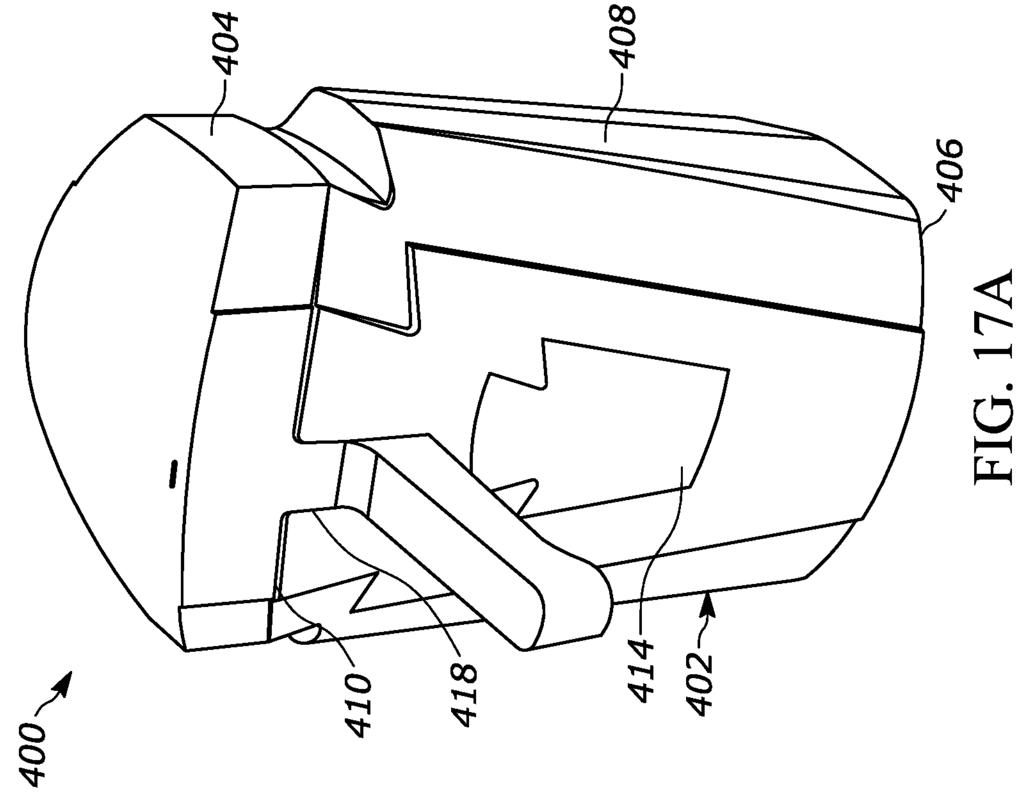
FIG. 17A is a top perspective view of a condiment dispensing device according to a fourth embodiment.
Figure 16E:
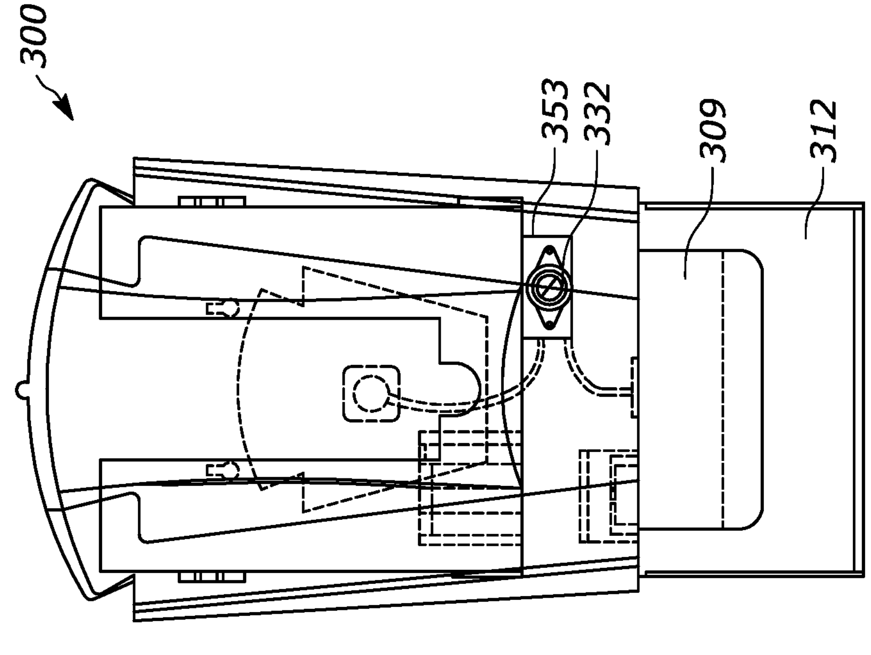
FIG. 16E is a partially see-through front elevation view of the condiment dispensing device of FIG. 15.

With reference now to FIGS. 15-16E, the condiment dispensing device 300 is shown with some modifications which are discussed below. The pump 332 is rotated approximately 90 degrees from the pump 332 shown in FIGS. 12-14F with the pump cover 335 facing the front of the condiment dispensing device 300 and away from the rear cover 306. Rotating the pump 332 so that the pump cover 335 faces forward may ease the removal of the pump cover 335 to remove the tube 330 for replacement or cleaning. The pump 332 may be mounted to the lower surface of the pouch holder 326 rather than by a stand as shown in FIGS. 12-14F. As shown in FIGS. 15-16E, a mounting bracket 353 is attached to the lower surface of the pouch holder 326. The mounting bracket 353 includes holes configured to receive a fastener to affix the pump 332 thereto. The mounting bracket 335 may have a recessed portion for receiving a portion of the pump housing 333 when the pump 332 is attached to the bracket 335. The pump 332 includes a flange having holes extending therethrough. To attach the pump to the pouch holder 326, the holes of the flange of the pump 332 are aligned with the holes of the mounting bracket 353 and a fastener is extended therethrough to removably attach the pump 332 to the pouch holder 326.

The sensor 340 of the modified condiment dispensing device 300 includes a cover 341 that may be placed over the sensor 340. This may aid to protect the sensor 340 from fluids, such as the condiment, should the pouch 324 leak or fluid be spilled within the condiment dispensing device 300, for example, during cleaning or replacement of the pouch.

With reference to FIGS. 17A-25H, a condiment dispensing container 400 is shown according to a fourth embodiment. The condiment dispensing container 400 is similar in many respects to the condiment dispensing containers of the previous embodiments, the differences being highlighted in the following discussion. For simplicity, the prefix of the reference numeral "1" for features of the condiment dispensing container 100 of the first embodiment are replaced by "4" for similar structures in the condiment dispensing container 100. For instance, the same feature indicated by reference numeral 102 with regard to the condiment dispending container 100 is shown as reference numeral 402 with regard to the condiment dispensing container 400. Many of the features of the condiment dispensing container 400 may be the same as those shown and described in the condiment dispensing container 100, but in a different arrangement.

A primary difference between the condiment dispensing container 400 of the first embodiment and the condiment dispensing container 400 of the fourth embodiment is that the condiment container, such as condiment pouch 425, is placed within a subframe or pouch carrier 482 of the lid 404 and inserted into an opening of a housing, such as container body 402. The pump 452 is positioned at the bottom of the pouch carrier 482 and not within a cavity of the lid as in the first embodiment. The bottom side of the lid 404 may include a recessed portion to form an interior chamber and further increase the volume contained by the container 400 and the lid 404 to enable a larger pouch 425 to be contained by the condiment dispensing container 400.

With regard to FIGS. 17A-E, the condiment dispensing device 400 includes a container body 402 and a lid 404. With respect to FIGS. 17B-C, the lid 404 includes the pouch carrier 482 attached thereto. The lid 404 and pouch carrier 482 are removable from the container body 402. The lid 404 may be removed to fill or refill the condiment contained within the container body 402 (see FIGS. 25A-H). The pouch carrier 482 supports the condiment pouch and the pump 452 such that when the lid 404 is positioned on the container body 402 the pouch carrier 482, the condiment pouch 425, and the pump 452 are installed as a single unit.

The container body 402 is similar to the container body 102 of the first embodiment of FIGS. 1-6. The container body 402 may be formed of a plastic material. Example forms of plastic include acrylonitrile butadiene styrene (ABS). The container body 402 includes a bottom 406, sidewalls 408 and a rim 410 about the end of the container body 402 opposite the bottom 406. The container body 402 thus defines a cavity 412 into which the pouch carrier 482 and a condiment pouch 425 may be inserted. The container body 402 conceals the pouch carrier 482 and the condiment pouch 425 from the view of customers or patrons of a restaurant.

The sidewalls 408 of the container body 402 may include a surface for placing a label 414 that indicates the condiment within the container body 402. The label 414 may include the brand and the condiment type (e.g., ketchup, mustard, etc.) within the container body 402. The exterior of the container body 402 may have a color that corresponds to a certain condiment type. For example, red for ketchup, yellow for mustard, maroon for barbeque, cream white for mayonnaise, etc. In the embodiment shown, the container body 402 is formed of a plastic material that has been dyed to the desired color, e.g., red. In another form, the exterior of the container body 402 is covered by a sticker, plastic or paper wrap, or colored, for example, with a paint. The rim 410 of the container body 402 supports the lid 404. In the embodiment shown, the lid 404 rests on top of the rim 410. A lip 416 of the lid 404 contacts the rim 410 of the container body 402 when the lid 404 is placed on top of the container body 402. In some embodiments, the lid 404 may include attachment features to secure the lid 404 to the container body 402. As one example, the lid 404 may clip or snap onto the container body 402. The lid 404 or container body 402 may contain a button to release the lid 404 from the container body 402.

In the embodiment shown, the rim 410 includes a notch 418 through which the spout 420 of the lid 404 extends. In other embodiments, the spout 420 of the lid 404 extends outward from the container body 402 above the rim 410, and thus the rim 410 does not include the notch 418.

A condiment pouch 425 may be disposed within the cavity 412 of the container body 402. In this embodiment, the condiment pouch 425 is supported by a pouch carrier 482 or subframe of the lid 404 (see FIG. 17E). The condiment pouch 425 may thus be inserted or withdrawn from the container body 402 as the pouch carrier 482 is inserted into or withdrawn from the cavity 412 of the container body 402. This permits the condiment pouch 425 to be easily connected to the tube 430 when the lid 404 is removed from the container body 402 where the inlet end of the tube 430 and pouch piercer are accessible. Once the condiment pouch 425 is connected to the tube 430 and the tube 430 is positioned about the pump 452 and extends to the dispensing outlet, the condiment pouch 425, pouch carrier 482, pump 452, and tube 430 may be inserted into the container body 402 as a single unit that is fully connected and assembled. The tube 430 may be similar to the tube 130 described above, having similar dimensions and properties. The condiment within the condiment pouch 425 may be any condiment including, as examples, ketchup, mustard, barbeque, mayonnaise, and relish. The condiment dispensing device 400 is configured to pump and dispense any variety of condiments having a wide range of viscosities, densities, and flow rates.

With respect to FIGS. 18A-19B, the lid 404 according to a first embodiment includes a top cover 422, sidewalls 424, and a bottom cover 426 defining a cavity 428 within the lid 404. The lid 404 also includes a spout 420 extending from the sidewalls 424 of the lid 404.

In this first lid embodiment, the lid 404 has an increased height to increase the volume contained by the container body 402 and the lid 404. As one example, the lid 404 has a height of about 128 millimeters from the bottom of the sidewalls 424 to the top of the top cover 422. In this particular embodiment, the lid 404 has an increased height such that the condiment dispensing container 404 may contain a 5 Liter condiment pouch 425.

With reference to FIGS. 20A-D, a lid 404' according to a second embodiment is shown. The lid 404' has a smaller height than the lid 404 of the first embodiment. As one example, the lid 404' has a height of about 95.9 millimeters from the bottom of the sidewalls 424' to the top of the top cover 422'. The lid 404' of this second embodiment may be used with a smaller container body (not shown) having a rim with dimensions corresponding to the dimensions of the sidewalls 424' of the lid 404' that enables the lid 404' to rest on the rim of the container body. Use of a smaller lid and/or container body may be desired where condiment pouches 425 of a smaller size are used with the condiment dispensing container 400. For instance, where a 2.5 L condiment pouch 425 is being used instead of a 5 L condiment pouch 425, the lid 404' and smaller container body may be used. Lid 404' of the second embodiment may be used to reduce the overall size of the condiment dispensing container 400. The lid 404' of the second embodiment is otherwise structurally and functionally similar to the lid 404 of the first embodiment. The height of the lid 404' may be adjusted to provide additional volume in the condiment dispensing container 400 for the condiment pouch 425. Where less volume is needed to contain the condiment pouch 425, a lid of a smaller height may be used. In other embodiments, the length and width of the lid 404' and container body may be increased or decreased to provide the desired volume within the condiment dispensing container 400. For conciseness and clarity, lid 404 of the first lid embodiment will be used throughout the following description, however, it should be understood that lid 404' of the second lid embodiment may similarly be used.

In other embodiments, the height or dimensions of the container body 402 are adjusted to provide the desired volume contained within the condiment dispensing container 400. For instance, the height of the container body 402 and the length of the pouch carrier 482 may be increased to accommodate a larger sized condiment pouch 425.

The lid 404 includes tabs 421 depending from the top surface 422. Each tab 421 includes a hole 421A through which a prong or a fastener may be extended to attach the pouch carrier 482 to the lid 404 as described in greater detail below.

The spout 420 includes a channel 420A for housing a fluid path support, such as tube support member 484. With reference to FIGS. 21A-D, the tube support member 484 includes an elongate body 486 sized to fit within the channel 420A of the spout 420. The body 486 includes a hole for mounting a sensor 432 thereto and a series of retainers, such as tube holder clips 488, for receiving and holding the flow path, such as tube 430, along the tube support member 484. The tube holder clips 488 include arms 488A separated by a gap. To attach the tube 430 to the tube holder clips 488, the tube 430 is forced through the gap and in between the arms 488A to attach the tube 430 thereto. In the embodiment shown, the arms 488A are rounded to conform to the outer diameter of the tube 430. Together the arms 430A form a partial ring that wraps around more than 50% of the circumference of the tube 430 to aid in retaining the tube 430 to the tube support member 484 without substantially compressing or reducing the diameter of the tube 430 when attached thereto. The tube support member 484 further includes an opening 434A near the end of the spout 420. The tube support member 484 may include a rounded or arc shaped protrusion 486A extending from the body 486 in between a tube holder clip 488 and the opening 434A. The rounded protrusion 486A provides a rounded surface along which the tube 430 engages as it bends toward the opening 434A in the tube support member 484 to brace the tube 430 and prevent the tube 430 from kinking.

The sensor 432 is mounted at the end of the tube support member 484 such that the sensor 432 extends through hole 432A proximal the opening 434A in the tube support member 484. The tube support member 484 includes a living hinge 490 between the sensor hole 432A and the opening 434A. The tube support member 484 includes a mounting hole 484A through which a fastener is extended to mount the tube support member 484 to the spout 420. The mounting hole 484A is located on the portion of the tube support member 484 with the sensor hole 432A and separated from the opening 434A by the living hinge 490. This enables the tube support member 484 to be bent at the living hinge 490 to permit access to the tube holder clips 488 and dispenser opening 434 while the tube support member 484 remains mounted to the spout 420 via the fastener. Thus, the tube 430 may be installed on the tube support member 484 by bending the side of the tube support member 484 including the tube holder clips 488 away from the spout 420 to an installation position, inserting the tube 430 into the opening 434A, and attaching the tube 430 to the tube holder clips 488. Bending the tube support member 484 to the installation position enables the tube 430 to be easily removed and installed, enabling the tube 430 to be replaced and/or cleaned. This enables a single tube 430 to be removably installed and used to form the condiment flow path or a substantial portion thereof through the condiment dispenser device 400 with few components contacting the condiment and needing to be cleaned/replaced. This also permits the outlet end of the tube 430 to serve as the dispensing opening through which condiment is discharged from the condiment dispensing device 400, by permitting access to the opening 434A by moving the tube support member 484 to the installation position. Upon installation of the tube 430, the tube support member 484 may be moved back toward a dispensing position with the tube support member 484 aligned with the spout 420. The tube support member 484 may be releasably coupled to the spout 420 in the dispensing position. The installation process is shown and described in greater detail below with regard to FIGS. 25A-H.

The components of the lid 404 may be formed of a plastic, such as ABS as an example. The top cover 422 of the lid 404 includes a surface 436 which may include a label 438. The label 438 may indicate to customers that the condiment dispensing device 400 is contactless and there is no need to touch the dispensing device 400 to dispense the condiment. In another example, the label 438 displays the brand and/or condiment type to a customer. The top cover 422 includes an opening 422A to which a light 423A (e.g., an LED) is mounted to indicate whether the condiment dispensing container 400 is currently dispensing condiment. The top cover 422 also includes an opening 422B to which a light 423B (e.g., an LED) is mounted that indicates the charge level of the battery 450 of the condiment dispensing container 400. The use of these lights are described in greater detail below.

Figure 19A:
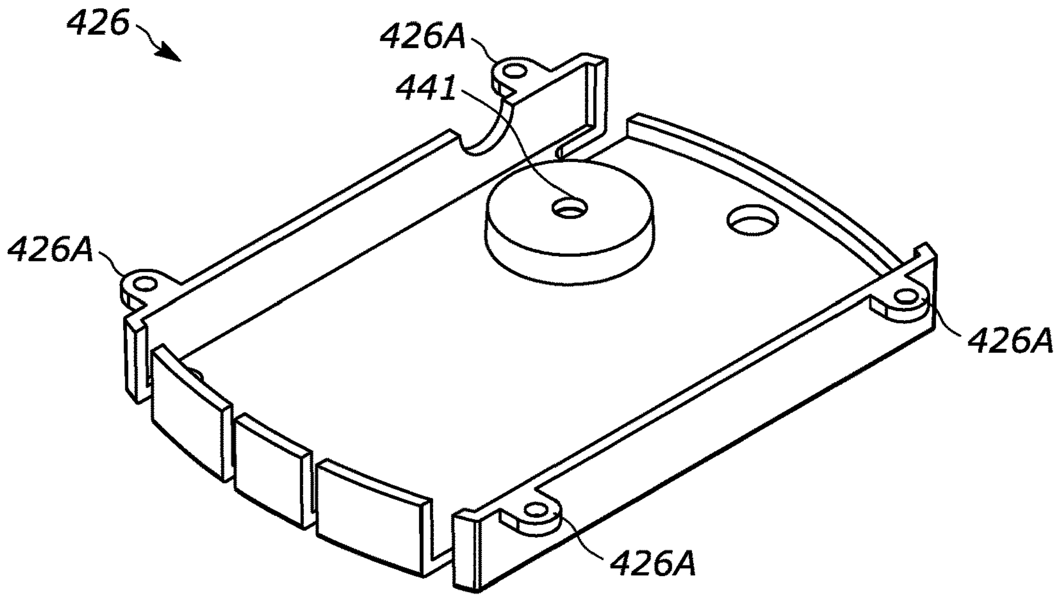
FIGS. 19A-B are top perspective and bottom plan views, respectively, of a bottom cover of the lid of FIG. 18A.
Figure 19B:
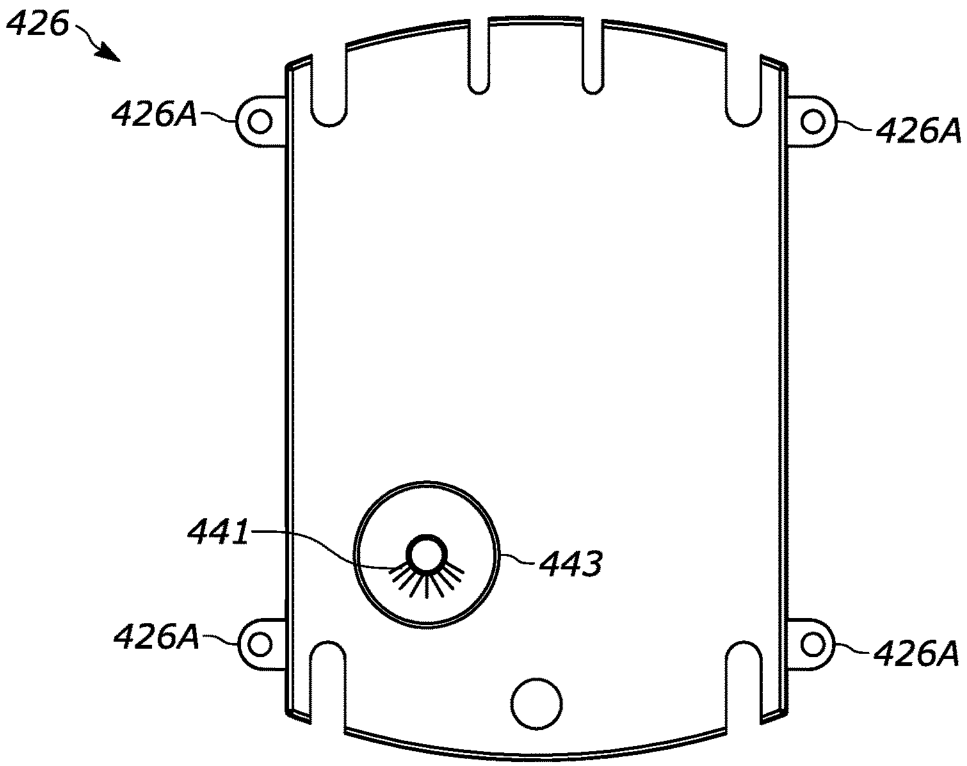
Figure 20A:
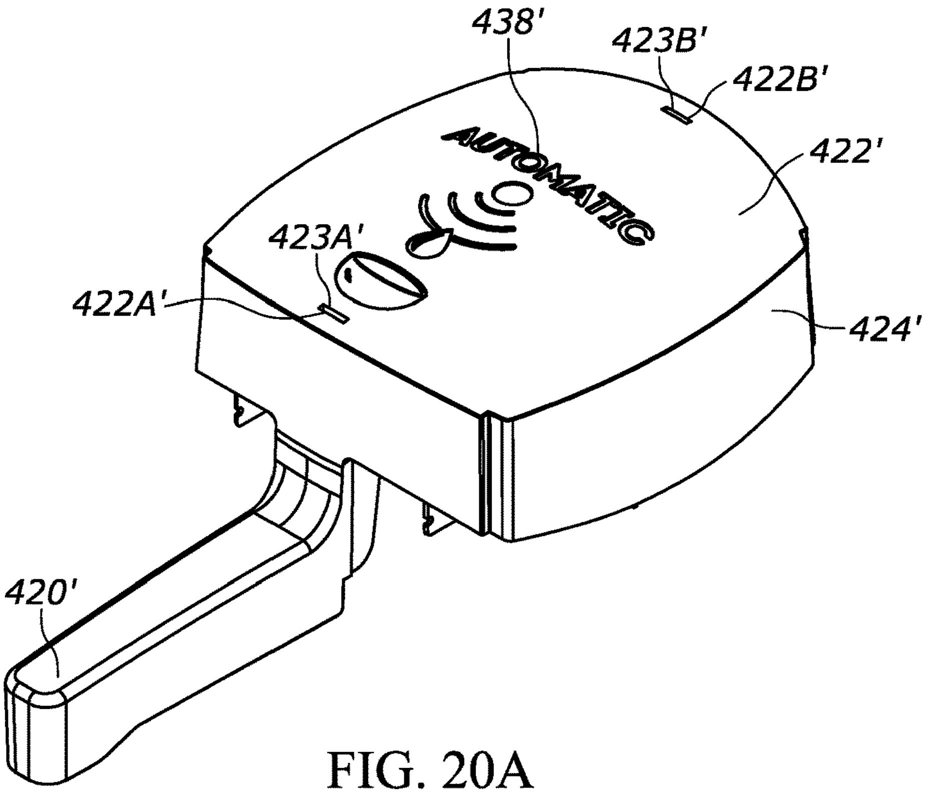
FIGS. 20A-C are top perspective, front elevation, right side elevation views, respectively, of a lid of the condiment dispensing device of FIG. 17A according to a second embodiment.
Figure 20B:
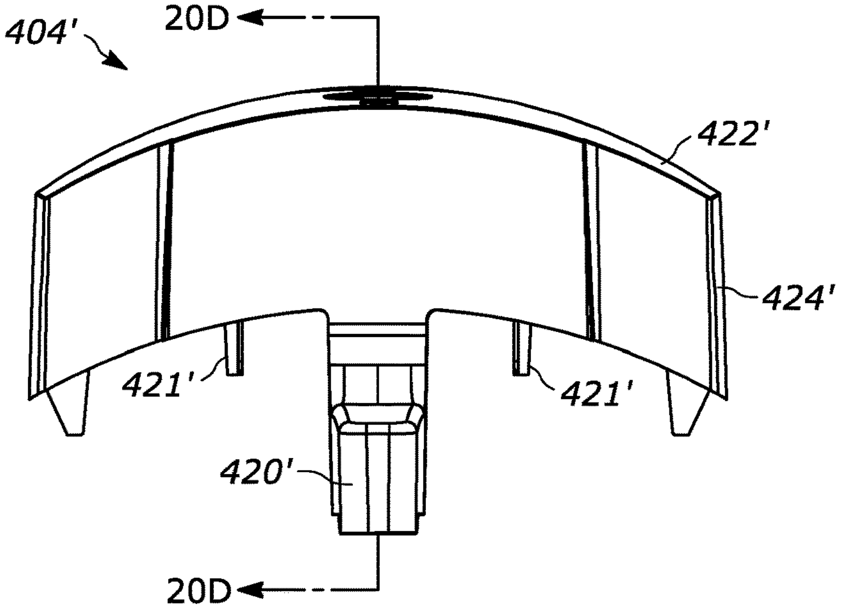
Figure 20C:
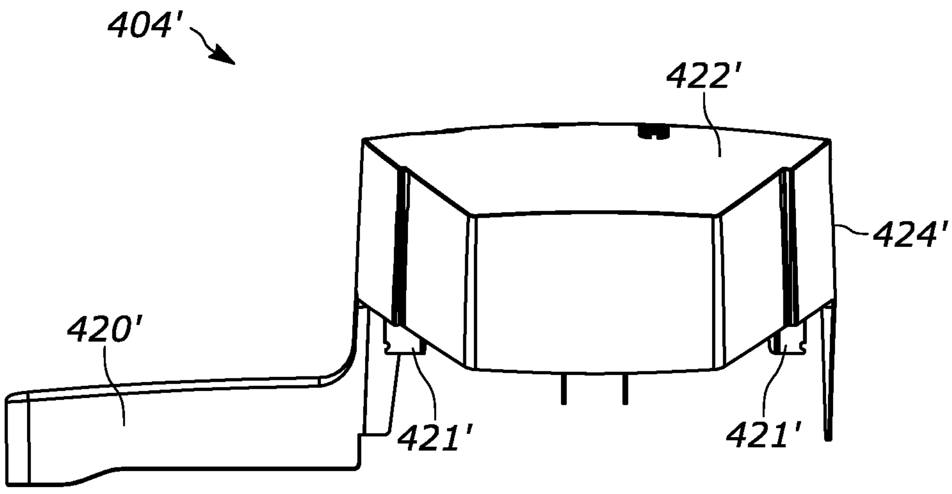
Figure 20D:
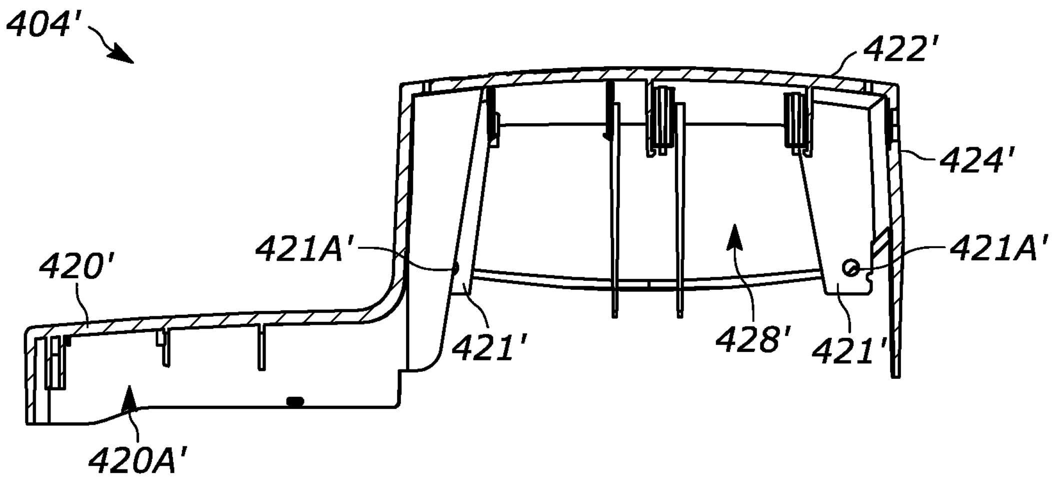
FIG. 20D is a cross-section view of the lid of FIG. 20A taken along lines 20D-20D of FIG. 20B.
Figure 21B:
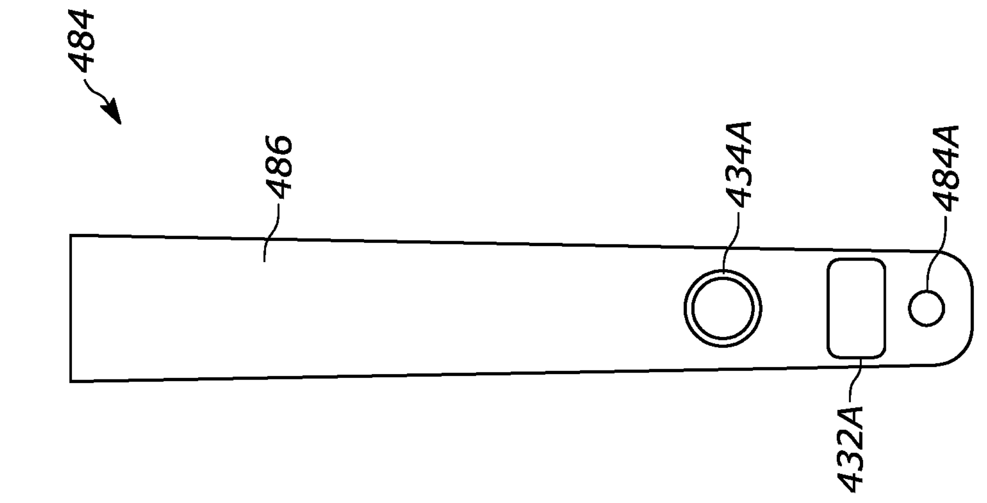
FIGS. 21A-D are bottom perspective, bottom plan, top plan, and right side elevation views, respectively, of a tube support member of the condiment dispensing device of FIG. 17A.
Figure 21A:
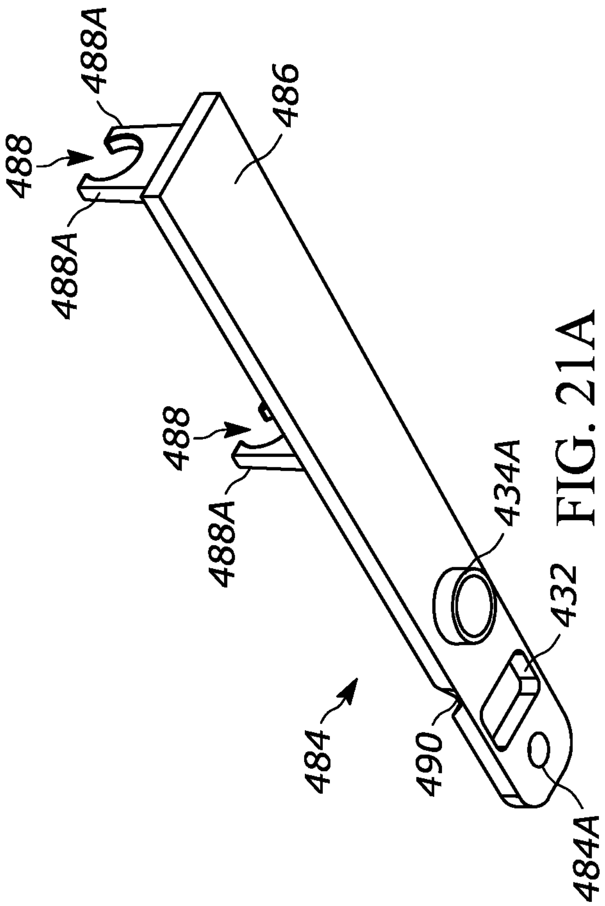
Figure 21D:
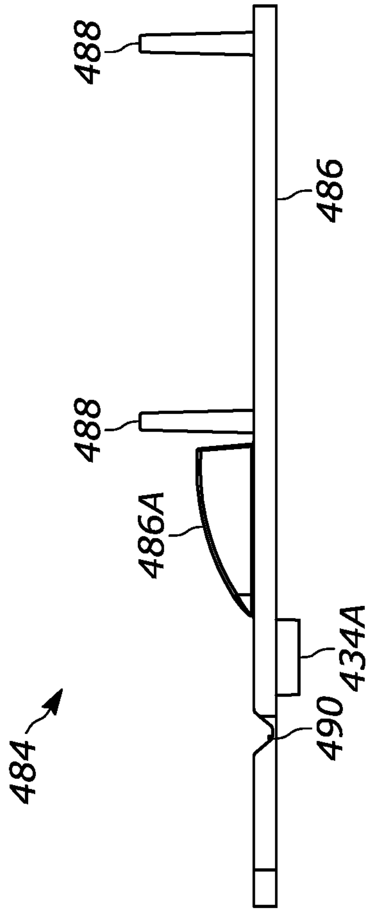
Figure 21C:
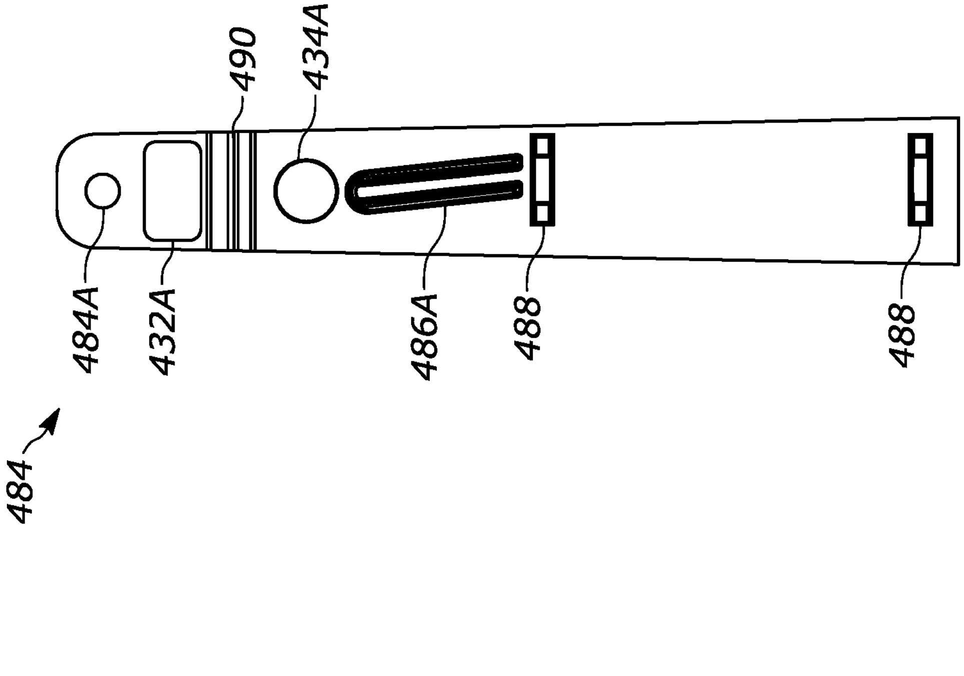
Figure 22B:
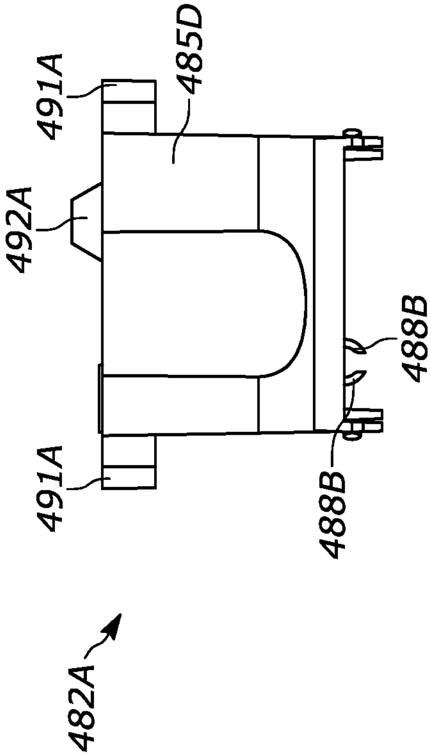
FIGS. 22A-D are front perspective, top plan, front elevation, and right side elevation views, respectively, of a front portion of the pouch carrier of the condiment dispensing device of FIG. 17A.
Figure 22A:
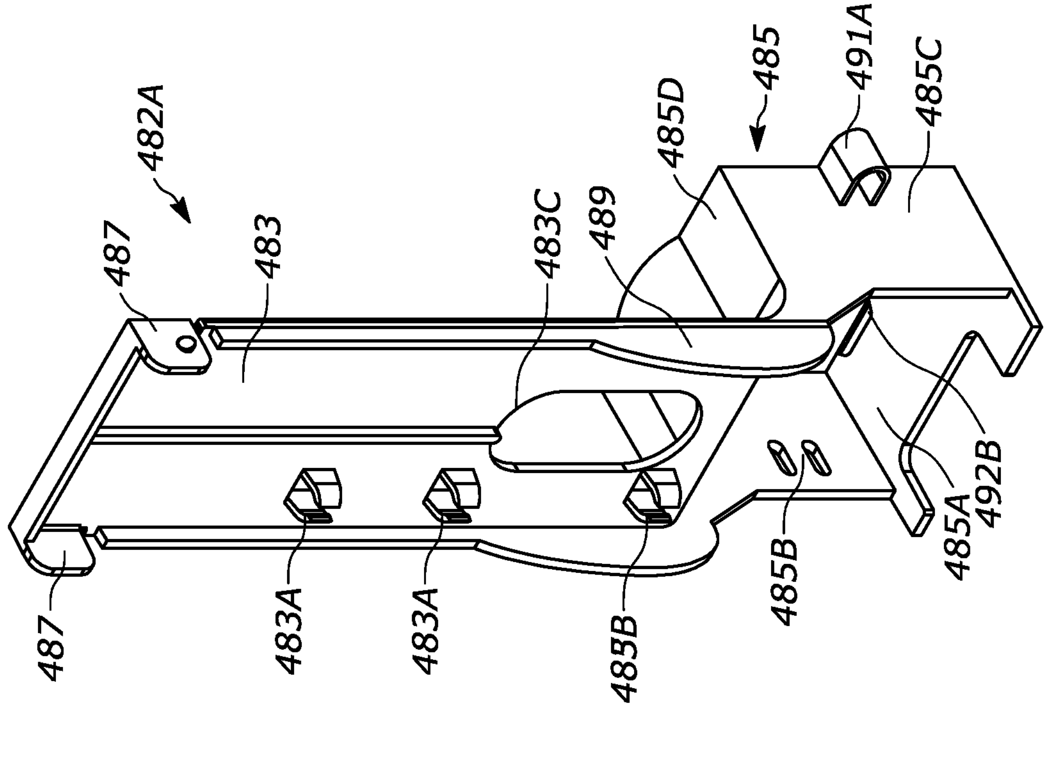
Figure 22C:
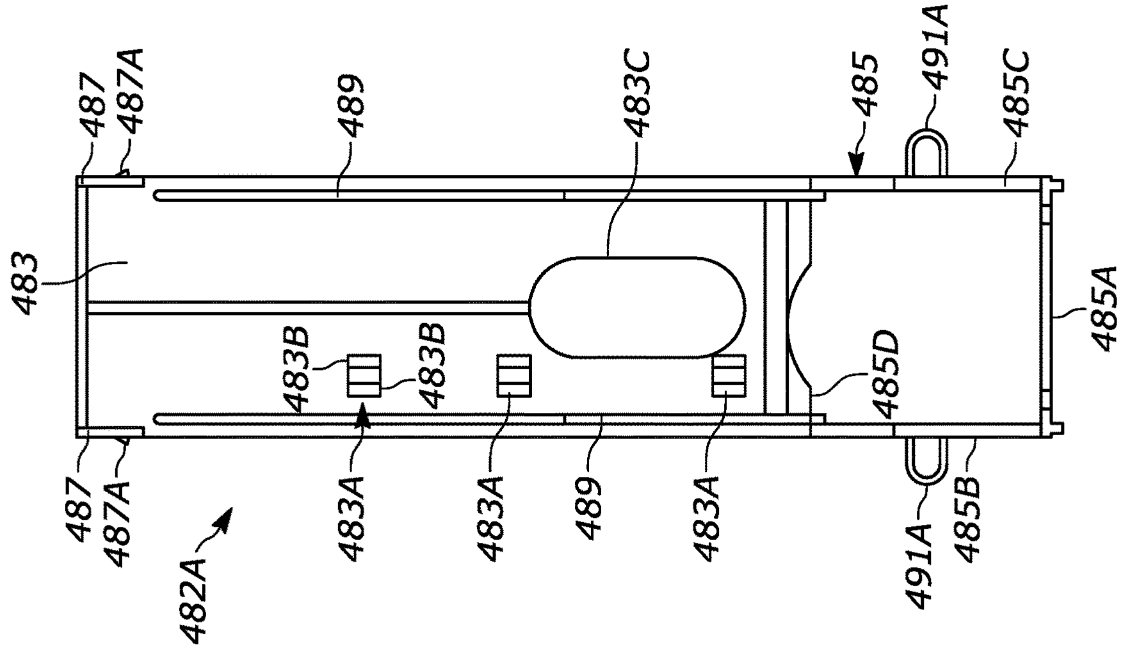
Figure 22D:
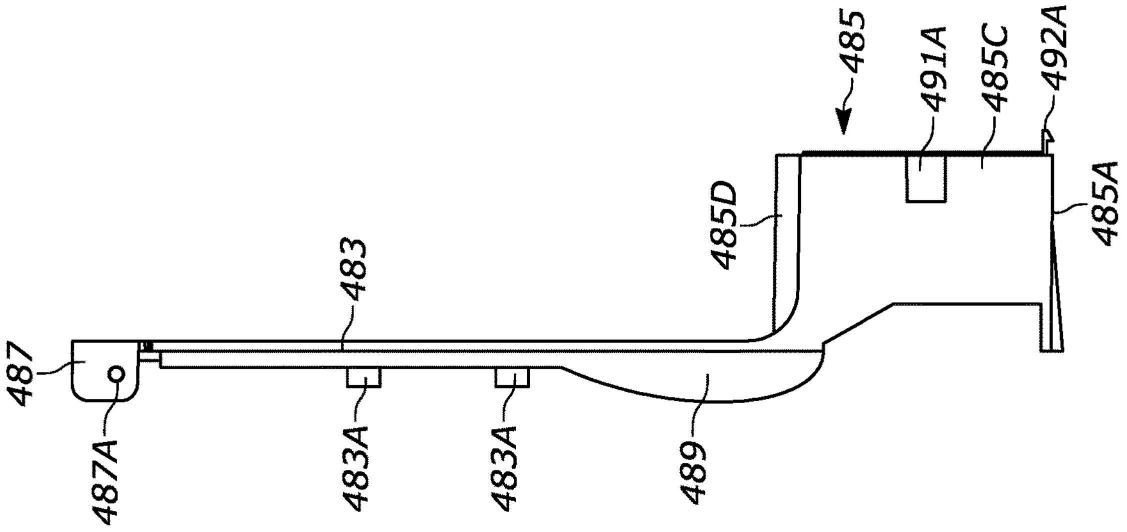

With reference to FIGS. 19A-B, the bottom cover 426 of the lid 404 may be shaped to fit within the interior of the sidewalls 424 of the lid 404. In some forms, the shape of the periphery of the bottom cover 426 conforms to the shape formed by the interior surfaces of the sidewalls 424. The bottom cover 426 includes fastener receiving loops 426A through which fasteners (e.g., screws or bolts) may be extended to attach the bottom cover 426 to the sidewalls and/or top cover 422 of the lid 404. In other embodiments, the bottom cover 426 may be configured to clip or snap to the top cover 422. The bottom cover 426 includes a hole 441 that permits access to a dial 443 used to set the dispensing time of the condiment dispensing container 400. With reference to FIG. 19B, the bottom surface of the bottom cover 426 of the lid 404 may include markings that indicate the current dispensing time setting. For example, the condiment dispensing container 400 may be set to dispense condiment within a range of one second to eight seconds. The dispensing time may be set by rotating the dial 443 to the desired dispensing time setting as indicated by the markings on the bottom cover 426. The dial 443 may include or be coupled to a potentiometer, variable capacitor, variable resistor, or rotary switch that generates a variable output. The dial 443 may be electrically coupled to the circuit board 448 such that the variable output is communicated to the controller of the circuit board 448. The controller operates the pump 452 for the period of time associated with the variable output of the dial 443. For instance, if the variable output ranges from 0-5V, each 0.6 volt increment may correspond to a dispensing time (e.g., 0.6V output selects a one second dispensing cycle, 1.2V selects a two second dispensing cycle, etc.) In some forms, a screwdriver or similar tool is inserted through the hole 441 to turn or adjust the dial 443 to select the dispensing time. This may be desired to inhibit accidental adjustment of the dispensing setting.

Adjusting the length of the dispensing cycle permits the condiment dispensing device 400 to be used to dispense a variety of condiment types. The size of the dose of condiment dispensed may be adjusted via the dial 443 by adjusting the length of the dispensing cycle. Also, the size of the dose may be adjusted based on the condiment being pumped through the tube 430. A thicker or more viscous condiment (e.g., mayo) may require a longer dispensing time to provide a dose the same size as a less viscous condiment (e.g., ketchup). By including an input to set the length of the dispensing cycle, a variety of different condiments may be dispensed with the same condiment dispensing device 400. The lid 404 and pouch carrier 482 may be inserted into a container body 402 indicating the condiment contained within the condiment pouch 425 within the pouch carrier 482.

The spout 420 is connected to the sidewalls 424 and extends away from a sidewall 424 of the lid 404. As described above, the opening 434A is disposed at the end of the spout 420 in the tube support member 484. The opening 434A may receive the tube 430 therethrough and direct the end of the tube 430 that forms the dispenser opening 434 downward to direct where the condiment is dispensed as it is ejected from the dispensing opening 434. The opening 434A may be formed by an annular collar that extends from the bottom surface of the tube support member 484 to aid in orienting the outlet end of the tube 430. The dispensing opening 434 at the outlet end of the tube 430 may be oriented downward when within the opening 434A to direct fluid being dispensed from the spout 420 downward. Having the dispensing opening 434 positioned at the end of the spout 420 and away from the container 402 reduces the likelihood that a customer will contact the container body 402 as they dispense the condiment. For example, positioning the dispensing opening 434 at the end of the spout 420 and away from the container body 402 provides room for a customer to position their plate underneath the dispensing opening 434 without bringing their plate into contact with the container body 402 when dispensing the condiment onto a particular portion of their plate. Reducing the likelihood of customer contact with the condiment dispensing device 400 reduces the likelihood of the transfer of germs, bacteria, and/or disease between customers.

In another form, the dispensing opening 434 may include or be attached to a one-way valve through which the condiment is forced. For example, the opening at the end of the tube 430 may connect to the valve. The valve may be designed such that a force is required to pass the condiment through the valve such that as soon as the force is below a minimum threshold the condiment promptly ceases to pass through the dispensing opening 434 and the valve. This may reduce the likelihood of condiment dripping from the dispensing opening 434 and onto the surface below.

The sensor 432 may sense when to dispense the condiment. The sensor 432 may be a motion sensor for detecting when a user positioned their hand, plate, or food items below the dispensing opening 434. In one example, the sensor 432 is a passive infrared (PIR) sensor. In another example, the sensor 432 is a microwave motion sensor. The sensor 432 may detect motion below the spout 420 or the dispensing opening 434. In another example, the sensor 432 may be a proximity sensor, such as an infrared proximity sensor. The sensor 432 may detect when an object is proximal to the lower side of the spout 420 and/or the dispensing opening 434. For example, the sensor 432 may detect objects that are 2-12 inches below the spout 420. The sensor 432 is electrically coupled to the circuit board 448 of the lid 404. The sensor 432 provides a signal to the circuit board 448 indicating the motion detected and/or the proximity of an object to the sensor 432.

As mentioned above, an outlet end of the tube 430 may be the dispensing opening 434 or may be connected to a dispensing valve. The tube 430 extends along the tube support member 484 within the spout 420 to the pouch carrier 482. With reference FIG. 17B, the tube 430 extends along the length of the pouch carrier 482 to the pump 452, around the pump 452 and to the inlet end at pouch piercer 460. Thus, the tube 430 forms a substantially continuous flow path from the condiment pouch 425 to the dispensing opening 434. The tube 430 may be installed as a single unit that may be removed for replacement and/or cleaning as a single unit. Use of such a single unit tube 430 to form the fluid flow path enables the flow path to be easily cleaned and/or replaced as there are very few components to be removed and cleaned. Use of a tube 430 reduces the ridges, cavities, corners, etc. along the flow path where condiment may collect and be difficult to remove during cleaning. Moreover, by reducing the number of components the fluid contacts as it travels from the condiment pouch 425 to the dispensing outlet, contamination may be reduced. The tube 430 may be suitable for condiments of any variety to flow through and be formed of a flexible food-safe material such as a silicone or rubber. The tube 430 may have an internal diameter of about 3-9 mm and an external diameter of about 5-15 mm. As one example, the tube 430 has an internal diameter of about 5 mm and an external diameter of about 8 mm.

As shown in FIGS. 17B-E, the condiment dispensing container 400 includes a pouch carrier 482 or subframe. The pouch carrier 482 includes a front portion 482A and a rear portion 482B. The pouch carrier 482 forms an interior chamber or space into which a condiment pouch 425 may be inserted so that the pouch 425 is supported by the pouch carrier 482 such that it may be transported with the lid 404 (see FIG. 17E).

With reference to FIGS. 22A-D, the front portion 482A of the pouch carrier 482 includes a sidewall or plate 483 and a base 485 at the lower end of the plate 483. The plate 483 includes an opening 483C therethrough through which the pouch piercer 460 extends to connect the pouch 425 to the pump 452. The front surface of the plate 483 further includes a series of retainers, such as tube holder clips 483A, for receiving and holding the tube 430 along the plate 483 as the tube 430 extends from the pump 452 to the tube support member 484. These tube holder clips 483A may be similar to the tube holder clips 488 of the tube support member 484. The tube holder clips 483A include arms 488B separated by a gap. To attach the tube 430 to the tube holder clips 483A, the tube 430 is forced through the gap and in between the arms 483B to attach the tube 430 thereto. Use of these clips 483A permits the tube to be quickly removed and securely attached to the pouch carrier 482 for cleaning and assembly. With reference to FIG. 17B, the tube holder clips 483A may be offset to one side of the plate 483 due to the position of the tube 430 as the tube 430 extends out the outlet end of the pump 452 so that the tube 430 is not kinked. In other embodiments, the outlet of the pump 452 may be centered along the plate 483 such that the tube 430 extends along the center of the plate 483 to the spout 420.

The upper end of the plate 483 includes tabs 487 extending substantially perpendicularly away from the plate 483. The tabs 487 each include an angled prong 487A that are inserted into holes 421A of the tabs 421 of the lid 404. To attach the front portion 482A to the lid 404, the front portion 482A is positioned such that the tabs 487 are in between the complementary tabs 421 of the lid 404. The prongs 487A are then slid along the surface of the tabs 421 of the lid 404 until the prongs 487A are aligned with the holes 421A of the tabs 421 and the prongs 487 snap into the holes 421A. The tabs 487 of the pouch carrier 482 and tabs 487 of the lid 404 may temporarily deflect from one another when attaching the front portion 482A to the lid 404 and elastically return to their original positions when the prongs 487A snap into the holes 421A. The angled surface of the angled prongs 487A may aid in deflecting the tabs 487, 421 away from one another. In other embodiments, the front portion 482A may be attached to the lid 404 via one or more fasteners.

The plate 483 may further include flanges 489 along the sides thereof that extend perpendicularly away from the plate 483. These flanges 489 may provide increased strength to the front portion 482A to prevent the plate 483 from bending substantially. The flanges 489 may also define a cavity or region on the front surface of the plate 483 containing the tube holder clips 483A to prevent the tube 430 and/or tube holder clips 483A from catching on a surface as the lid 404 and pouch carrier 482 are moved and transported. For instance, the flanges 489 may extend far enough from the plate 483 such that when the lid 404 and pouch carrier 482 are inserted into the container 402 in direction 479 as shown in FIG. 17E, the flanges 489 space the tube 430 and the tube holder clips 483A from the container body 402 to prevent tube 430 and the tube holder clips 483A from snagging or catching on the rim 410.

The base 485 of the front portion 482A defines a cavity for the pump 452. The pump 452 may be mounted proximate an outlet of the condiment pouch 425 to enable the pump to efficiently draw fluid from the pouch 425 and force the fluid via the tube 430 to the dispenser outlet. The performance of the pump 452 may be improved by positioning the pump 452 closer to the outlet opening of the condiment pouch 425 so that the length of the flow path or tube 430 between the condiment pouch 425 and the pump 452 is reduced. As one example, the inlet of the pump 452 is preferably within 100 mm of the outlet opening of the condiment pouch 425 and, more preferably, within 90 mm. As shown the base 485 includes a bottom surface 485A, a first sidewall surface 485B, a second sidewall surface 485C, and a pouch support surface 485D. The first sidewall surface 485B includes two holes therein through which fasteners are extended to affix the pump 452 to the base 485. The base 485 further includes attachment loops 491A used to attach the front portion 482A to the rear portion 482B as described below. The base 485 also includes an attachment tab 492A and a recess 492B for receiving an attachment tab of the rear portion 483B to attach the front portion 482A to the rear portion 482B.

With reference to FIGS. 23A-D, the rear portion 482B of the pouch carrier 482 includes a sidewall or plate 493 and a base 495. The plate 493 includes tabs 497 extending substantially perpendicularly therefrom that each include an angled prong 497A. The tabs 497 and prongs 497A are used to affix the rear portion 482B of the pouch carrier 482 to the tabs 421 of the lid 404 similar to the attachment of the front portion 482A to the tabs 421 of the lid 404. In other embodiments, the rear portion 482B is attached to the lid 404 via fasteners.

The base 495 of the rear portion 482B is configured to be attached to the base 485 of the front portion 482A. The base 495 also includes a bottom surface 495A, a first sidewall 495B, a second sidewall 495C, and a pouch support surface 495D or base member. The base 495 of the rear portion 482B includes attachment loops 491B that align with the attachment loops 491A of the base 485 of the front portion 482A. A clip 499 snaps over the aligned attachment loops 491A, 491B to hold front portion 482A and rear portion 482B together. An end of a clip 499 may be positioned over the loops 491A, 491B of the front and rear portions 482A, 482B that are adjacent one another to attach the front and rear portions 482A, 482B together. The clips 499 include a curved body that is curved to correspond to the shape of the loops 491A, 491B. Each end of the clip 499 includes a projection 499A having a barbed tip that is configured to hook the inside of the loops 491A, 491B of both the front and rear portions 482A, 482B of the pouch carrier 482.

The base 495 of the rear portion 482B further includes an attachment tab 493A that may be inserted into the complementary recess 492B of the base 485 of the rear portion 482B. The base also includes a recess 493B for receiving the attachment tab 492A. The attachment tabs 492A, 493A may include a hook configuration that snaps into or hooks a portion of the complementary recesses to hold the front portion 482A and rear portion 482B of the pouch carrier 482 together.

Thus, to attach the front and rear portions 482A, 482B together, the loops 491A, 491B are aligned with one another. The attachment tab 492A of the front portion 482A is inserted into the recess 493B of the rear portion 482B and the attachment tab 493A of the rear portion 482B is inserted into the recess 492B of the front portion 482A. The clip 499 is then positioned over a loop 491A of the front portion 482A and a loop 491B of the rear portion 482B that are aligned and adjacent to one another. The clip 499 is positioned such that the barbed projection 499A engages the ends of the loops 491 A,B. Force is then applied to the clip 499 to cause the barbed projections 499A to deflect outward over the loops 491A,B. Once the barbed projection 499A passes into the interior of the loop 491A,B, the barbed projection 499A elastically returns to its initial position. A clip 499 is placed over each of the loops 491A,B of the front and rear portions 482A, 482B. The clips 499 aid in securing the front portion 482A to the rear portion 482B to create the pouch carrier 482.

When the front portion 482A and the rear portion 482B of the pouch carrier 482 are attached together, the pouch supporting surfaces 485D, 495D are aligned to form a base or support surface on which the condiment pouch 425 may rest. As shown in FIG. 17E, the pouch carrier 482 thus forms a space between the plate 483 of the front portion 382A, the plate 493 of the rear portion 482B, the pouch supporting surfaces 485D, 495D, and the lid 404 for the condiment pouch 425. The pouch 425 may rest on the pouch supporting surfaces 485D, 495D. Also when the front portion 482A and the rear portion 482B of the pouch carrier 482 are attached together, the bases 485, 495 form a cavity in which the pump 452 and motor 464 are contained.

Figure 23B:
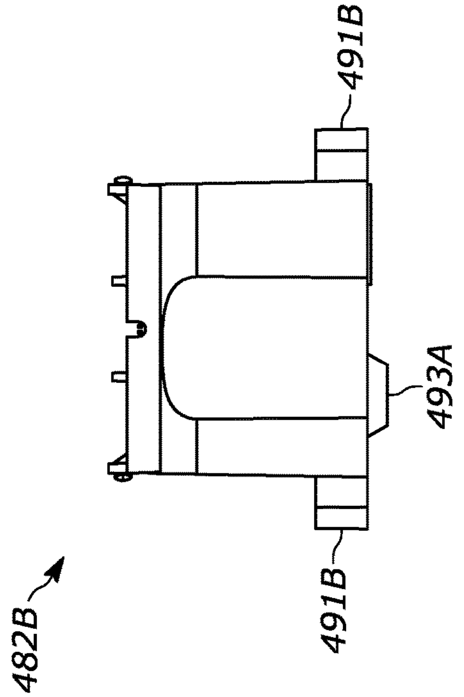
FIGS. 23A-E are front perspective, top plan, front elevation, right side elevation, and rear elevation views, respectively, of a rear portion of the pouch carrier of the condiment dispensing device of FIG. 17A.
Figure 23A:
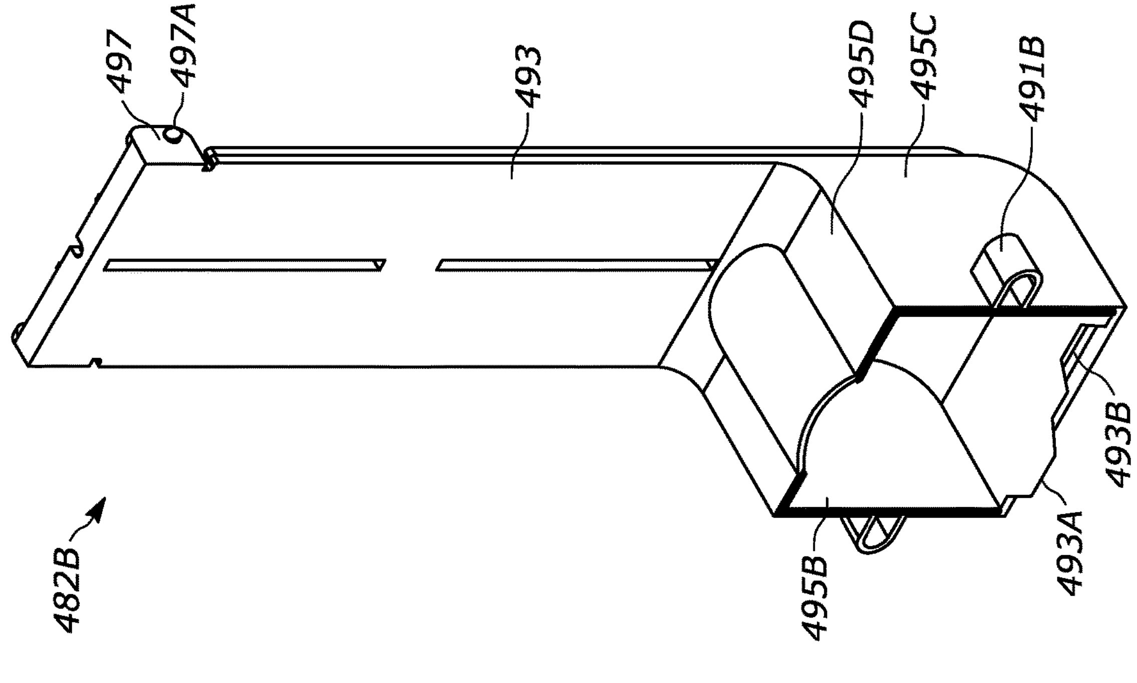
Figure 23C:
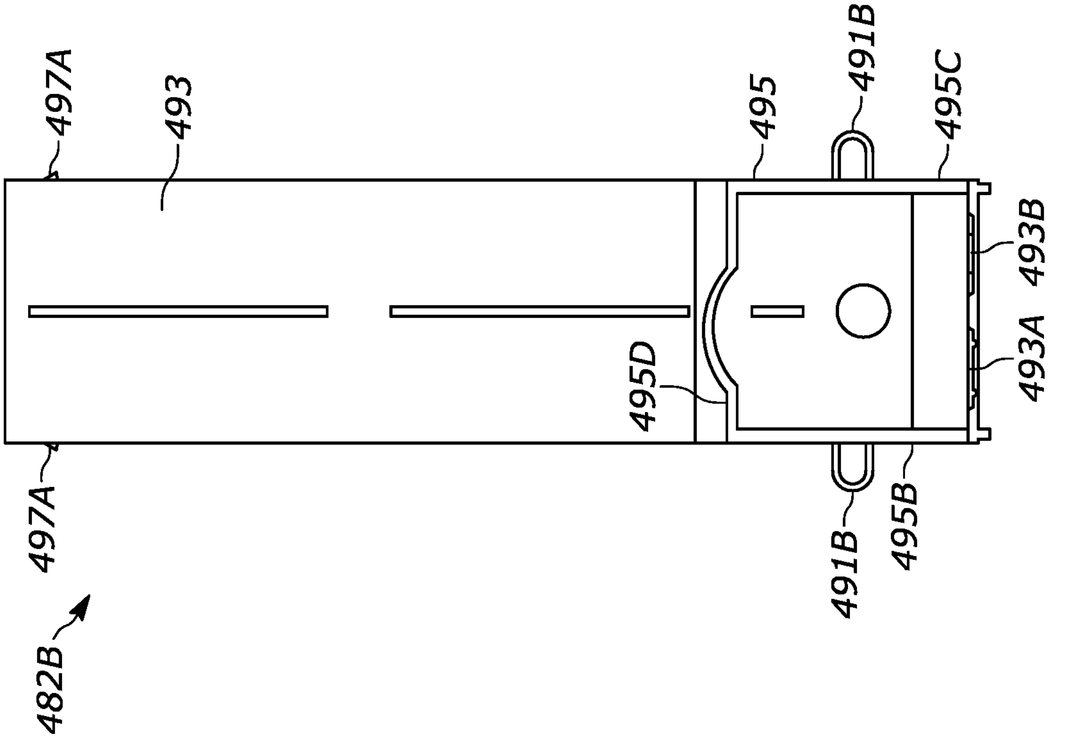
Figure 23D:
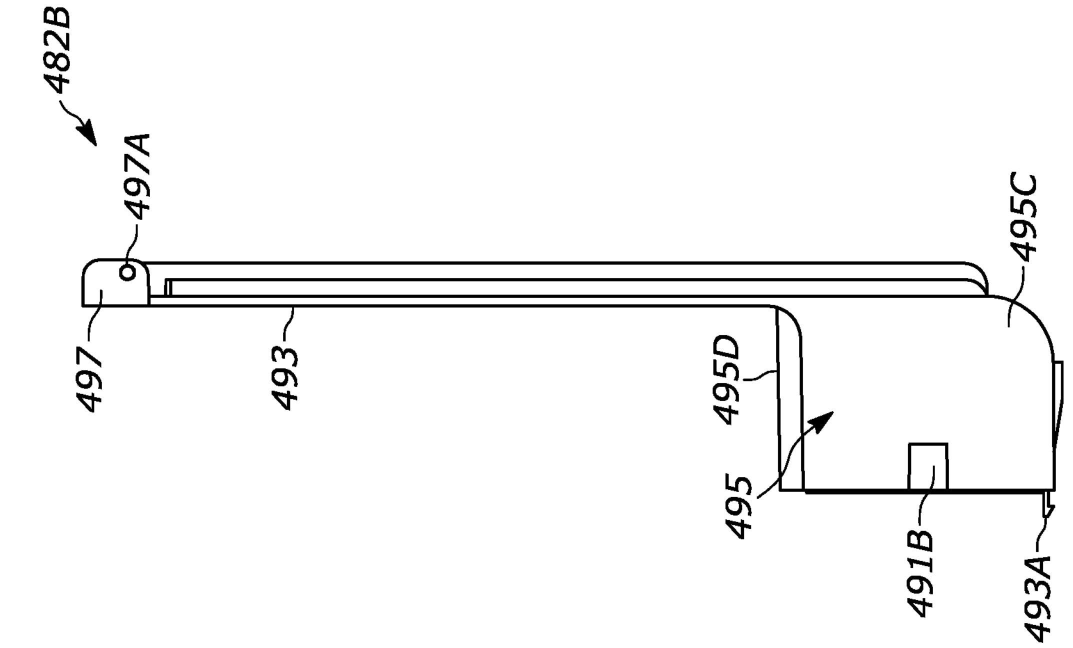
Figure 23E:
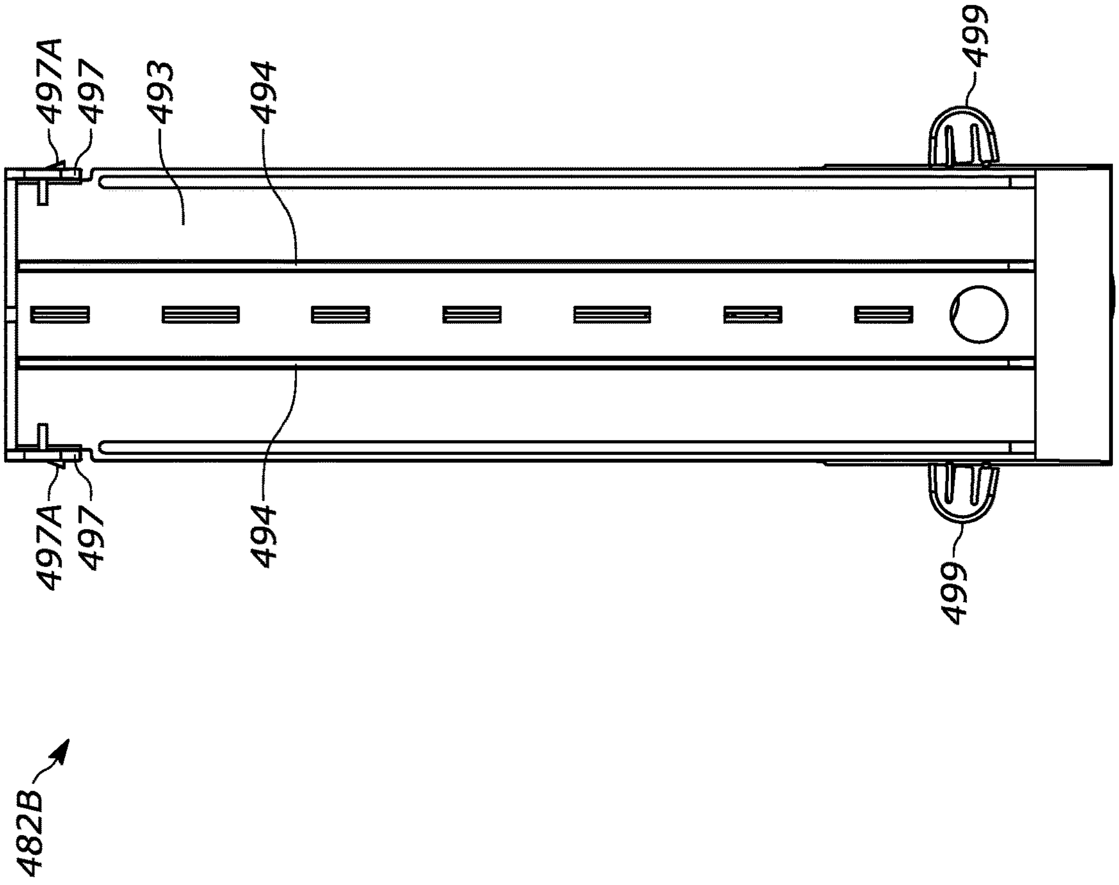
Figure 24A:
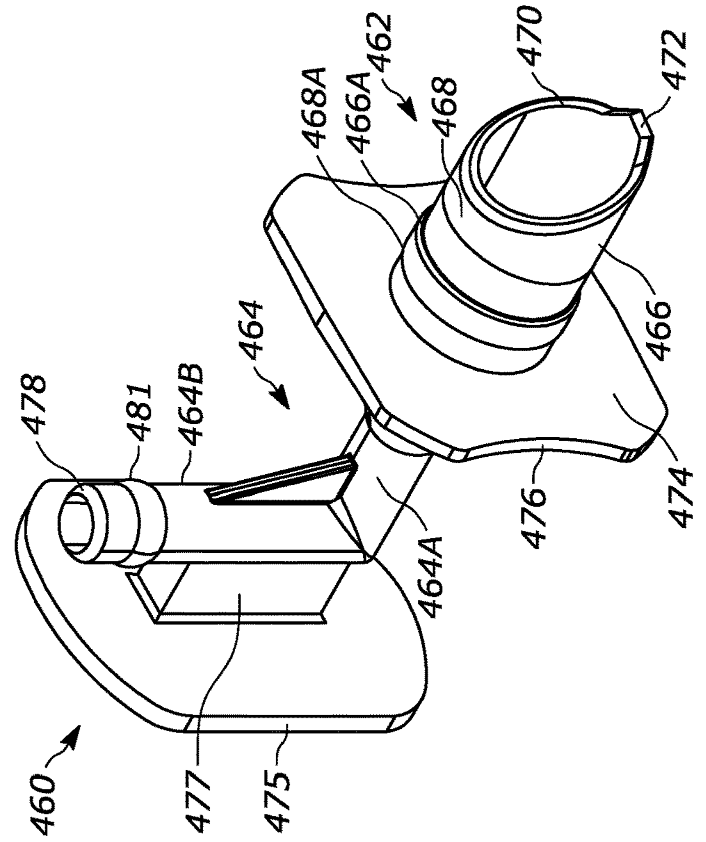
FIGS. 24A-D are bottom perspective, bottom plan, left side elevation, and rear elevation views, respectively, of a pouch piercer of the condiment dispensing device of FIG. 17A.
Figure 24B:
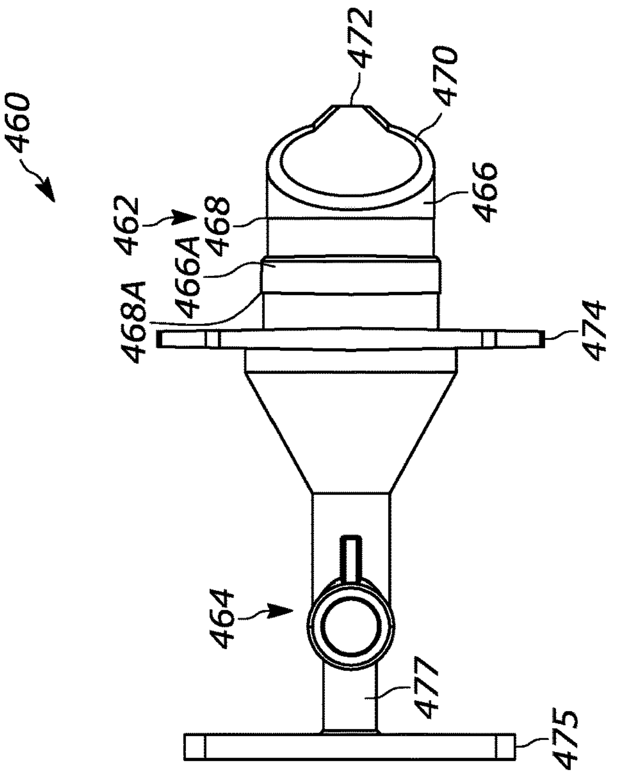
Figure 24D:
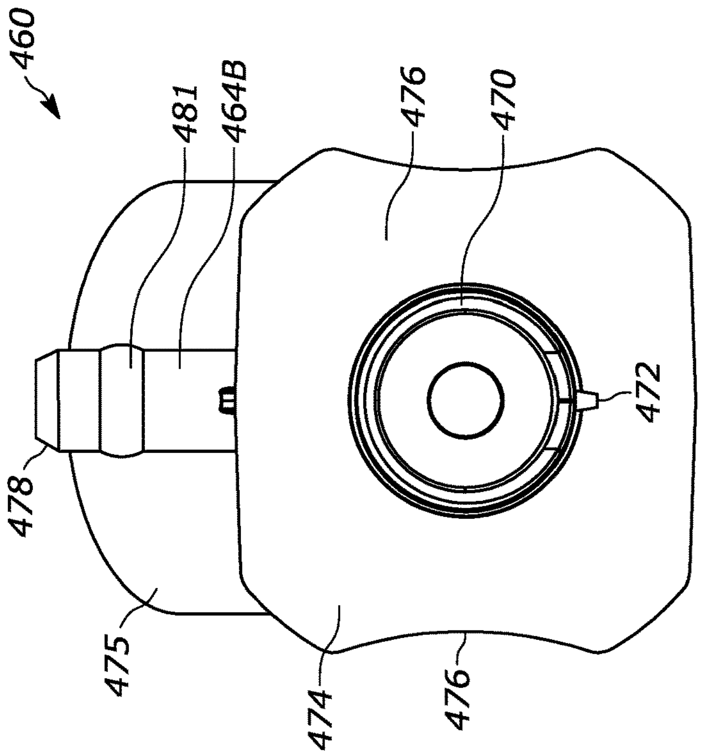
Figure 24C:
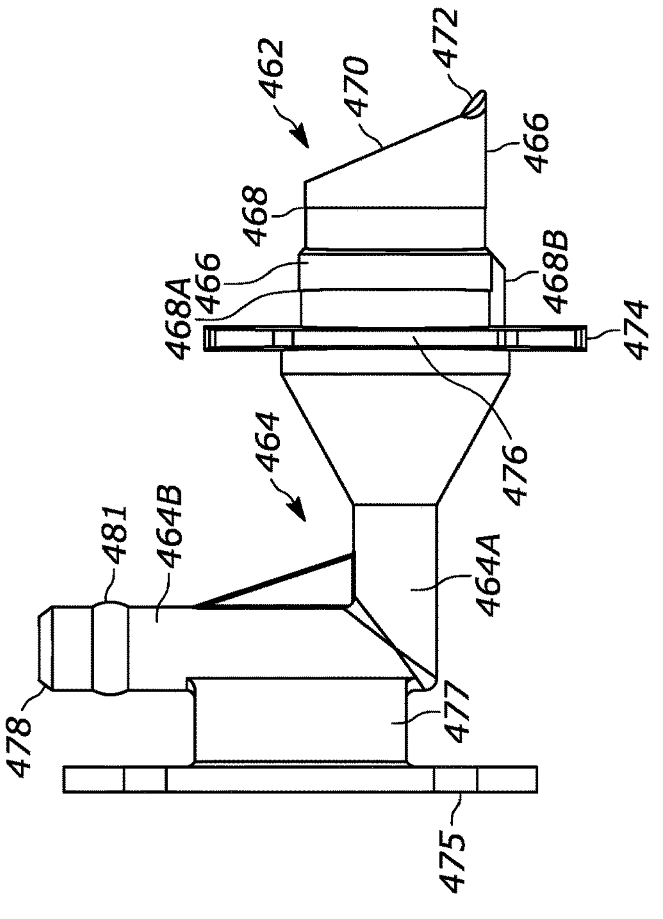

With reference to FIG. 23E, the rear side of the plate 493 of the rear portion 482B includes fins 494 configured to cooperate and engage a corresponding guide track of the container body 402. The container body 402 includes corresponding fins forming the guide track along which the fins 494 of the pouch carrier 482 slide. The guide track serves to guide the pouch carrier 482 as it is inserted and removed from the container body 402. The guide track further secures the pouch carrier 482 to the container body 402.

With reference to FIGS. 24A-D, the pouch piercer 460 includes a body extending along a longitudinal axis and having a first end, such as piercing end 462, for piercing the condiment pouch 425 and a second end, such as an outlet or connecting end 464, for attachment to the tube 430. The piercing end 462 includes a tubular portion 466 for inserting into an opening of a fitment of the condiment pouch 425. The tubular portion 466 may engage the fitment of the condiment pouch 425 such that the pouch piercer 460 remains connected thereto by a friction fit. The tubular portion 466 may be inserted into an attachment opening of the fitment of the pouch 425 that has an internal diameter that is smaller than that of the tubular portion 466. As the tubular portion 466 is inserted into the attachment opening of the fitment, the fitment may elastically expand to fit around and receive the tubular portion 466. As shown, the tubular portion 466 further includes a lip or ridge 468 to a smaller diameter portion of the pouch piercer 460 that the attachment opening of the fitment passes over or hooks to secure the pouch piercer 460 to the fitment of the condiment pouch 425. Once the attachment opening passes over the ridge 468, the attachment opening elastically returns to its original, smaller diameter and hooks the ridge 468 securing the fitment to the pouch piercer 460.

The tubular portion 466 may include an angled face or end 470 having an angled protrusion or tip 472 on the end thereof. The angled tip 472 may be sharp and is configured to be pressed against a portion of the condiment pouch 425 to pierce the pouch 425. The tubular portion 466 of the pouch piercer 460 may be forced into the condiment pouch 425 via the hole created by the angled tip 472. The angle of the angled end 470 aids in gradually expanding and/or tearing the opening formed by the angled tip 472 as the tubular portion 466 is inserted into the condiment pouch 425. The condiment within the pouch 425 may then flow out of the pouch via the tubular portion 466 of the pouch piercer 460 that is positioned within the pouch 425. The angle of the angled end 470 of the tubular portion 466 further aids in keeping the opening of the tubular portion 466 open for the condiment to flow preventing a wall or portion of the pouch covering or blocking the opening. Including the angled end 470 reduces the likelihood that the opening will become blocked by or draw a portion of the pouch against the opening when suction is present in the tube 430 since it is unlikely that a portion of the pouch 425 will lay across the entirety of the opening formed by the angled end 470. The upper end of the angled end 470 opposite the angled tip 472 is in close proximity to the ridge 468 to reduce the difficulty in securing the pouch piercer 460 to the fitment of the pouch 425 as the piercing end 462 is inserted into the fitment of the pouch 425 because the length the fitment slides over the tubular portion 466 before elastically returning to its original position is reduced.

In the embodiment shown, the piercing end 462 of the pouch piercer 460 further includes an annular ridge 466A that forms a step 468A over which another type of fitment that may be used with the condiment pouch 425 may pass over. The annular ridge 466A may have a diameter that is greater than the tubular portion 466 and configured to engage a fitment having a larger attachment opening. Similar to the process of attachment described above, the piercing end 462 of the pouch piercer 460 may be inserted into an attachment opening of the fitment. The attachment opening may elastically expand to receive the annular ridge 466A until the attachment opening passes over the step 468A of the annular ridge 466A to a tubular portion having a smaller diameter than the annular ridge 466A. The fitment of the condiment pouch 425 may hook the step 468A causing the fitment to be attached to the piercing end 462 of the pouch piercer 460. The piercing end 462 of the pouch piercer 460 may further include a longitudinal ridge or fin 468B. When the piercing end 462 is inserted into the fitment of the condiment pouch 425, the fin 468B may prevent the fitment from twisting or rotating within the fitment. For instance, the fin 468B may increase the frictional engagement between the piercing end 462 and the fitment to aid in maintaining the pouch piercer 460 in the installed position. In some forms, the fin 468B may aid to damage or irreversibly deform the fitment to prevent the pouch 425 to from being reused. Condiment pouches 425 are often difficult to clean properly before refilling and reuse and thus deforming the fitment of the pouch 425 may deter and prevent reuse of the condiment pouch 425. In other forms, the fitment may include a longitudinal slot for receiving the fin 468B such that when the fin 468B is within the longitudinal slot the pouch piercer 460 cannot be rotated within the fitment. Thus, the pouch piercer 460 shown is adapted to be used with two different condiment pouch fitment types.

The pouch piercer 460 may include a flange or plate 474 disposed between the piercing end 462 and the connecting end 464. The plate 474 may be positioned to engage a portion of the pouch 425 and/or the fitment within the pouch 425 to which the pouch piercer 460 connects to inhibit the pouch piercer 460 from being inserted too far into the pouch 425 (e.g., through both walls of the pouch 425). Once the pump 452 begins withdrawing the condiment from the pouch 425 via the pouch piercer 460, the plate 474 may remain engaged with the pouch and prevent the pouch piercer 460 from being further inserted within the pouch 425. The plate 474 may have a substantially square cross-section with recessed portions 476 along one or more sides. The recessed portions 476 enable the user to both firmly and ergonomically grip the pouch piercer 460 when inserting the pouch piercer 460 into the pouch 425 and when removing the pouch piercer 460 from the pouch 425.

The connecting end 464 of the pouch piercer 460 is configured to attach to the tube 430 that extends through the pump 452. The connecting end 464 includes a reducer that narrows the diameter from the tubular portion 466 to the diameter of the tube 430. The tube 430 may vary in size based on the condiment within the pouch 425 and/or the desired flow rate of the condiment through the tube 430 and dispensed to the user. The connecting end 464 includes two tubular segments 464A,B attached at approximately a ninety degree angle relative to one another to direct the flow of condiment in a direction substantially perpendicular to the fitment of the condiment pouch 425. In other embodiments, the two tubular segments may be attached at another angle, for example, in the range of zero to ninety degrees relative to one another. In other forms, there is one tubular segment positioned at an angle relative to the reducer portion. In yet other forms, the tubular segment is curved to redirect the condiment flow to the desired direction.

The connecting end 464 of the pouch piercer 460 may include a tip 478 that is inserted into an end of the tube 430. The outer diameter of the tip 478 may be sized to fit within the inner diameter of the tube 430. The tip 478 may be sized to be inserted into the end of the tube 430 and secured thereto by a friction fit. In the embodiment shown, the tip 478 includes a rounded ridge 481 disposed about the circumference of the tip 478. The rounded ridge 481 extends radially from the tip 478 and aids in engaging the inside of the tube 430 to secure the pouch piercer 460 to the tube 430.

The pouch piercer 460 extends through the opening 483C in the front portion 482A of the pouch carrier 482. In some embodiments, as shown in FIG. 24A-D, the pouch piercer 460 includes a plate 475 is attached to the second tubular segment 464B via a support member 477. The plate 475 provides a surface on which a user may press or apply a force to when inserting the pouch piercer 460 into the condiment pouch 425. For instance, plate 475 serves as a push plate on which a user may place the palm of their hand to push the pouch piercer 460 into the condiment pouch 425 or fitment thereof. The plate 475 also aids to prevent the vertical tubular segment 464B or the tip 478 thereof from coming into contact with the walls of the container body 402. This prevents the vertical tubular segment 464B or the tip 478 from potentially becoming contaminated. The plate 475 may be sized such that it cannot pass through the opening 487 in the front portion 482A. When the pouch piercer 460 is positioned within the pouch carrier 482, the plate 475 of the pouch piercer 460 may prevent the pouch piercer 460 from passing all the way through the opening 487, thereby preventing the pouch piercer 460 from becoming drawn too far away from the pump 452 when the tube 430 is attached thereto and jerking the tube 430 or the pump 452. This may aid to reduce the forces applied to the pump 452 which could otherwise cause damage as the pouch 425 is removed. In some embodiments, the plate 475 is configured to be attached to the front portion 482A to hold the pouch piercer 460 in place. For example, the plate 475 may be snapped to the plate 483 of the front portion 482A or affixed to the front portion 482A by fasteners.

With reference to FIGS. 26A-E, a pouch piercer 460 is shown according to another embodiment that is similar in many respects to the pouch piercer 460 described with regard to the pouch piercer 460 of FIGS. 24A-D, the primary difference being that the pouch piercer 460 of does not include the plate 475 or the support 477. A user may insert the piercing end 462 into a fitment of a pouch 425 by pressing or gripping another portion of the pouch piercer 460, for example, the plate 474. The angled tip 472 may also be sharper or more pointed that in the embodiment of FIGS. 24A-D to aid in piercing and/or tearing the pouch 425 during insertion.

As mentioned above, the tube 430 connects to the connecting end 464 of the pouch piercer 460. Due to the angled tubular segments 464A,B, the tube 430 extends downward from the pouch piercer 460 to the pump 452. The tube 430 passes through the pump 452, upward along the plate 483 of the front portion 482A, and along the spout 420 before terminating at the opening 434A in the tube support member 484. In some forms, the distance between the condiment pouch 425 and the pump 452 is less than 90 millimeters. As mentioned above, positioning the pump 452 proximate the condiment pouch 425 may be advantageous for increasing the performance and efficiency in pumping the fluid through the tube 430, particularly in embodiments where a peristaltic pump 452 is used. This reduces the length of tube through which suction is relied on to draw fluid (e.g., air and/or condiment) toward the pump 452.

The pump 452 shown in FIGS. 17A-E is a peristaltic pump and operates similarly to the pumps of the previous embodiments. For instance, the tube 430 may be positioned within the pump housing 454 about a roller having a plurality of rounded arms or wheels that engage or squeeze the tube 430. The rounded arms or wheels are rotated by the motor 464 of the pump 452 to force the condiment or fluid along the tube 430. This forces fluid along the tube 430 to the dispenser opening 434 while creating a vacuum within the tube 430 to withdraw fluid from the condiment pouch 425. The pump 452 is housed within the cavity formed by the base of the pouch carrier 482. The pump 452 is affixed to the sidewall 485B of the base 485 of the front portion 482A of the pouch carrier 482.

The pump 452 may receive electrical power from the power source (e.g., a battery) and/or circuit board 448 disposed within the lid 404 of the condiment dispensing container 400 via a plurality of wires extending from the lid 404 of the condiment dispensing container 400 to the pump 452. The wires may extend along the plate 493 of the rear portion 482B of the pouch carrier 482. In some forms, the pump 452 may further receive a control signal via the plurality of wires.

As examples, the pump 452 may be configured to be powered by a 6V, 12V, or 24V DC power source. The pump 452 may receive electrical power from the battery 450 or from a power conditioning circuit of the circuit board 448. The pump 452 is configured to pump fluid through the tube 430 at varying flow rates, depending on the speed of the electric motor 464 and the inner diameter of the tube 430. As an example, where the inner diameter of the tube 430 is four millimeters, the pump 452 moves fluid through the tube 430 at a flow rate of up to about 450 mL/minute. As another example, where the inner diameter of the tube 430 is two millimeters, the pump 452 moves fluid through the tube 430 at a flow rate of up to about 50 mL/minute.

The circuit board 448 may be or include a controller, such as a microcontroller or processor. The circuit board 448 may be electrically coupled to the sensor 432, the pump 452, and the battery 450. The circuit board 448, the sensor 432, and/or the pump 452 may receive power from the battery 450. The battery 450 may be a rechargeable battery such as lithium ion battery. In other embodiments, other battery types may be used, for example, standard household battery cells (e.g., AA, C, D batteries). The circuit board 448 may be electrically coupled to the sensor 432 via wires or a ribbon that extends from the circuit board 448, out of the bottom cover 426 of the lid 404, and along the spout 420 to the sensor 432. The circuit board 448 may provide electrical power to the sensor 432 via the ribbon or wires. The sensor 432 may also communicate with the circuit board 448 via the ribbon. For example, the sensor 432 may provide signals to the circuit board 448 indicating whether motion is detected or whether an object is proximal to the sensor 432. The sensor 432 may continuously provide sensor data to the circuit board 448 for processing and analysis. In another example, the sensor 432 only provides a signal to the circuit board 448 when motion is detected or when an object is detected to be proximal to the sensor 432.

Upon receiving a signal from the sensor 432 indicating that motion is detected or an object is proximal to the sensor 432, the controller of the circuit board 448 may determine whether to actuate the pump 452 to dispense the condiment. In one example, the controller actuates the pump 452 upon receiving communication from the sensor 432 indicating motion has been detected or an object is proximal to the sensor 432. In another example, the controller processes the communication to determine the length of time for which motion is detected or that an object has been proximal to the sensor 432. For example, the controller may be configured to monitor the motion signals for a certain period of time before dispensing the condiment, for example, for one or two seconds. Requiring a detection of motion for a certain minimum period of time may reduce the likelihood that condiment is dispensed when a user is not ready or when the sensor 432 detects movement that is not meant to request fluid be dispensed. Similarly, where the sensor 432 is a proximity sensor, the controller may be configured to dispense the condiment only after the object has been proximal to the sensor 432 for a minimum period of time.

The controller may be configured to delay the dispensing of the fluid for a certain period of time after determining that a user desires the condiment be dispensed (e.g., user motion or proximity). The controller may wait one or two seconds, for example, before operating the pump 452 to dispense the condiment. This allows time for the user to position their container, plate, or food item underneath the dispensing opening 434 before the condiment is dispensed. This may reduce the dispensing of fluid when a user is not ready, which may result in the condiment being dispensed on the surface on which the container rests or where not desired by the user. The condiment dispensing device 300 may indicate to the user when the condiment is going to be dispensed via the indicator light 423A on the lid 404. The indicator light may, for instance, turn green when the condiment dispensing device 300 has detected the user desires the condiment and is going to dispense, allowing the user to position their container or food item accordingly.

The controller and/or sensor 432 may continue to monitor whether a user's container or food item is below the dispensing opening 434 of the spout 420 while the condiment dispensing container 400 is dispensing the condiment. This enables the controller to promptly cease dispensing fluid upon detecting that the user no longer has their container or food item placed below the dispensing opening 434. For instance, if a user places their food item below the dispenser opening 434 and pulls their food item away from the dispensing opening while the condiment is still dispensing, the sensor 432 will detect that the food item is no longer below the dispenser opening and cease dispensing fluid. Similarly, the controller may continuously monitor for whether a container, plate, or food item is under the dispenser opening 434 while dispensing fluid and continue to dispense the condiment for a set period of time (e.g., the period of time selected via dial 443) while an object is detected.

In response to detecting motion or an object proximal to the sensor 432, the controller may cause the pump 452 to operate to dispense the condiment. When the controller actuates the pump 452, the controller may send a signal or power the electric motor 464 of the pump 452 to cause the pump 452 to operate. In operation, the electric motor 464 rotates the rollers 458 to bring the rounded arms 460 into contact with the tube 430 to squeeze the tube 430 and force the condiment through the tube 430 and out of the dispensing opening 434. The controller may provide a signal to the electric motor 464 until the desired amount of condiment has been dispensed. In this embodiment, the controller sends a signal indicating how long to operate the pump 452 based on the user selected setting of the dial 443. A user may select how long to operate the pump 452 for upon detecting proximity or motion via the sensor 432. The user may select the dispensing time based on the type of condiment being dispensed. For instance, a user may select a longer pump operation time for more viscous condiments such as mayonnaise and a shorter dispensing time for less viscous condiments such as ketchup. The user may also select a pump operation time based on the average amount of condiment typically desired by a customer and amount of condiment dispensed by the condiment dispensing container 400 at various dispensing times. The user may adjust the dispensing time by turning the dial 443 on the bottom cover 426 of the lid 404. As one example, a user may insert a screwdriver into the hole in the bottom cover 426 to turn the dial 443 to select the desired dispensing time (e.g., one to ten seconds). In other forms, the dial 443 may include a knob that a user may grasp and twist to adjust the dispensing time.

Once the electric motor 464 has operated the set period of time, the controller and/or the electric motor 464 may cease operation, causing fluid to no longer be dispensed via the dispensing opening 434. In one embodiment, the controller signals the electric motor 464 to operate in a reverse direction after dispensing condiment. For instance, the electric motor 464 may be rotated in the reverse direction by a quarter turn. This causes prompt cessation of the condiment from being dispensed and may draw the condiment further inside the tube 430 and away from the dispensing opening 434. This may reduce dripping of the condiment out of the dispensing opening 434. The electric motor 464 may be rotated in the reverse direction anytime the condiment dispensing container 400 ceases to pump fluid to the customer, such as when the sensor 432 detects that the customer has withdrawn their container or food item from underneath the dispenser opening 434. This reduces the amount of fluid that is spilled or drips onto the surface below the dispenser opening 434.

The controller may be configured to delay dispensing for a period of time after a dispensing cycle before dispensing condiment again. This allows the user to move their plate, container, or food item out of the range of the sensor 432 before dispensing another dose of the condiment. In one embodiment, the controller may be configured to monitor the sensor 432 data to determine whether a user continues to desire condiment to be dispensed (e.g., their plate, container, or food item remains under the sensor 432 after a dispensing cycle has ended), the controller may delay dispensing the condiment for a period of time to ensure the user has had time to move away from the sensor 432. The controller may delay for a certain period of time, for example, one, two, or three seconds and then dispense another dose of the condiment. This provides adequate time for a user to withdraw their plate, container, or food item from the range of the sensor 432 if they no longer desire additional condiment. This reduces the likelihood that the controller will cause condiment to be dispensed after a user has pulled their plate, container, or food item away from the dispending end 434.

In other embodiments, the controller is configured such that condiment is no longer dispensed until the user withdraws their plate, container, or food item from the range of the sensor 432 and then repositions it underneath the dispenser opening 434. In these embodiments, the condiment dispensing container 400 will not dispense any more condiment to the customer after a dispensing cycle has ended until the user moves their plate, container, or food item away for a certain period of time.

The battery 450 is stored within the lid 404 and electrically powers the electrical components of the condiment dispensing container 400. The battery 450 may include a plurality of batteries and rest on the bottom cover 426 and within the cavity of the lid 404. The battery 450 is electrically coupled to the circuit board 448 via wires. The circuit board 448 and/or controller supply the power to the electrical components of the condiment dispensing container 400 including the pump 452 and the sensor 432. The battery 450 is rechargeable via a recharging port 468 on the rear of the lid 404. The recharging port 468 may be similar to the recharging port 168 of the first embodiment shown in FIG. 6. The condiment dispensing container 400 may include a charging cord that plugs into an electrical outlet or a USB port to charge the battery 450. The condiment dispensing container 400 may be periodically recharged when the battery 450 is low or may be continuously plugged into a power source via the charging cord to keep the battery 450 fully charged while the condiment dispensing container 400 is in use. The lid 404 may include an indicator light 423B (see, e.g., FIG. 18A) that indicates the charge level of the battery 450. For instance, the indicator light may be an LED that lights up green when the battery charge level is more than 60%, yellow when the charge level is 25%-60%, and red when the charge level is less than 25%. In some forms, the condiment dispensing container 400 may be operated for a certain number of dispensing cycles and indicates the charge level accordingly. For example, where the battery 450 is configured to provide 2,000 doses of condiment when fully charged, the indicator light 423B may indicate that the condiment dispensing device 400 needs to be charged when the condiment dispensing device 400 can provide less than 500 doses of condiment. In some forms, the indicator light 423B flashes red when the battery 450 charge level is very low, for example, less than 10% charged.

In some embodiments, the condiment dispensing container 400 includes two or more lids 404. Using multiple lids 404 allows one lid 404 to be in use with the container body 402 to dispense condiment to customers while the other lid(s) 404 are charging. Thus, the lids 404 may be swapped periodically so that the condiment dispensing container 400 always has a lid 404 being charged. In other embodiments, the battery 450 is replaceable such that when the condiment dispensing container 400 is out of charge, the battery 450 within the lid 404 needs to be replaced. In yet other embodiments, as described above, the condiment dispensing container 400 may be recharged via the mains power while also being used and thus only one lid 404 is necessary.

The circuit board 448 may also include communication circuitry configured to communicate with one or more remote devices. The communication circuitry may be configured to communicate via direct wireless signals, for example, Bluetooth, Zigbee, and/or Z-Wave. Additionally or alternatively, the communication circuitry may communicate via a network, for example, via Cellular or Wi-Fi networks. In some embodiments, the controller of the condiment dispensing container 400 may communicate to a computer of a restaurant or employee that the condiment level of the condiment dispensing container 400 is low or that the battery 450 charge level of a condiment dispensing container 400 is low and needs to be recharged or replaced.

Figure 17C:
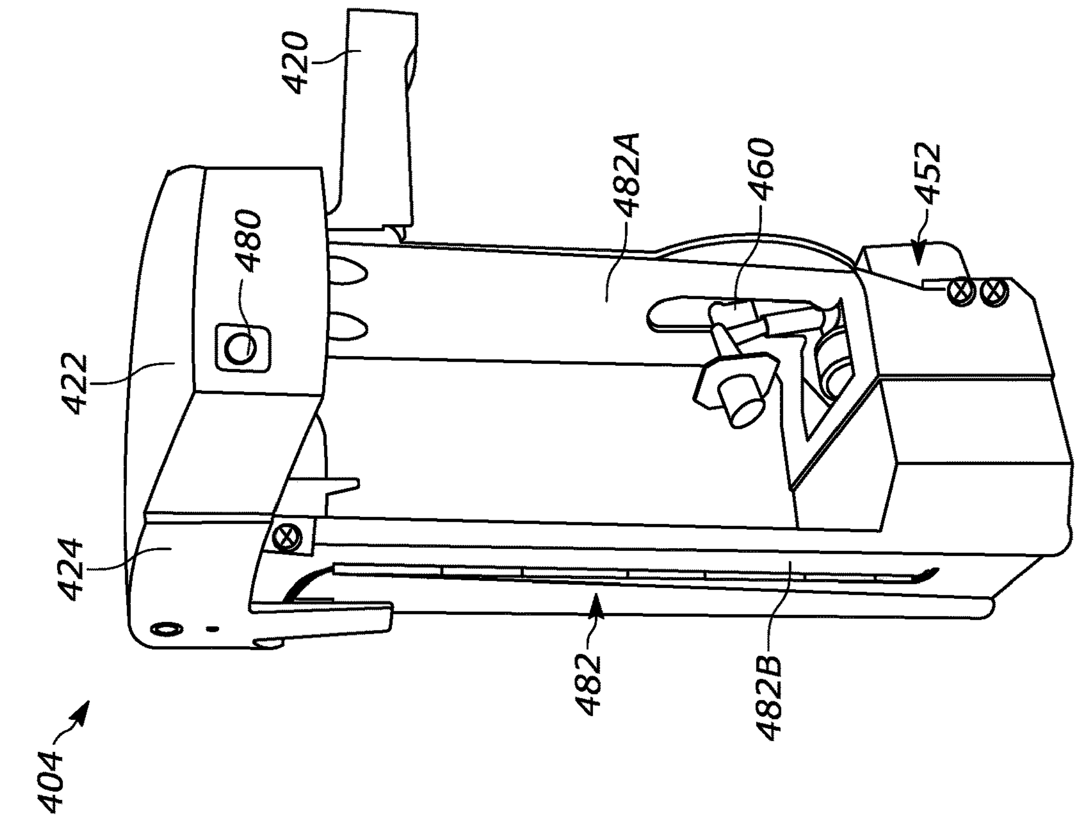
FIG. 17B-C are front perspective and rear perspective views, respectively, of a lid and pouch carrier of the condiment dispensing device of FIG. 17A.
Figure 17B:
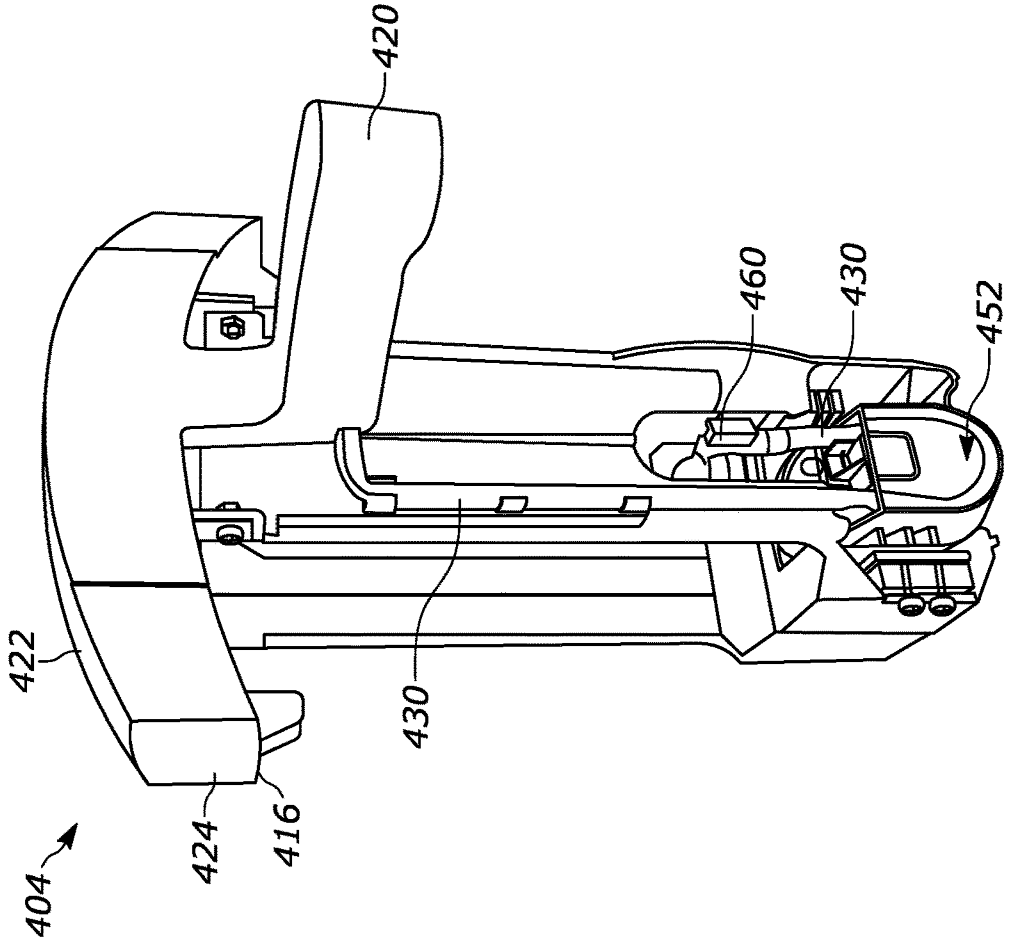
Figure 17D:
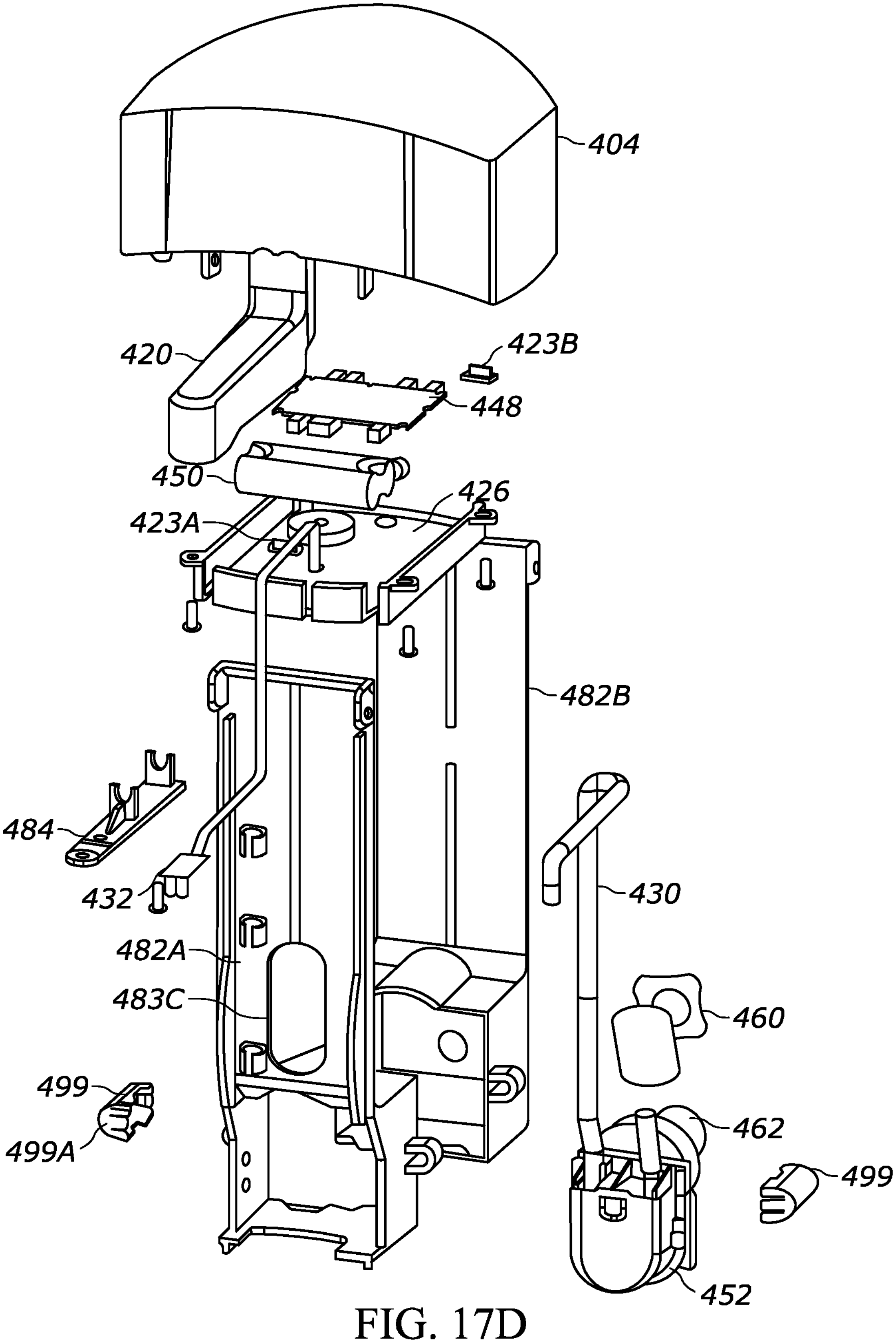
FIG. 17D is an exploded view of the lid and pouch carrier of the condiment dispensing device of FIG. 17A.
Figure 17E:
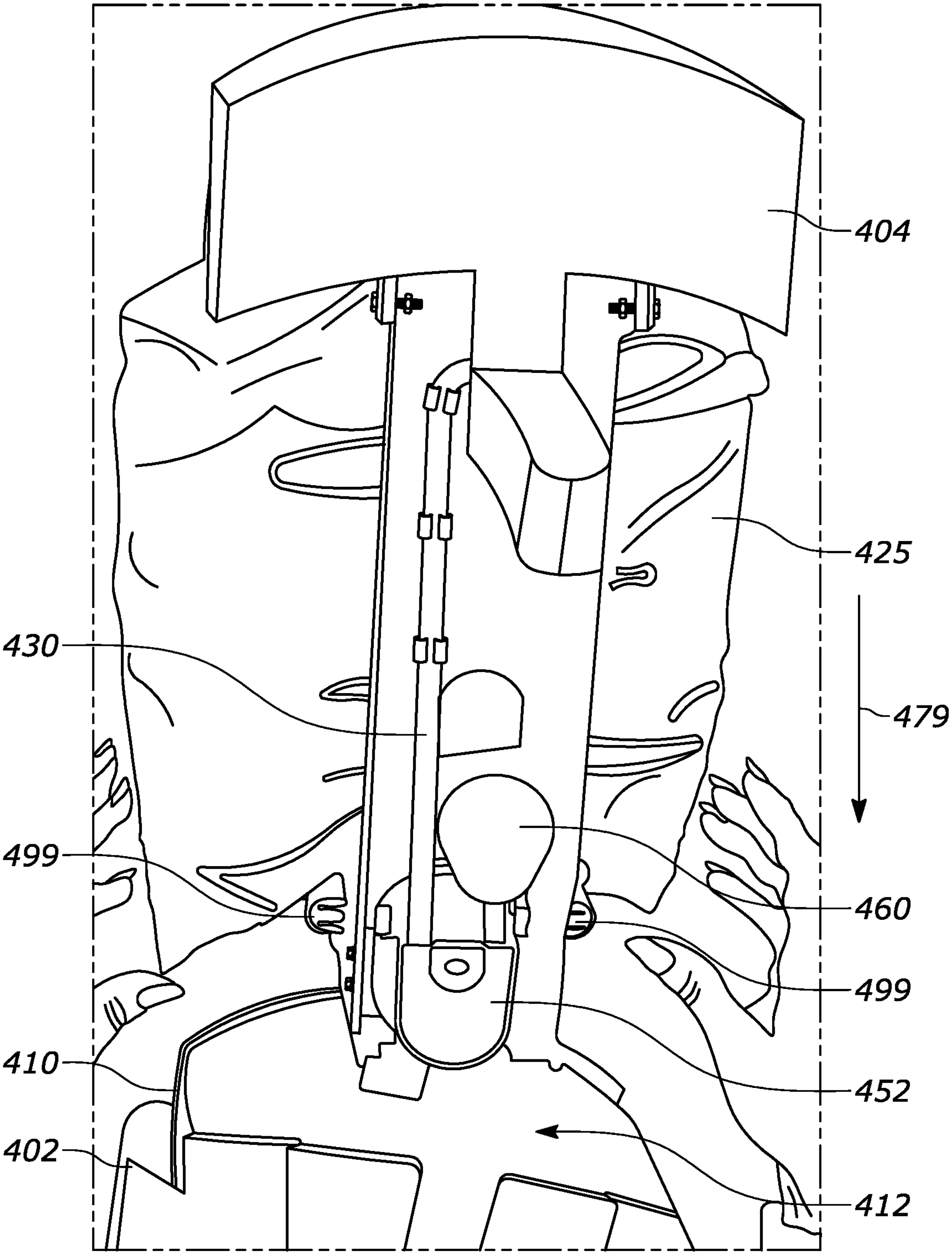
FIG. 17E is a front elevation view of the lid, pouch carrier, and a condiment pouch being inserted into a container of the condiment dispensing device of FIG. 17A.
Figure 18A:
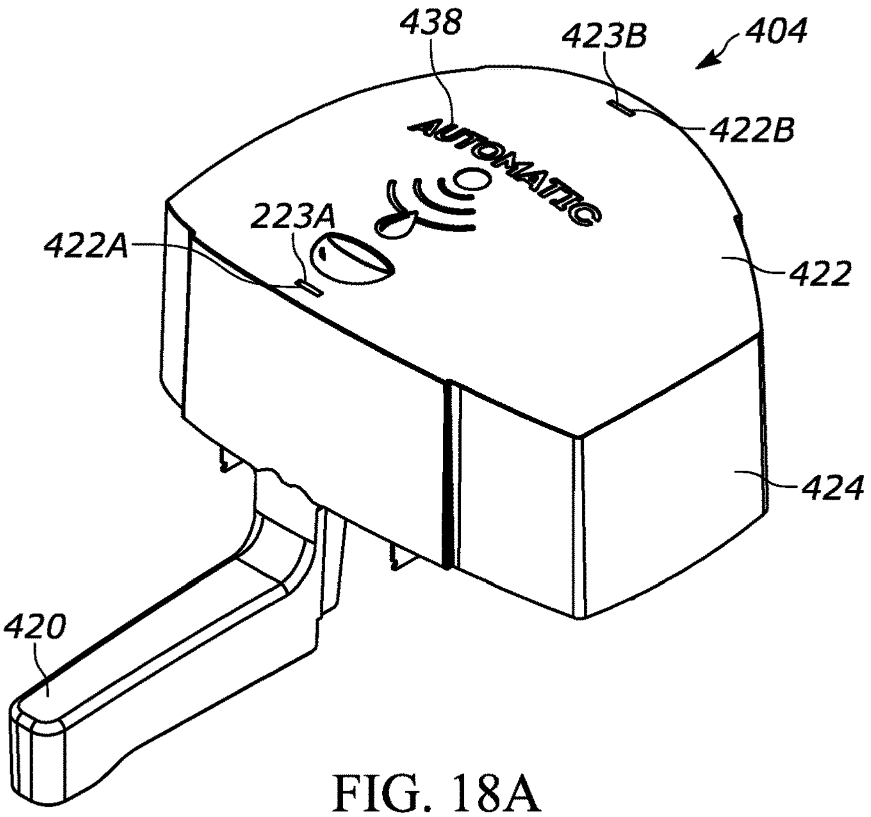
FIGS. 18A-C are top perspective, front elevation, right side elevation views, respectively, of the lid of the condiment dispensing device of FIG. 17A.
Figure 18B:
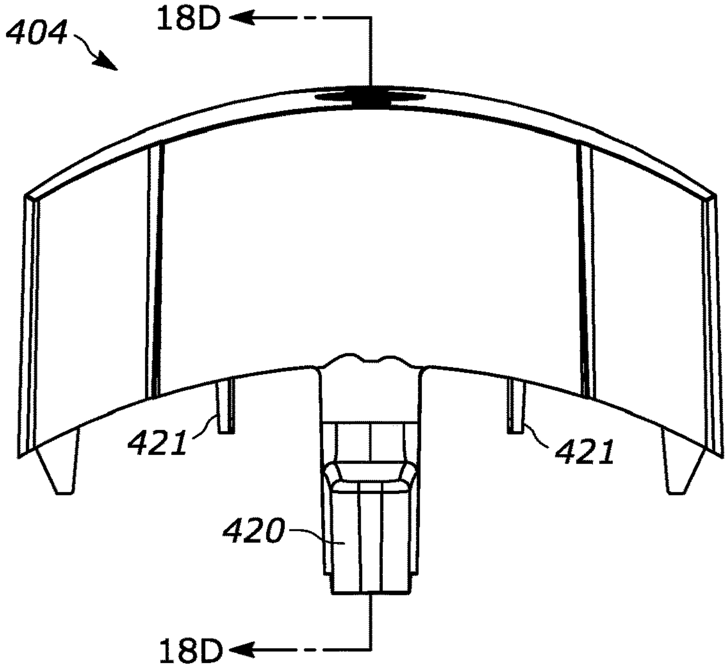
Figure 18C:
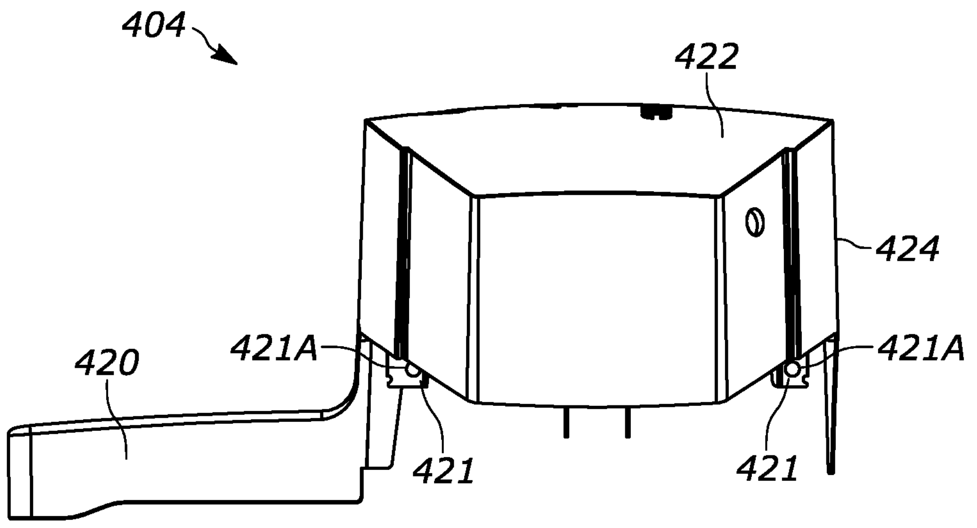
Figure 18D:
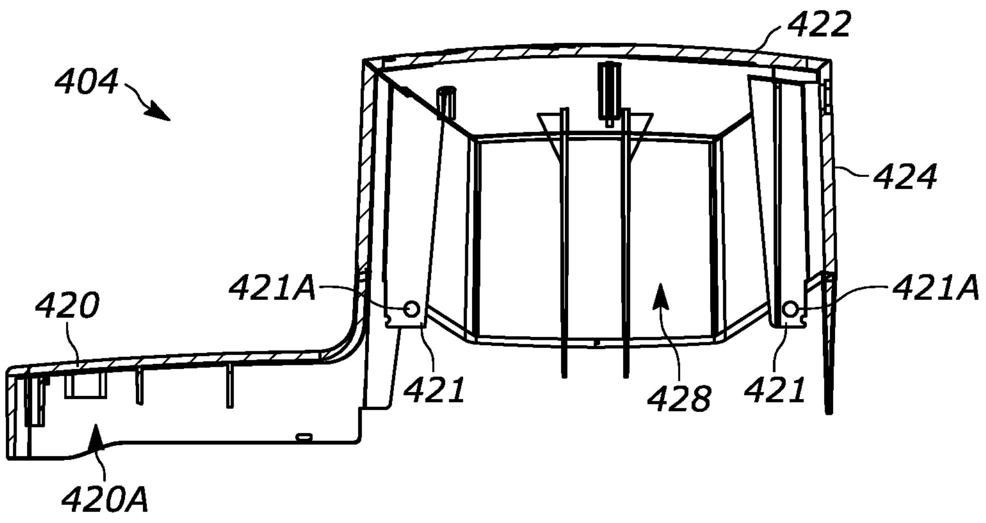
FIG. 18D is a cross-section view of the lid of FIG. 18A taken along lines 18D-18D of FIG. 18B.

As shown in FIG. 17C, the lid 404 may further include power button 480 for turning the condiment dispensing container 400 on and off. When the condiment dispensing container 400 is on, the controller may operate the pump 452 to dispense condiment in response to the detection by the sensor 432. When the condiment dispensing container 400 is off, the controller may not be powered and the condiment dispensing container 400 may not dispense condiment. Being able to power off the condiment dispensing container 400 via the power button 480 or a similar feature is beneficial when cleaning the condiment dispensing container 400 or in replacing the condiment pouch 425 because the condiment dispensing container 400 will not dispense a dose of condiment when powered off. The power button 480 is shown mounted on a side of the lid 404. This enables the lid 404 to rest on the back side of the lid 404 on a table or other surface without pushing the button 480. This may be advantageous when, for example, the lid 404/pouch carrier 482 is being inserted into the container body 402 horizontally by sliding the lid 404/pouch carrier 482 along the table or surface and into the container body 402. In other forms, the power button 480 may be on the top surface of the lid 404 or the other sides of the lid 404.

With regard to FIGS. 25A-H, the steps for installing the pouch 425 are shown. With respect to FIG. 25A, the connecting end 464 of the pouch piercer 460 may be inserted into the end 444 of the tube 430. With respect to FIG. 25B, the piercing end 462 of the pouch piercer 460 may be inserted into a fitment port of a pouch 425 containing the desired condiment. With respect to FIGS. 25C-D, the condiment pouch 425 may be positioned on the pouch supporting surfaces 485D, 495D of the pouch carrier 482 and below the bottom cover 426 of the lid 404.

Figure 25A:
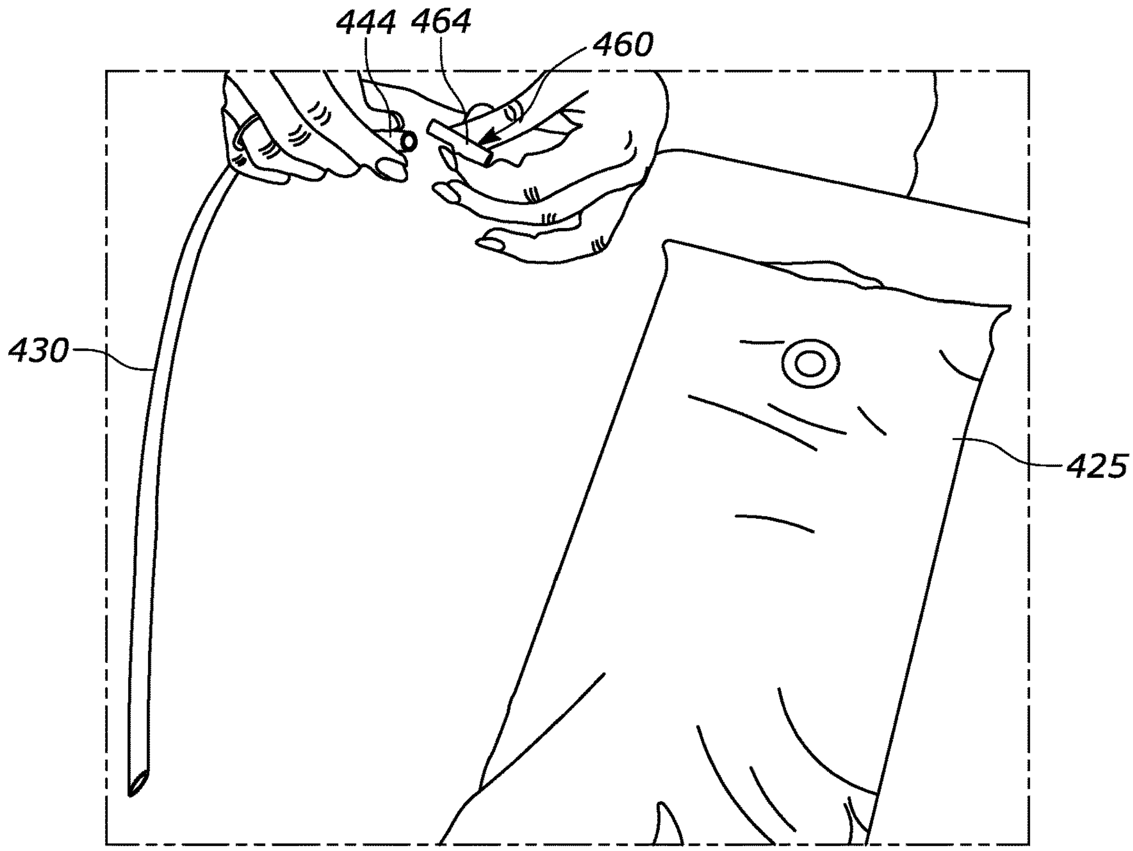
FIGS. 25A-H show steps for installing the condiment pouch into the condiment dispensing container 400 of FIG. 17A for use.
Figure 25B:
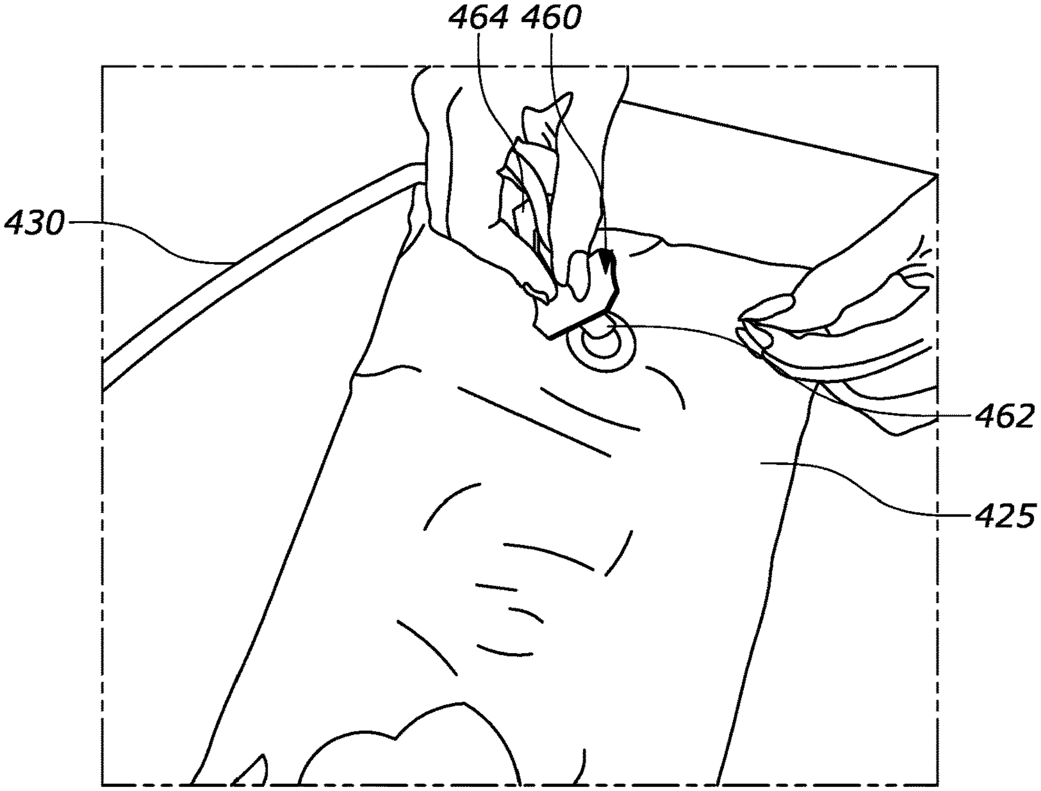
Figure 25C:
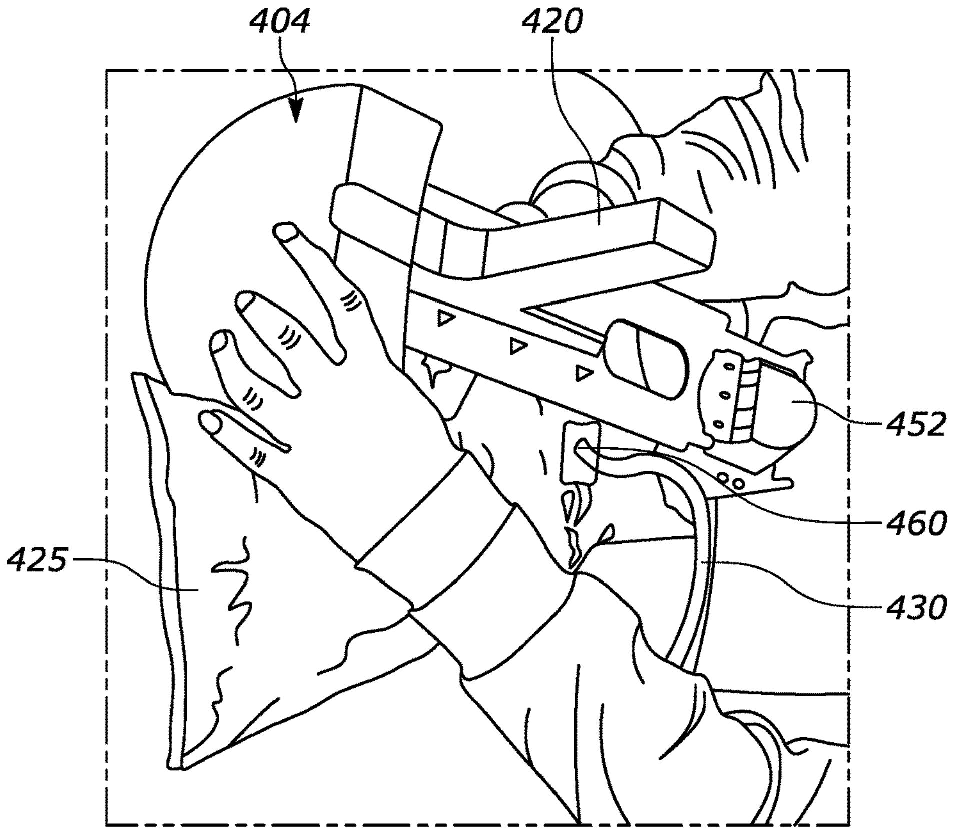
Figure 25D:
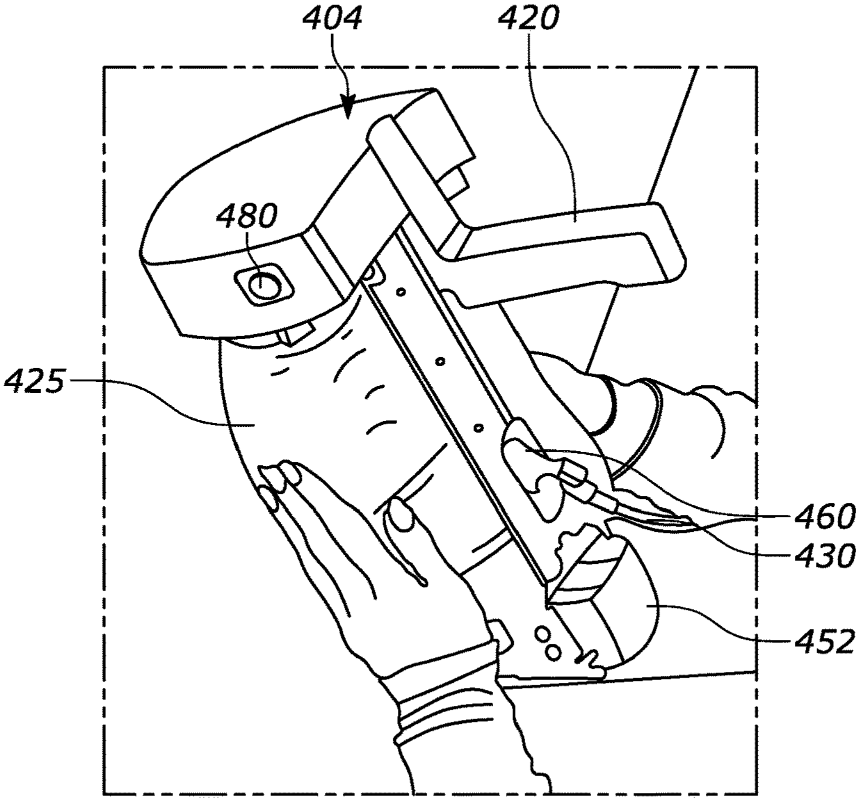
Figure 25E:
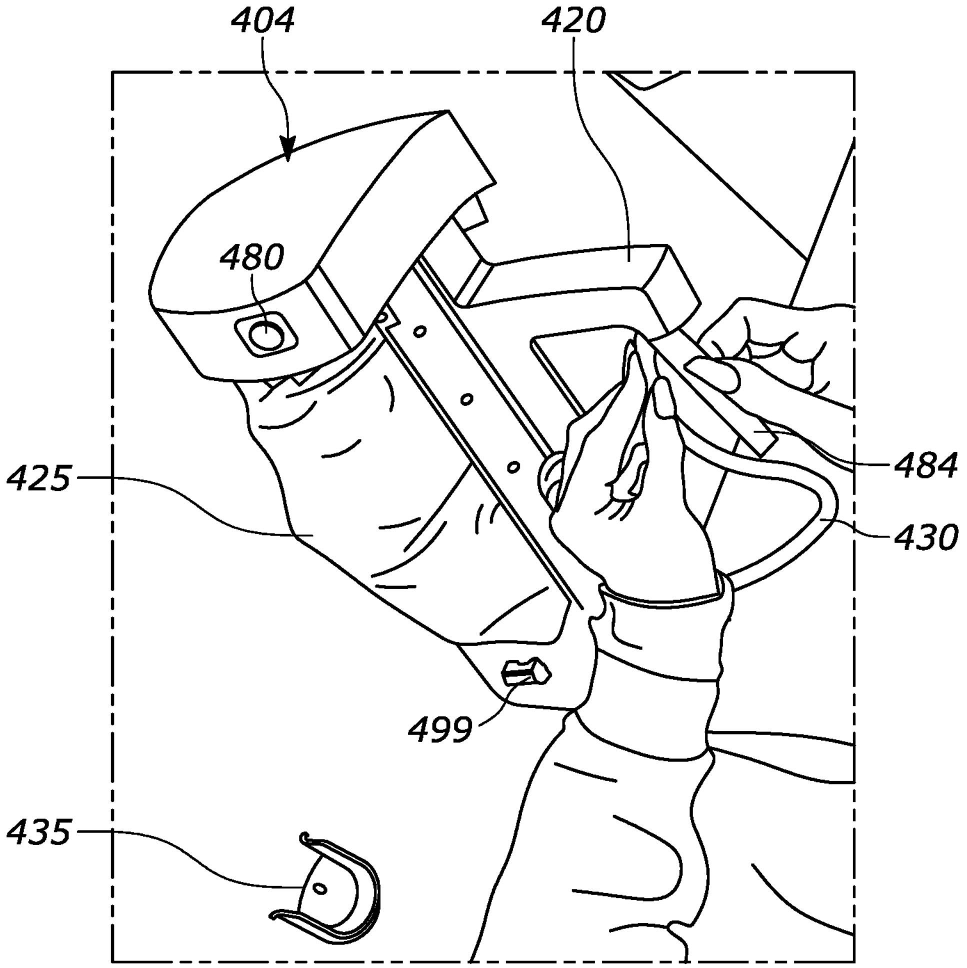
Figure 25F:
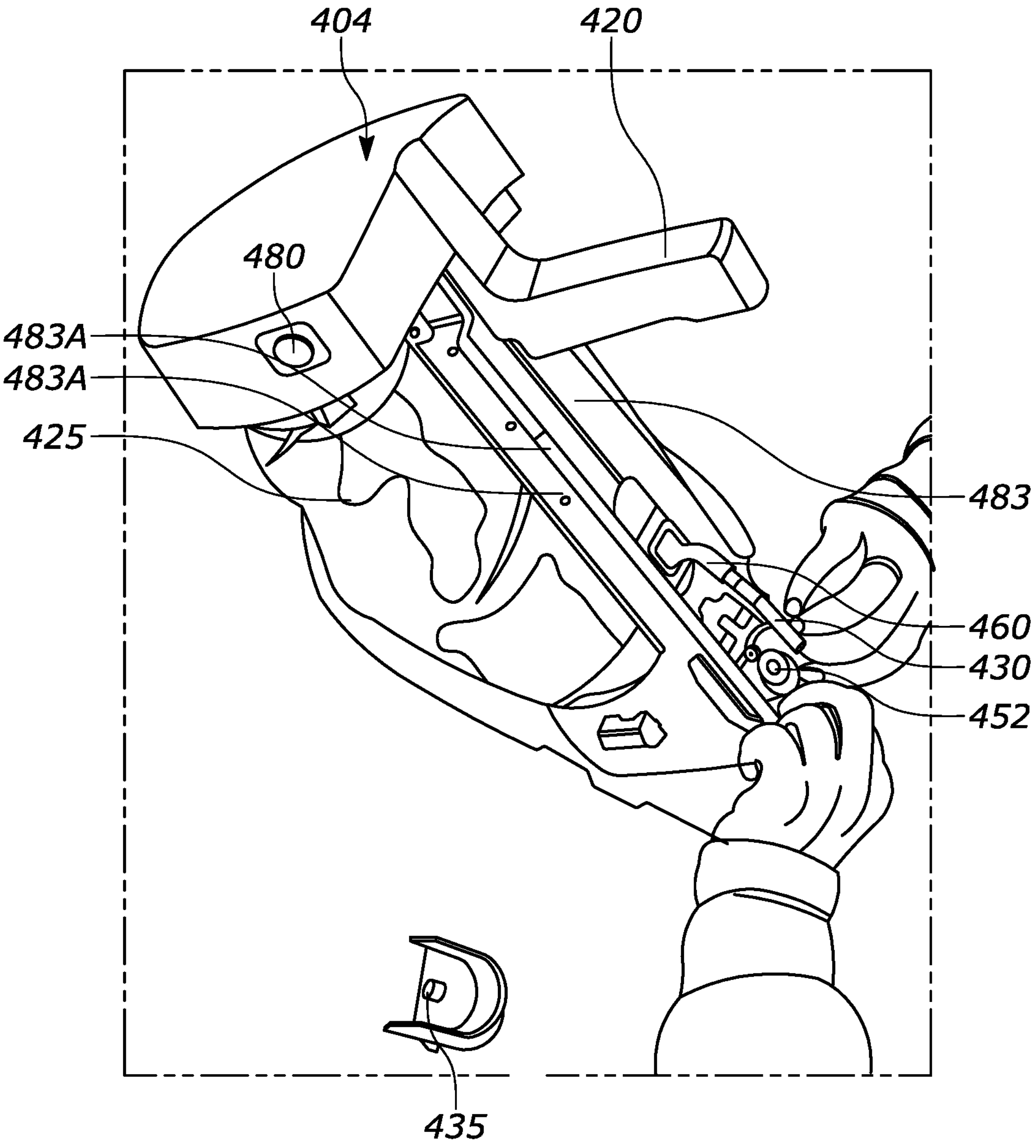
Figure 25G:
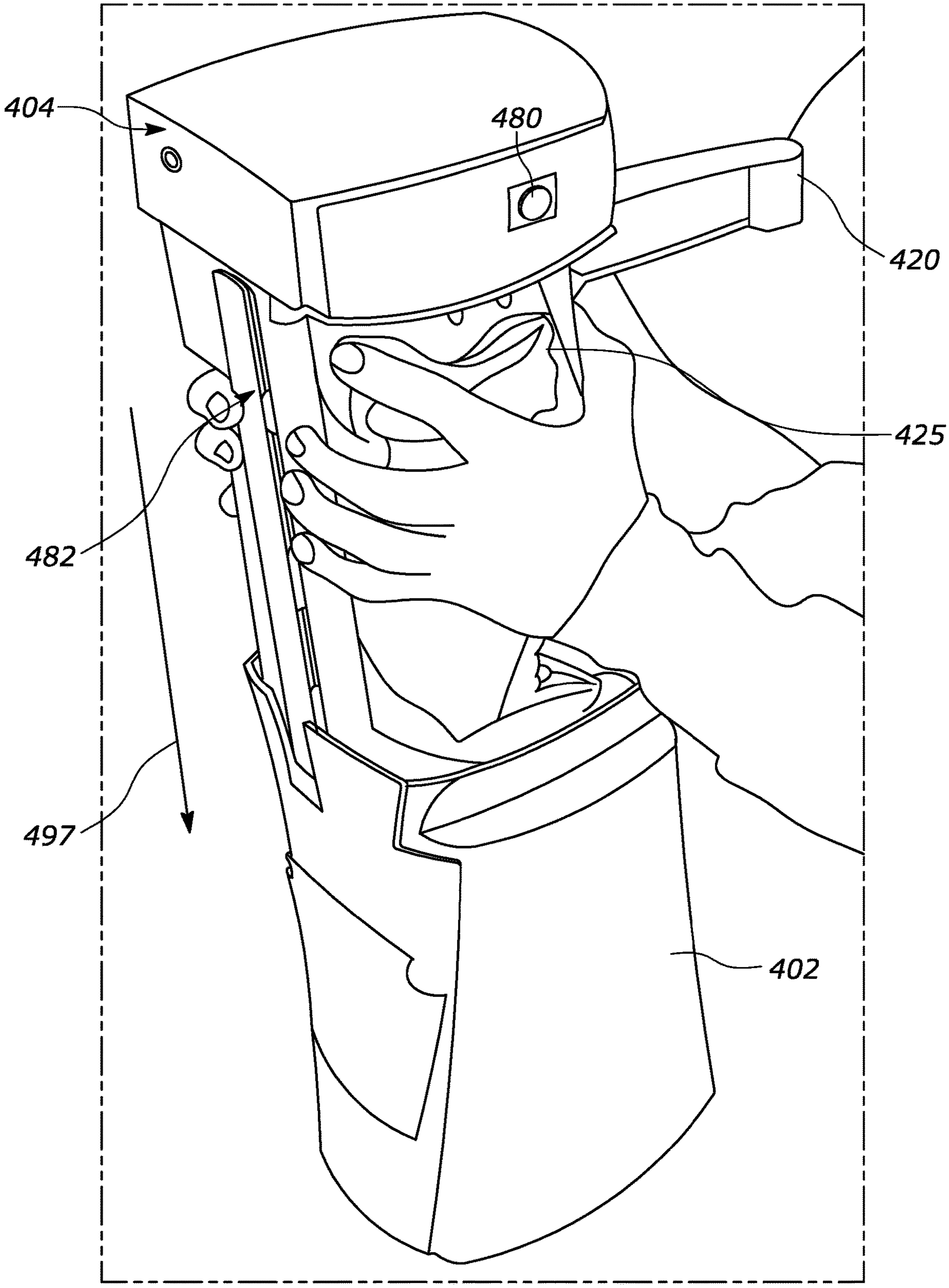
Figure 25H:
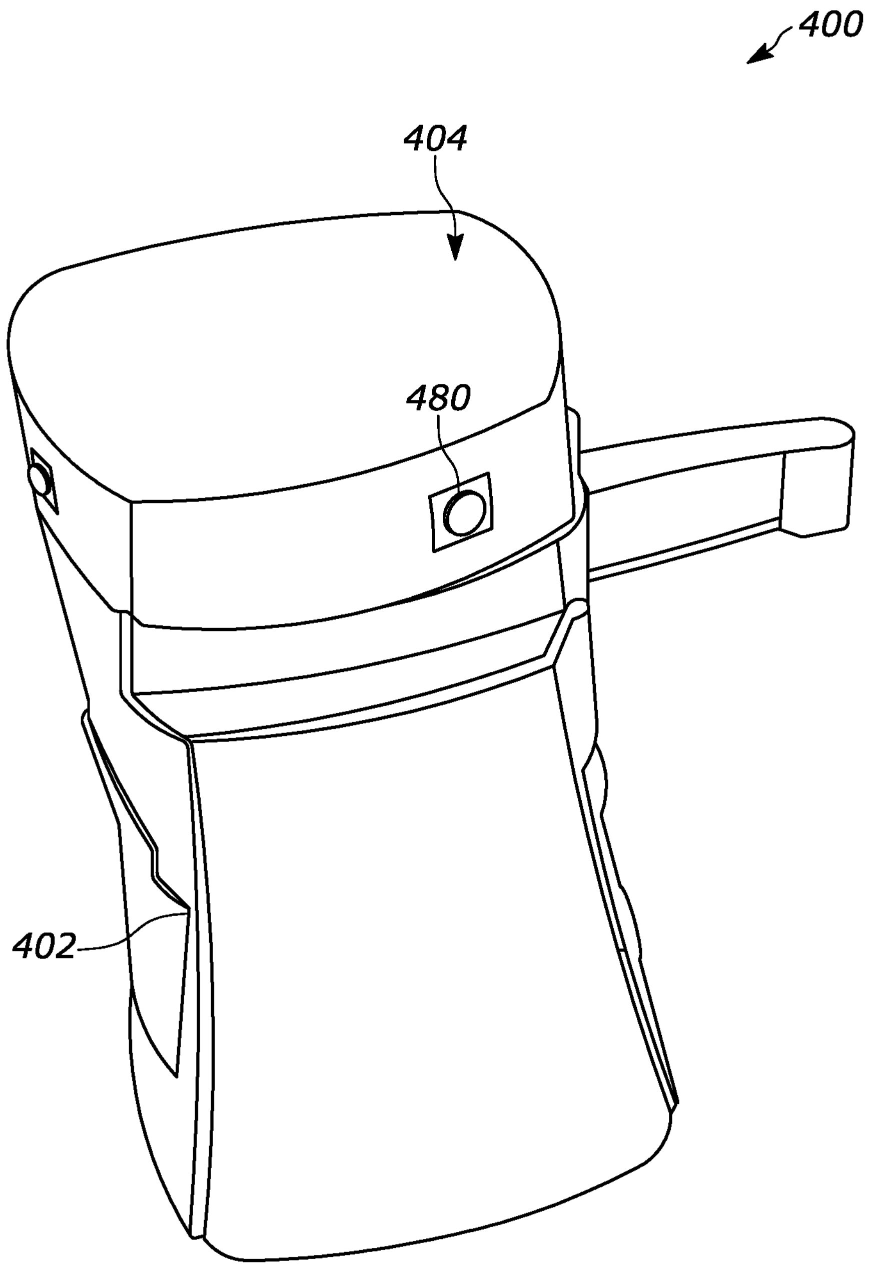
Figure 26A:
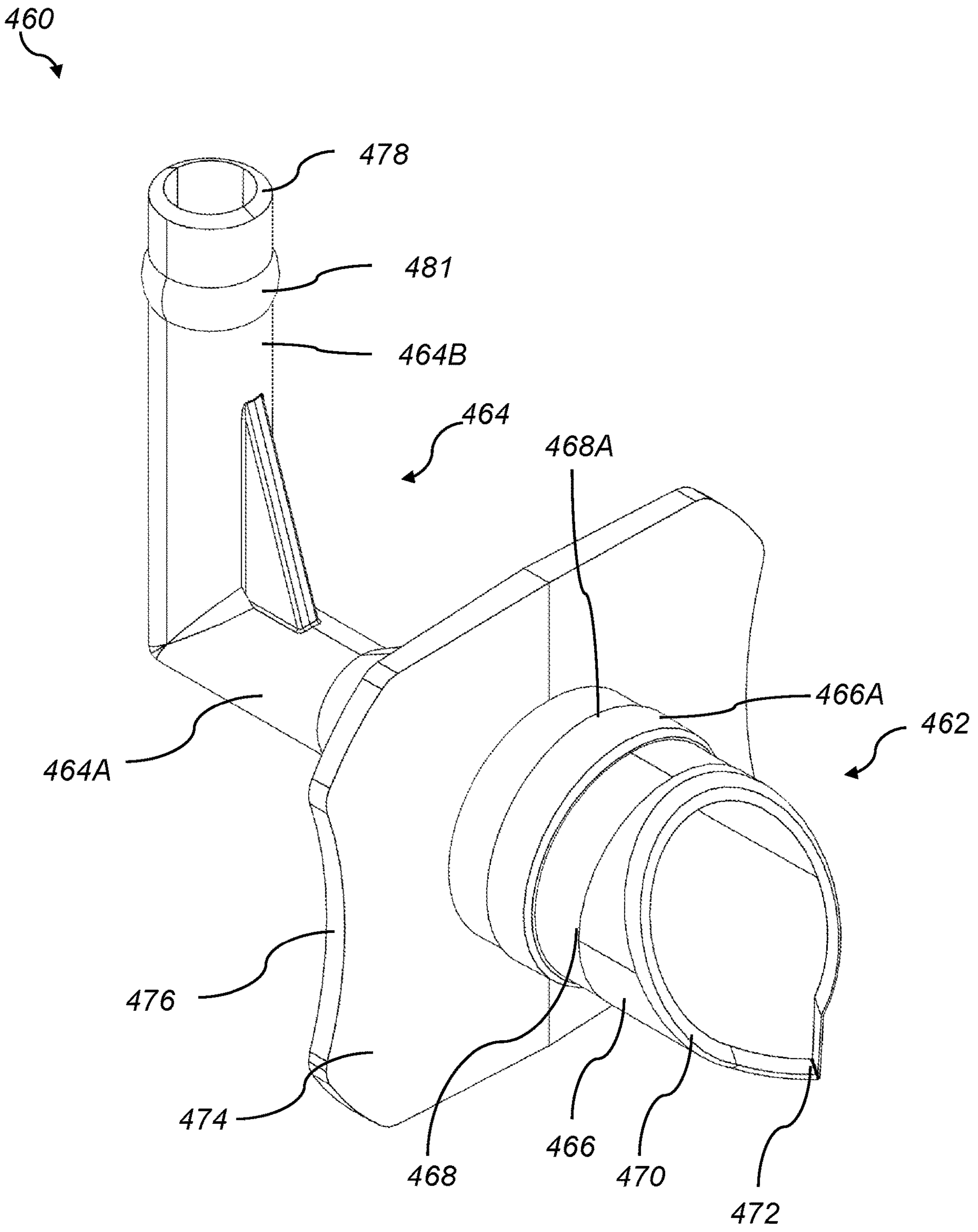
FIG. 26A-E are top perspective, bottom perspective, top plan, side elevation, and bottom plan views, respectively, of a pouch piercer of the condiment dispensing device of FIG. 17A according to another embodiment.
Figure 26B:
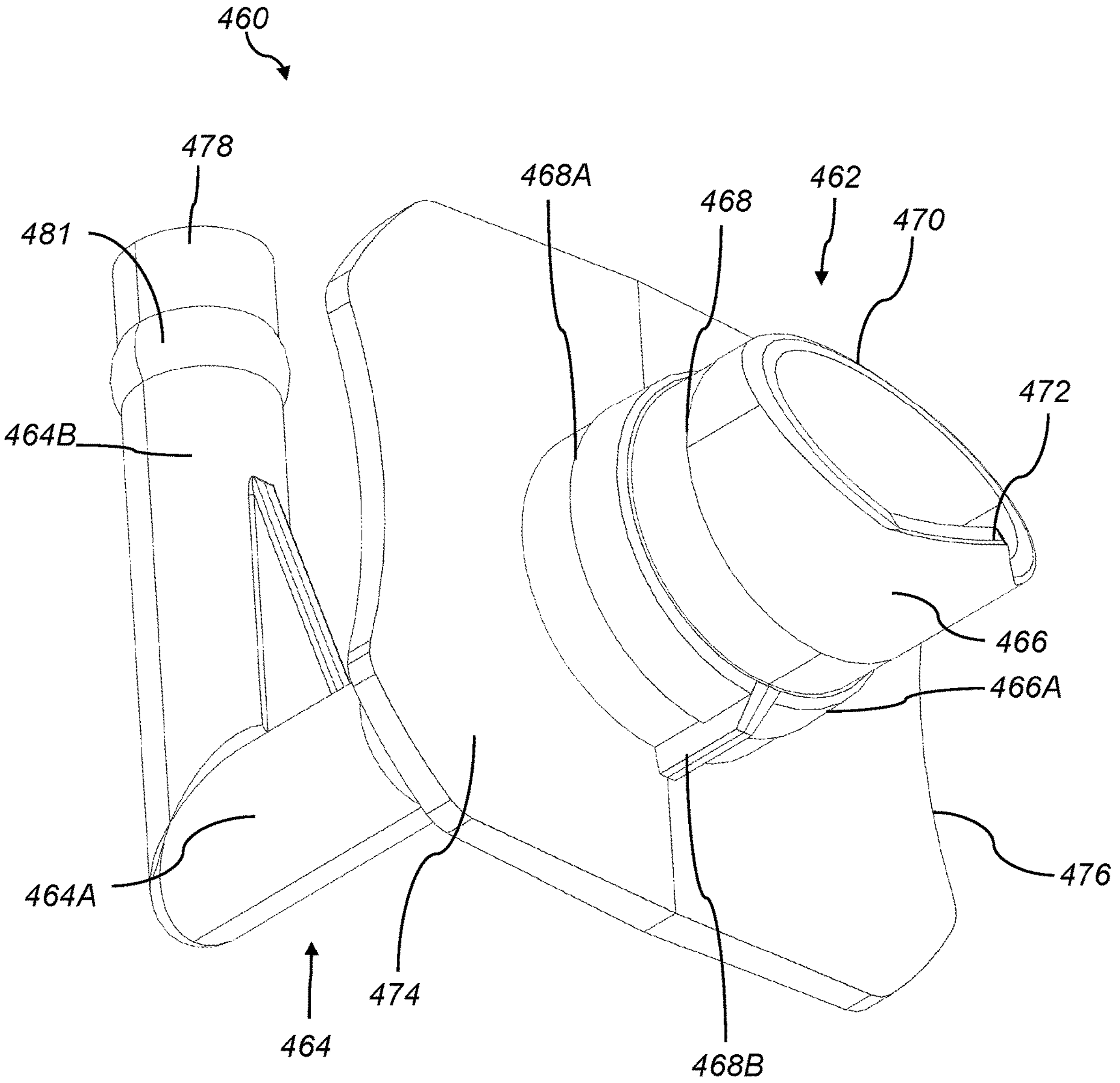
Figure 26C:
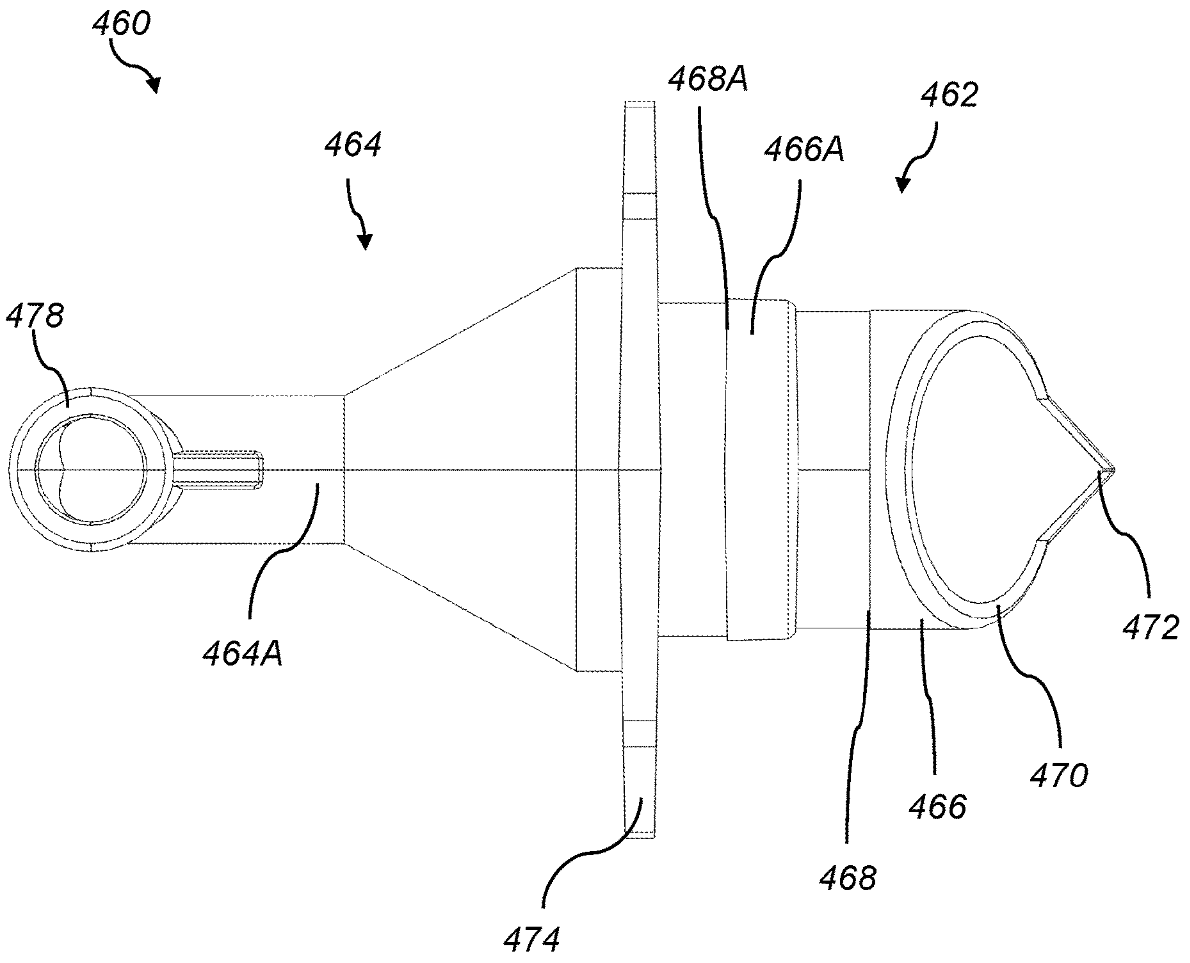
Figure 26D:
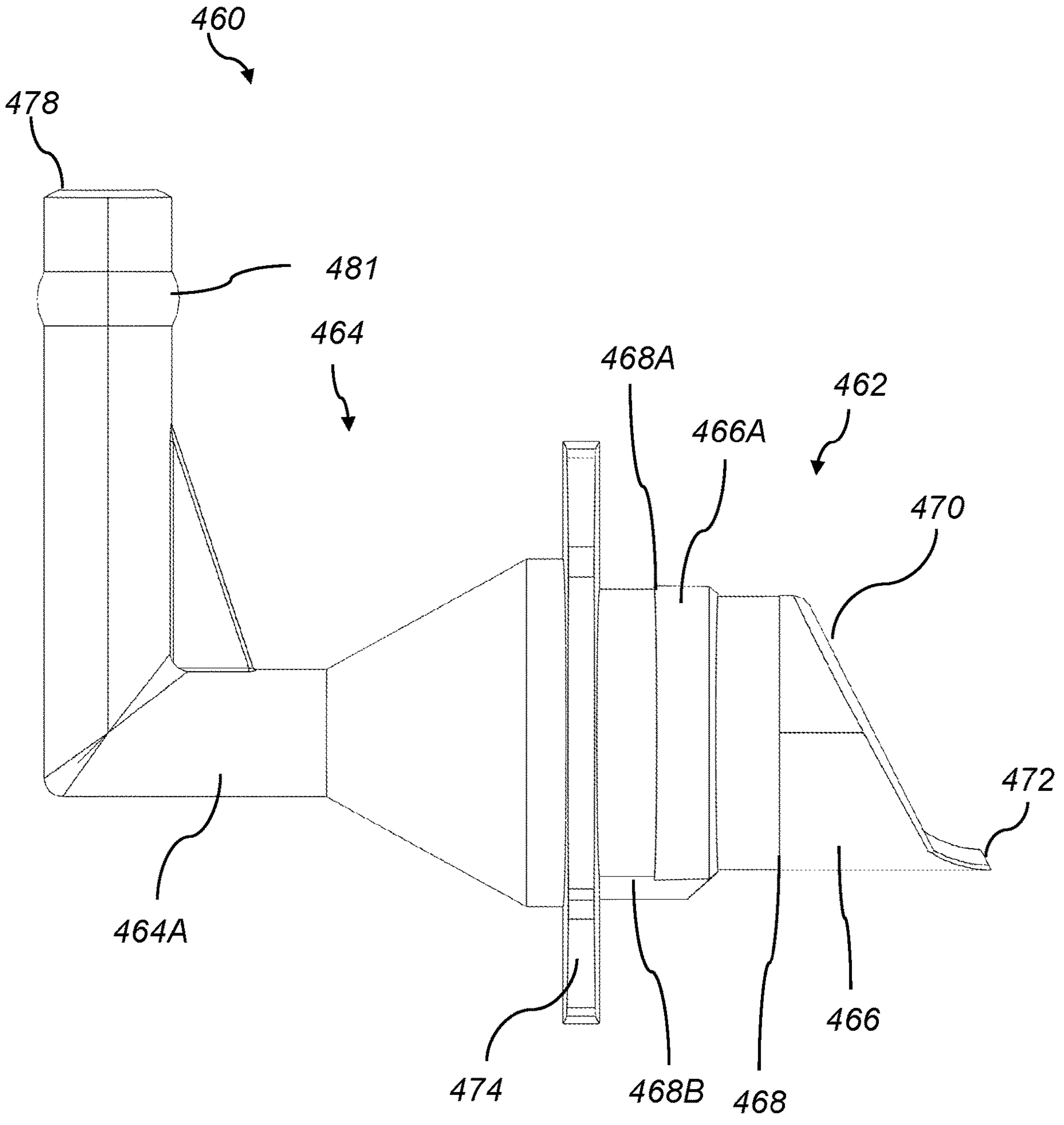
Figure 26E:
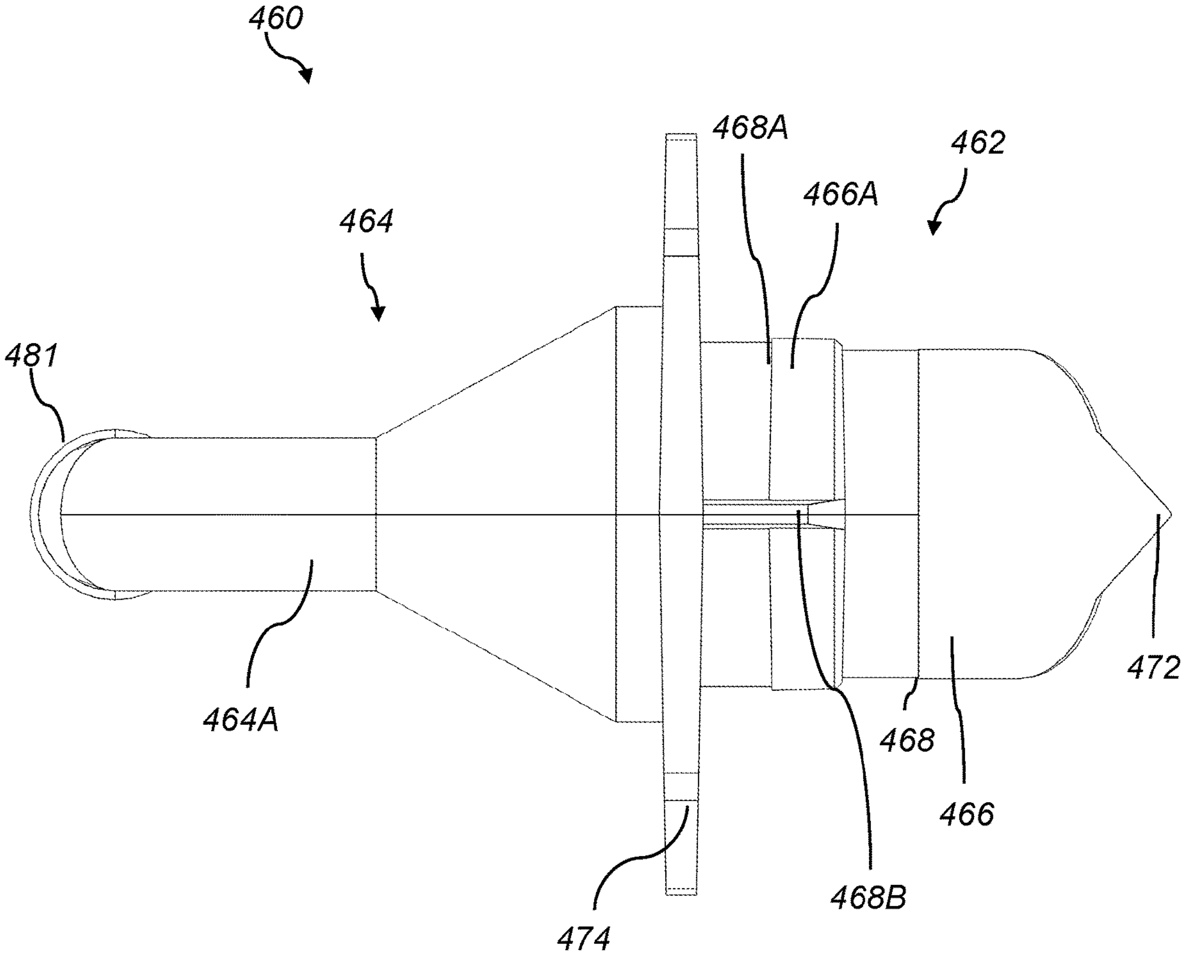

With respect to FIG. 25E, the tube support member 484 may be bent downward or away from the spout 420 at the hinge 490. The dispensing opening 434 of the tube 430 may be inserted through the hole 434A and the tube 430 may be attached to the tube holder clips 483A disposed along the length of the tube support member 484. With respect to FIG. 25F, the tube 430 may be snapped into the tube holder clips 483A along the plate 483 of the pouch carrier 482. The tube 430 may be positioned within the pump housing 154 about the rollers 456 of the pump 452. With respect to FIG. 25G, the pouch carrier 482 is then inserted into the container 402 in direction 479 until the lid 404 engages the rim 410 of the container 404, with the spout 420 aligned with the notch 418 as shown in FIG. 25H. A user may install the pouch carrier 482 vertically with the container body 402 upright or horizontally with the container body 402 laying on a side. Where the container body 402 includes a guide track, the fins 494 of the pouch carrier 482 may be aligned with the guide track. The pouch carrier 482 may then be moved relative to the container body 402 such that the fins 494 of the pouch carrier 482 cooperate with and slide along the guide track of the container body 402 as the pouch carrier 482 moves into the container body 402. The condiment pouch 425 is then installed and the condiment dispensing container 400 is ready for use.

To use the condiment dispensing container 400, the power button 480 may be pressed to turn the condiment dispensing device 400 on. A user may then position a plate, container, or food item below the dispensing opening 434 of the spout 420. The sensor 432 sends a signal to the circuit board 448 indicating that condiment should be dispensed. The circuit board 448, via the controller, communicates with the electric motor 464 of the pump 452 to cause the electric motor 464 to rotate. The rotation of the electric motor 464 causes the roller 458 to rotate and bring the rounded arms 460 into contact with the tube 430 of the loop 456. As the rounded arms 460 travel along the tube 430 of the loop 456, the rounded arms 460 force fluid (e.g., air or condiment) along the tube 430 toward the dispensing opening 434. Movement of the fluid toward the dispensing opening 434 of the tube 434 creates a vacuum within the tube 430, drawing fluid from the condiment pouch and toward the pump housing 454. Thus, condiment is withdrawn from the condiment pouch and dispensed to the user via the dispensing opening 434. The circuit board 448 may operate the motor 464 at a certain speed for the period of time set via the dial 443 on of the lid 404. After the period of time, the circuit board 448 ceases the operation of the electric motor 464 in the forward direction and operates the motor 464 in the reverse direction for a quarter turn to draw the fluid within the tube 430 away from the dispenser opening 434 to prevent dripping and to promptly cease dispensing condiment.

Once the condiment pouch 425 is low or empty, the condiment pouch 425 may need to be replaced and the condiment dispensing device 400 may need to be cleaned. To remove the condiment pouch 425, power button 480 may be pressed to power off the condiment dispensing container 400. This prevents the condiment dispensing device 400 from dispensing condiment via the dispensing opening 434 in response to a signal from the sensor 432, if any condiment remains to be dispensed. The lid 404 and the pouch carrier 482 are withdrawn from the container 402. The tube support member 484 may be bent at the hinge 490 allowing access to the tube 430. The tube 430 can then be detached from the tube holder clips 488 and withdrawn from the opening 434A. The tube 430 may then be detached from the pouch piercer 460 and removed from the pump 452. The pouch piercer 460 is also withdrawn from the fitment of the condiment pouch 425. The pouch piercer 460 and the tube 430 may then be cleaned and reused with another condiment pouch 425. The tube 430 may then be cleaned and/or replaced with a clean tube 430. The tube 430 may be made of a clear or partially see-through material (e.g., silicone) which may aid in determining when the inside of the tube 430 is clean. The condiment dispensing device 400 may be reassembled with the clean tube 430 and pouch piercer as described above.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A condiment dispenser for discharging condiment from a condiment container, the condiment dispenser comprising:
- a housing configured to surround at least a portion of the condiment container when installed in the housing;
- a spout extending from the condiment dispenser for discharging the condiment from the condiment container;
- a pump positioned within the housing to force the condiment to the spout and out of the condiment dispenser;
- a flow path having an inlet configured to couple to the condiment container and an outlet in the spout for discharging the condiment, the flow path installed as a single unit from the inlet to the outlet and extending through the pump; and
- a controller responsive to a sensor for activating the pump, the controller configured to operate the pump in a forward direction for discharging the condiment and a reverse direction to draw the condiment from the outlet.

2. The condiment dispenser of claim 1 wherein the sensor detects a user and activates the pump without the user contacting the dispenser.

3. The condiment dispenser of claim 1 wherein the flow path includes a portion positioned at the pump, the portion having an internal diameter in the range of about four to six millimeters and a shore A hardness in the range of about 55-65.

4. The condiment dispenser of claim 1 further comprising a pouch piercer having a piercing end configured to be inserted into the condiment container and a connecting end configured to be coupled to the inlet of the flow path.

5. The condiment dispenser of claim 1 wherein the flow path includes only two ports for contacting the condiment, the inlet and the outlet.

6. The condiment dispenser of claim 1 wherein the outlet extends through an opening in the spout.

7. A condiment dispenser for discharging condiment from a condiment container, the condiment dispenser comprising:
- a housing configured to surround at least a portion of the condiment container when installed in the housing;
- a spout extending from the condiment dispenser for discharging the condiment from the condiment container;
- a pump positioned within the housing to force the condiment to the spout and out of the condiment dispenser;
- a flow path having an inlet configured to couple to the condiment container and an outlet in the spout for discharging the condiment, the flow path installed as a single unit from the inlet to the outlet and extending through the pump; and
- a subframe for supporting the pump, whereby the condiment container is installed in the subframe such that the subframe, condiment container, and pump can be installed as a single unit into the housing.

8. A condiment dispenser comprising:
- a housing;
- a flow path having an inlet and an outlet, the flow path extending from the housing to the outlet for discharging condiment;
- a spout extending from the condiment dispenser; and
- a flow path support positioned on the spout,
- the flow path support having a first portion and a second portion hingedly coupled to the first portion,
- the second portion having an opening therein to receive the outlet of the flow path and an arc shaped portion positioned on an interior side of the flow path support to brace a portion of the flow path support adjacent the outlet in an arc shape,
- the first portion coupled to the spout and the second portion releasably coupled to the spout to permit the second portion to pivot between a dispensing position and an installation position, the installation position providing access to the interior side of the flow path support and permitting installation of the outlet at the opening.

9. The condiment dispenser of claim 8 wherein the second portion includes at least one retainer for holding the flow path relative to the spout when in the dispensing position.

10. The condiment dispenser of claim 9 wherein the at least one retainer, the arc shaped portion, and the opening cooperate to position the outlet in a generally perpendicular orientation relative to a portion of the flow path located at the at least one retainer.

11. The condiment dispenser of claim 8 further comprising a sensor for detecting a user and wherein the first portion defines an opening to retain the sensor.

12. A condiment dispenser for discharging condiment from a condiment container, the condiment dispenser comprising:
- a housing having an opening;
- a subframe having an interior chamber for receiving the condiment container, the subframe positioned in the housing during operation and removable from the housing via the opening; and
- a lid covering the opening;

a spout extending from at least one of the lid and the housing; and a flow path extending from the subframe and through the spout to dispense condiment, wherein the subframe includes a base member and at least two sidewalls, the base member supporting the condiment container when installed.

13. The condiment dispenser of claim 12 further comprising a pump, the pump positioned on the subframe such that the pump is removable from the housing with the subframe via the opening.

14. The condiment dispenser of claim 12 wherein the lid is coupled to the subframe such that the lid and subframe are removable from the housing together.

15. The condiment dispenser of claim 14 wherein the flow path is coupled to the subframe and the lid such that the lid, flow path, and subframe are removable from the housing together.

16. The condiment dispenser of claim 15 wherein the spout is coupled to the lid such that the lid, flow path, subframe, and spout are removable from the housing together.

17. The condiment dispenser of claim 12 wherein the at least two sidewalls are coupled to the lid such that the lid defines a further interior chamber for receiving at least a portion of the condiment container.

18. A condiment dispenser for discharging condiment from a condiment container, the condiment dispenser comprising:

a housing having an opening;

a subframe having an interior chamber for receiving the condiment container, the subframe positioned in the housing during operation and removable from the housing via the opening; and a lid covering the opening;

a spout extending from at least one of the lid and the housing; and a flow path extending from the subframe and through the spout to dispense condiment, wherein the housing includes a guide track and the subframe includes a track engagement portion to cooperate with the guide track when inserting the subframe in the housing.

* * * * *